(12) United States Patent
Jung et al.

(10) Patent No.: US 12,261,804 B2
(45) Date of Patent: Mar. 25, 2025

(54) ELECTRONIC DEVICE PERFORMING NEIGHBOR AWARENESS NETWORKING COMMUNICATION AND METHOD FOR OPERATION THEREOF

(71) Applicant: SAMSUNG ELECTRONICS CO., LTD., Suwon-si (KR)

(72) Inventors: Buseop Jung, Suwon-si (KR); Soonho Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 782 days.

(21) Appl. No.: 17/478,118

(22) Filed: Sep. 17, 2021

(65) Prior Publication Data
US 2022/0103332 A1 Mar. 31, 2022

Related U.S. Application Data

(63) Continuation of application No. PCT/KR2021/009601, filed on Jul. 26, 2021.

(30) Foreign Application Priority Data

Sep. 25, 2020 (KR) .................. 10-2020-0125130

(51) Int. Cl.
*H04L 5/00* (2006.01)
*H04W 72/0453* (2023.01)

(52) U.S. Cl.
CPC .......... *H04L 5/0092* (2013.01); *H04L 5/0041* (2013.01); *H04L 5/0073* (2013.01); *H04L 5/0098* (2013.01); *H04W 72/0453* (2013.01)

(58) Field of Classification Search
CPC . H04W 72/12; H04W 24/08; H04W 72/0453; H04W 88/06; H04W 84/18;
(Continued)

(56) References Cited

U.S. PATENT DOCUMENTS 9,439,099 B2* 9/2016 Emmanuel ............ H04W 72/02
9,693,217 B2* 6/2017 Kasslin ................. H04W 48/16
(Continued)

FOREIGN PATENT DOCUMENTS

JP 2020-092416 6/2020
KR 10-2016-0063041 6/2016
(Continued)

OTHER PUBLICATIONS

International Search Report and Written Opinion dated Oct. 27, 2021 in corresponding International Application No. PCT/KR2021/009601.

(Continued)

*Primary Examiner* — Oussama Roudani
(74) *Attorney, Agent, or Firm* — Nixon & Vanderhye P.C.

(57) ABSTRACT

Provided is an electronic device including at least one communication module and at least one processor. The at least one processor is configured to: establish, with an external device, a schedule including a time interval for a first frequency band and a time interval for a second frequency band to perform data communication with the external device supporting the first frequency band and the second frequency band, the first and second frequency bands having different coverage areas; determine a ratio of the time interval for the second frequency band based on a result of monitoring traffic in the first frequency band and the second frequency band according to the schedule indicates that traffic of the second frequency band having a smaller coverage area is present; and update the schedule to adjust the time intervals for the first frequency band and the second frequency band based on the determined ratio.

20 Claims, 50 Drawing Sheets

(58) Field of Classification Search
CPC ..... H04W 72/20; H04W 72/04; H04W 84/12; H04W 72/52; H04L 5/0092; H04L 5/0041; H04L 5/0098; H04L 5/0073
See application file for complete search history.

(56) References Cited

U.S. PATENT DOCUMENTS

| | | | |
|---|---|---|---|
| 9,872,234 B2* | 1/2018 | Huang | H04W 72/121 |
| 9,955,456 B2* | 4/2018 | Hui | H04W 76/40 |
| 9,955,505 B2* | 4/2018 | Vandwalle | H04W 76/14 |
| 10,033,578 B2* | 7/2018 | Soriaga | H04W 8/005 |
| 10,051,470 B2* | 8/2018 | Abraham | H04L 63/04 |
| 10,111,160 B2* | 10/2018 | Patil | H04W 12/037 |
| 2010/0135238 A1* | 6/2010 | Sadri | H04W 72/0453 455/63.3 |
| 2016/0050698 A1* | 2/2016 | Siomina | H04W 72/20 370/329 |
| 2016/0150537 A1 | 5/2016 | Jung et al. | |
| 2016/0286398 A1 | 9/2016 | Abraham et al. | |
| 2017/0207996 A1 | 7/2017 | Lui et al. | |
| 2017/0311341 A1 | 10/2017 | Patil et al. | |
| 2017/0325230 A1 | 11/2017 | Abraham et al. | |
| 2018/0014341 A1 | 1/2018 | Jung | |
| 2018/0109952 A1 | 4/2018 | Abraham et al. | |
| 2020/0182964 A1 | 6/2020 | Di Nallo et al. | |
| 2020/0404477 A1 | 12/2020 | Jung et al. | |
| 2024/0057186 A1* | 2/2024 | Wu | H04L 45/24 |

FOREIGN PATENT DOCUMENTS

| | | |
|---|---|---|
| KR | 10-2017-0129771 | 11/2017 |
| KR | 10-2018-0005471 | 1/2018 |
| KR | 10-2018-0136954 | 12/2018 |
| KR | 10-2019-0002512 | 1/2019 |
| KR | 10-2019-0016403 | 2/2019 |
| WO | 2019/208908 | 10/2019 |

OTHER PUBLICATIONS

Extended European Search Report dated Nov. 6, 2023 issued in European Patent Application No. 21872690.9.
WiFi Alliance, "Neighbor Awareness Networking Specification", Version 3.1, 2020.

* cited by examiner

ELECTRONIC DEVICE PERFORMING NEIGHBOR AWARENESS NETWORKING COMMUNICATION AND METHOD FOR OPERATION THEREOF

CROSS-REFERENCE TO RELATED APPLICATION(S)

This application is a continuation application, claiming the benefit priority under § 365(c), of an International application No. PCT/KR2021/009601, filed on Jul. 26, 2021, which is based on and claims the benefit of an Korean patent application number 10-2020-0125130, filed on Sep. 25, 2020, in the Intellectual Property Office, the disclosure of each of which is incorporated by reference herein in its entirety.

BACKGROUND

Field

The disclosure relates to a method and an apparatus for performing neighboring awareness networking (NAN) communication.

Description of Related Art

A wireless communication system is being developed widely in order to provide various types of communication services such as a voice communication service, a data communication service, or the like. Generally, the wireless communication system is a multiple access system that is capable of supporting communication with multiple users by sharing system resources (frequency, bandwidth, or output power). The multiple access system may include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Various types of wireless communication technologies are being developed along with the development of information communication technology. Among them, a wireless local area network (WLAN) is technology that accesses, based on wireless frequency technology, the Internet in a wireless manner at a home, an office, or a predetermined service provision area, using an electronic device such as a smartphone, a personal digital assistant (PDA), and a laptop computer.

In order to secure flexibility of communication between devices in a wireless LAN (WLAN) system, provided are various protocols for direct communication between devices without using a management medium such as a base station or an access point (AP). Low-power discovery technology called "neighbor awareness networking (NAN)" is being developed, and standardization thereof is being established by the Wi-Fi alliance (WFA) based on the Wi-Fi standard among wireless communication technologies. In addition, a near-field proximity service is being actively conducted using the NAN. The NAN standard defines a synchronization and discovery procedure between devices in a frequency band of 2.5 GHz or 5 GHz.

In low-power discovery technology called "neighbor awareness networking (NAN)" of which standardization is being established by the Wi-Fi alliance based on the Wi-Fi standard among wireless communication technologies, a frequency band of 6 GHz may be used in addition to a frequency band of 2.5 GHz or 5 GHz. A bandwidth of 80 MHz is used in the 5 GHz band but a bandwidth in the range of 160 to 320 MHz is used in the 6 GHz band, and thus, the use of 6 GHz band may be excellent from the perspective of performance. In addition, a channel state in the 6 GHz band may be cleaner than a channel state in the 5 GHz band, and may highly secure signal transmission and may provide more excellent performance. Conversely, if the 6 GHz band is used, a coverage area for communication may be narrower than the 5 GHz band.

If an electronic device performs communication with an external electronic device via neighbor awareness networking (NAN), the electronic device may perform communication by selecting a frequency band among multiple frequency bands (e.g., 5 GHz or 6 GHz) based on the distance between the electronic device and the external electronic device and/or a communication environment. While the electronic device is performing communication with the external electronic device by selecting one of the multiple frequency bands (e.g., 5 GHz or 6 GHz), if the electronic device and/or the external electronic device moves or the communication environment changes, another frequency band needs to be selected among the multiple frequency bands (e.g., 5 GHz or 6 GHz).

SUMMARY

Embodiments of the disclosure provide a method and an electronic device for effectively scheduling a data path using multiple frequency bands in the neighbor awareness networking (NAN).

Embodiments of the disclosure provide a method and an electronic device for scheduling a data path associated with multiple frequency bands having different coverage areas.

Embodiments of the disclosure provide a method and an electronic device for managing scheduling of a data path so that devices show optimal performance and mobility between devices is secured.

In accordance with an example embodiment of the disclosure, an electronic device includes: at least one communication circuit and at least one processor, and the at least one processor is configured to: establish, with an external device, a schedule including a time interval for a first frequency band and a time interval for a second frequency band to perform data communication with the external device supporting the first frequency band and the second frequency band, the first and second frequency bands having different coverage areas; determine a ratio of the time interval for the second frequency band based on monitoring traffic in the first frequency band and the second frequency band according to the schedule showing that traffic of the second frequency band having a smaller coverage area is present; and update the schedule to adjust the time intervals for the first frequency band and the second frequency band based on the determined ratio.

In accordance with an example embodiment of the disclosure, a method of operating an electronic device includes: establishing, with an external device, a schedule including a time interval for a first frequency band and a time interval for a second frequency band to perform data communication with the external device supporting the first frequency band and the second frequency band, the first and second frequency bands having different coverage areas; determining the ratio of the time interval for the second frequency band based on monitoring traffic in the first frequency band and the second frequency band according to the schedule showing that traffic of the second frequency band having a smaller coverage area is present; and updating the schedule in order to adjust the time intervals for the first frequency band and the second frequency band based on the determined ratio.

DETAILED DESCRIPTION

Hereinafter, the disclosure will be described in greater detail with reference to the accompanying drawings. In the following description of the disclosure, a detailed description of known functions or configurations incorporated herein may be omitted where the detailed description thereof may unnecessarily obscure the subject matter of the disclosure. The terms to be described below are terms defined by taking into consideration functions in the disclosure, and may be changed by a user, intention of an operator, custom, or the like. Therefore, the definitions of the terms should be made based on the contents throughout the disclosure.

In the detailed description, standard documents provided from the institute of electrical and electronics engineers (IEEE) and the Wi-Fi Alliance which are radio access standardization organizations may be used as references. However, it will be apparent to those skilled in the art that the subject matter of the disclosure can be modified without departing from the scope of the disclosure, and can be applied to other communication systems.

Figure 1:
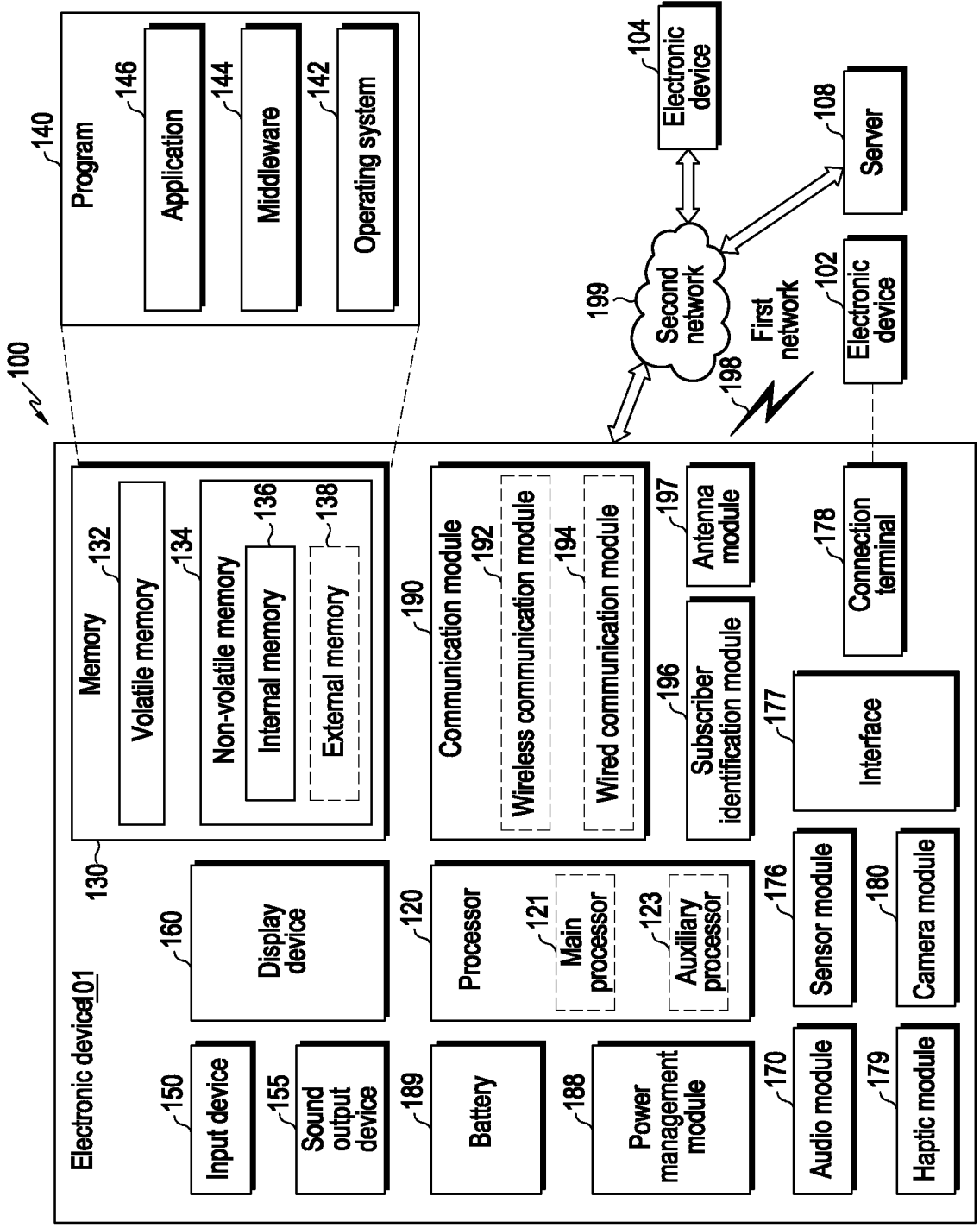
FIG. 1 is a block diagram illustrating an example electronic device in a network environment according to various embodiments.

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

A neighbor awareness networking (NAN) network that operates based on Wi-Fi technology may include NAN devices that share common NAN parameters, including, for example, and without limitation, consecutive discovery windows (DWs), time intervals of the discovery windows, a beacon interval, a NAN discovery channel(s), and the like. A NAN cluster may refer to a collection of NAN devices that share a set of NAN parameters and are synchronized with the same DW schedule.

Figure 2:
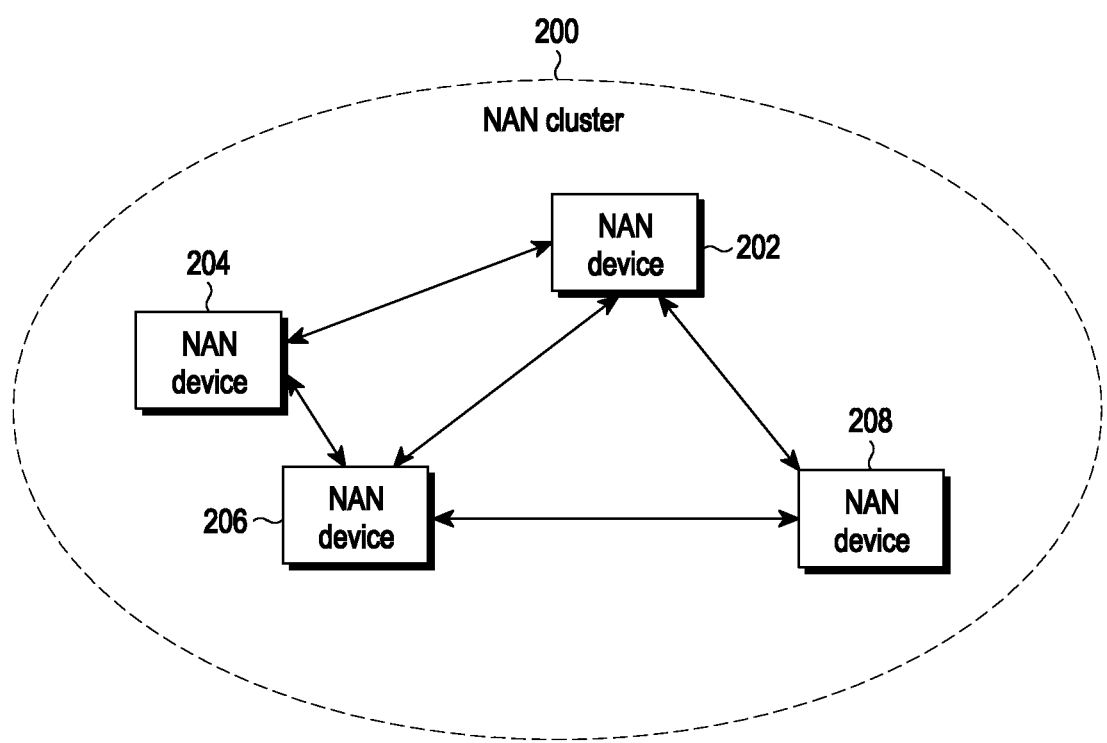
FIG. 2 is a diagram illustrating an example topology of a neighbor awareness networking (NAN) cluster according to various embodiments.

FIG. 2 is a diagram illustrating an example topology of a NAN cluster according to various embodiments.

Referring to FIG. 2, a NAN cluster 200 may include a plurality of electronic devices 202, 204, 206, and/or 208 that support a NAN function. The plurality of electronic devices 202, 204, 206, and/or 208 (e.g., the electronic device 101) included in the NAN cluster 200 may have synchronized time clocks, and may transmit or receive a beacon and a service discovery frame in a synchronized discovery window (DW).

Figure 3:
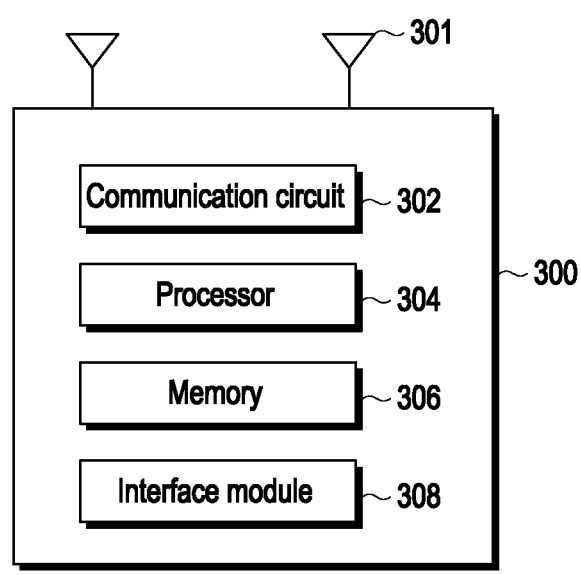
FIG. 3 is a block diagram illustrating an example configuration of a NAN device that performs communication according to various embodiments.

FIG. 3 is a block diagram illustrating an example configuration of a NAN device that performs communication according to various embodiments.

Referring to FIG. 3, a NAN device 300 (e.g., the electronic device 101) may be a communication device that supports a NAN function, and may be, for example, one of the electronic devices 202, 204, 206, and/or 208 illustrated in FIG. 2. The NAN device 300 may include a communication circuit 302 (e.g., the communication module 190 of FIG. 1) which includes a physical layer (PHY) circuit that performs transmission or reception of signals with an external device (peer device) using one or more antennas 301, and a medium access control layer (MAC) circuit. The NAN device 300 may include a processor (e.g., including processing circuitry) 304 (e.g., the processor 120 of FIG. 1) implemented, for example, and without limitation, as one or more uni-core or multi-core processors, and may include a memory 306 (e.g., the memory 130 of FIG. 1) that stores instructions for operating the processor. The NAN device 300 may include an interface module (e.g., including interface circuitry) 308 (e.g., the interface 177 of FIG. 1) that provides a wired and/or wireless interface for performing communication with elements outside a network. At least some of the antenna 301, the communication circuit 302, or the interface module 308 may be implemented as at least part of the communication module 190 and the antenna module 198 of FIG. 1.

The communication circuit 302 and the processor 304 may process various wireless control functions so as to communicate with one or more wireless networks according to one or more wireless technologies. The wireless technologies may include, for example, and without limitation, worldwide interoperability for microwave access (WiMax), Wi-Fi, global system for mobile communications (GSM), enhanced data rates for GSM (EDGE), GSM EDGE radio access network (GERAN), universal mobile telecommunication system (UMTS), UTRAN terrestrial radio access network (UTRAN), 3G, 4G, 5G, or beyond-5G, which were developed or are to be developed in the future.

A discovery window may refer, for example, to a time interval in units of milliseconds in which the NAN device 300 is in a wake state. Although NAN device 300 consumes a large amount of current in the discovery window, the NAN device 300 maintains a sleep state in an interval other than the discovery window, and thus, the NAN device 300 is capable of performing low-power discovery. Therefore, a relatively small amount of current may be consumed and information exchange between devices in a near field may be easily performed, and thus, various application services can be developed.

Figure 4:
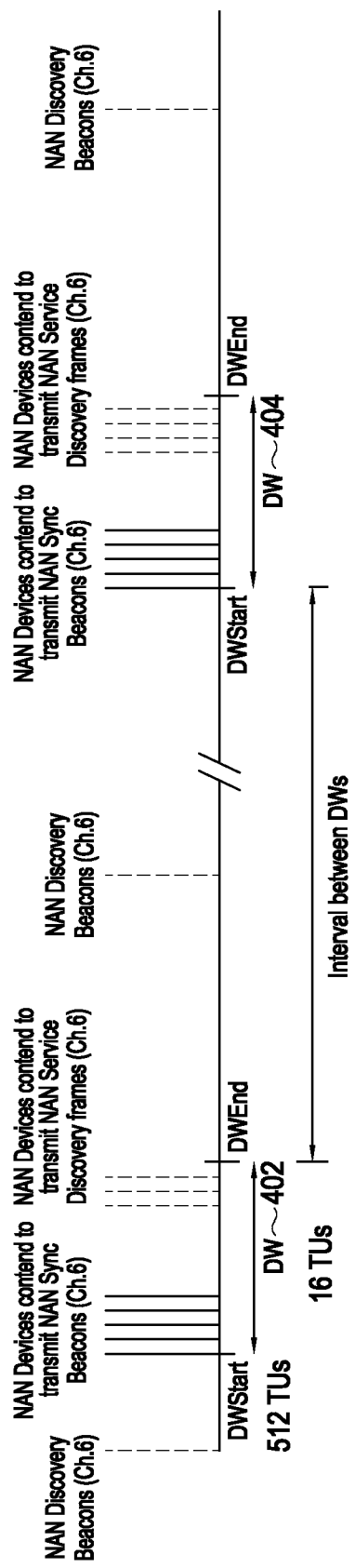
FIG. 4 is a diagram illustrating example discovery windows according to various embodiments.

FIG. 4 is a diagram illustrating example discovery windows according to various embodiments.

Referring to FIG. 4, electronic devices included in a NAN cluster may define discovery windows 402 and 404 based on a predetermined length from a discovery window starting time (DWST). Within the discovery window 402 or 404 activated at an agreed time, an electronic device may transmit a NAN synchronization beacon frame, a service discovery frame (SDF), and/or a NAN action frame (NAN) using, for example, channel #6. The electronic device may transmit at least one synchronization beacon frame within one discovery window 402 or 404. Between the discovery windows 402 and 404, the electronic device may transmit a discovery beacon frame to enable another electronic device to discover a NAN cluster.

Figure 5:
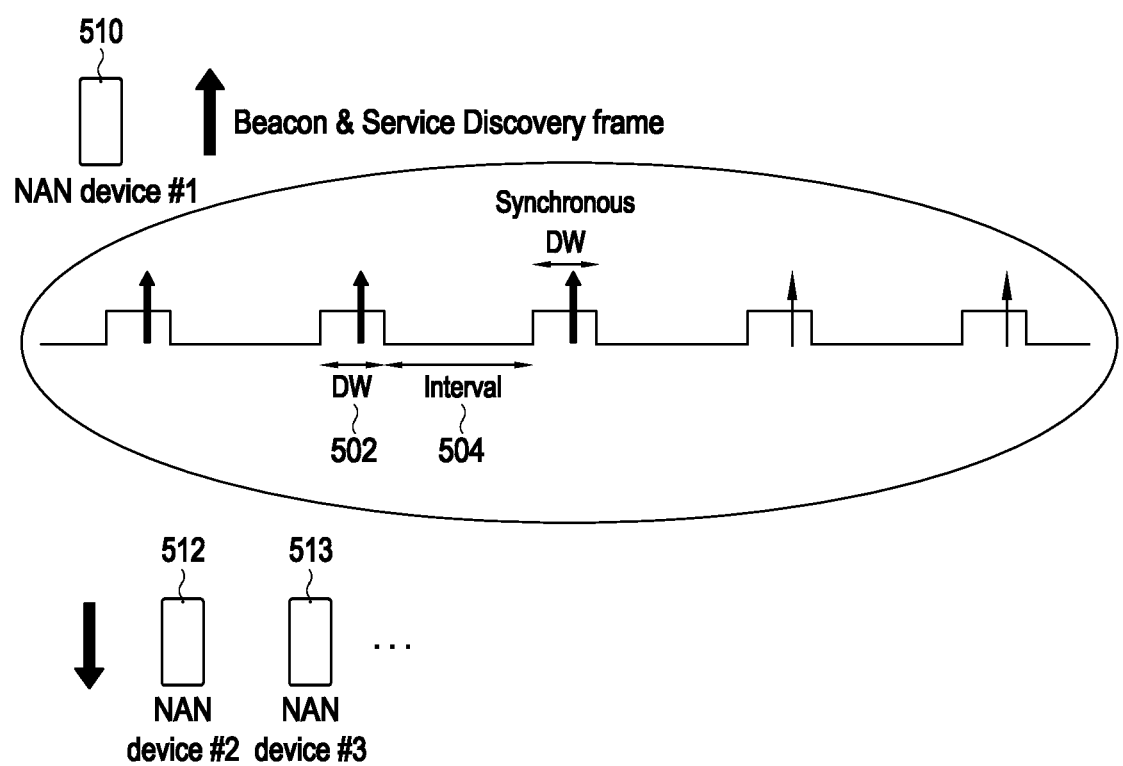
FIG. 5 is a diagram illustrating example neighbor awareness according to various embodiments.

FIG. 5 is a diagram illustrating example neighbor awareness according to various embodiments.

Referring to FIG. 5, NAN device #1 510 (e.g., the electronic device 101) in a NAN cluster may activate a discovery window 502 at an agreed time according to a synchronized time clock in the NAN cluster, and may transmit a synchronization beacon frame and a service discovery frame in the discovery window 502. NAN device #2 512 and NAN device #3 513 existing around (within a given proximity or distance of) the NAN device #1 510 may receive the synchronization beacon frame and the service discovery frame from the NAN device #1 510, may be synchronized with the time clock of the NAN device #1 510, and may obtain NAN parameters of the NAN cluster. In addition, although not illustrated, the NAN device #1 510, the NAN device #2 512, and the NAN device #3 513 may transmit and receive various NAN action frames (NAFs) in the discovery window 502.

The NAN action frames may include NAN data path (NDP) setup frames for performing data communication in an interval 504 between the discovery windows 502, frames for updating a schedule for a NAN operation, and frames for performing NAN ranging of a fine time measurement (FTM) interval. NAN ranging may be a function of measuring the distance between two NAN devices in a NAN cluster.

An electronic device (e.g., the NAN device #1 510) may, for example, and without limitation, autonomously configure additional active time slots in the interval 504 between discovery windows 502 or may configure additional active time slots by negotiating with an external device (e.g., the NAN device #2 512 or the NAN device #3 513), and may perform additional communication during the active time slots. For example, a service discovery function that is not performed during the discovery window 502 may be additionally performed in the interval 504, and the interval 504 may be utilized for designating an operation for, for example, Wi-Fi Direct, mesh, independent basic service set (IBSS), WLAN connection, or may be utilized for performing connection to Legacy Wi-Fi and/or performing discovery. In addition, in order to support ranging between devices via FTM, the electronic device (e.g., the NAN device #1 510) may establish a session for NAN ranging in the discovery window 502, and may define additional time slots which may be used for ranging in the interval 504.

A NAN data path may operate based on non-connection, and may enable data communication within a short setup time, and may also enable data communication flexibly with a large number of electronic devices. The NAN device may define slots to be used as a NAN data path for data transmission by utilizing an interval between discovery windows without a separate connection, and data transmitted via the NAN data path may be encrypted with security.

<Nan Scheduler>

A pair of electronic devices (hereinafter, referred to as NAN devices) that support a NAN function may establish a NAN device link (NDL) which may refer, for example, to resource blocks usable for a NAN operation including data communication. An NDL may include one or more NDPs, and each NDP may refer, for example, to a data access established for a single service instance. Each NDL may have a unique NDL schedule in a NAN cluster, and the NDL schedule may refer to a set of radio resource blocks in which NAN devices related to the NDL awake. A NAN device may include a NAN scheduler that supports a function of controlling an NDL schedule of radio resources for all NAN operations and non-NAN operations. A non-NAN operation may refer, for example, and without limitation, to a WLAN, Wi-Fi direct, IBSS, mobile hotspot, mesh network, or the like, and may be performed concurrently with a NAN operation.

The NAN device may transfer, to neighbor NAN devices, schedule information including available time and band/channel for concurrent operation of a NAN operation and a non-NAN operation. The NAN device may perform communication of frames including NAN availability attributes for supporting a NAN data path, ranging, and/or a non-NAN operation between discovery windows. The NAN availability attributes may be included in management frames such as a beacon frame, a service discovery frame, or a NAN action frame transmitted in a discovery window.

<NAN Availability Attributes>

NAN availability attributes may be used for indicating further available windows (FAWs) that further allocate radio resources for a NAN operation and an non-NAN operation between discovery windows. A single or a series of FAWs may be allocated in units of time slots (or NAN slots) which are radio resource units, and each time slot has a length of 16 time units (TU) (e.g., milliseconds) in the time domain.

Availability attributes that specify an FAW may include a field indicating a channel or frequency band (e.g., 2.4 GHz, 5 GHz, or 6 GHz) in which the FAW is located, and fields that determine the start point of the FAW, a time during which the FAW is maintained, and a periodic interval by which the FAW is repeated.

Table 1 below lists entries of primary fields that define an FAW among NAN availability attributes.

TABLE 1

| Field | Size (octets) | Value |
|---|---|---|
| Attribute ID | 1 | 0x12 |
| Length | 2 | Variable |
| Sequence ID | 1 | Variable |
| Attribute Control | 2 | Variable |
| Availability Entry List | Variable | Variable |

Here, the Attribute ID field identifies the type of a NAN attribute. The Length field indicates the length of following fields (the length in octets of the fields following the length field in the attribute). The Sequence ID field includes an integer value indicating a turn of a related attribute schedule. The Attribute Control field indicates whether a change of a NAN attribute corresponds to committed changed, potential changed, or public availability attribute changed. The Availability Entry List field includes one or more attribute entries indicating an attribute of a NAN device within one or more FAWs. Each attribute entry defines a single or a series of FAWs. A single attribute entry defines the series of FAWs within a time interval that starts from the start point of a previous discovery window, and has, for example, a length of 1 to 512 time slots. The series of FAWs may be present repeatedly.

Table 2 below is an example of the format of an attribute entry.

TABLE 2

| Field | Size (octets) | Value |
|---|---|---|
| Length | 2 | Variable |
| Entry Control | 2 | Variable |
| Time Bitmap Control | 2 | Variable |
| Time Bitmap Length | 1 | Variable |
| Time Bitmap | Variable | Variable |
| Band/Channel Entry List | Variable | Variable |

Here, the Length field indicates the length of following fields (the length of the fields following the Length field in the attribute, in the number of octets). The Entry control field indicates whether a time bitmap is present. The Time Bitmap Control field indicates parameters related to the following Time Bitmap field. The Time Bitmap Length field indicates the length of the following Time Bitmap field. The Time Bitmap field includes a time bitmap corresponding to a time interval indicated by the Time Bitmap control field. The Band/Channel Entry List field may include the list of one or more band entries or channel entries corresponding to a corresponding attribute entry. Here, when each bit of the Time Bitmap field is set to 1, this indicates that a corresponding time interval is available for a NAN operation. When each bit is set to 0, this indicates that a corresponding time interval is unavailable for a NAN operation.

The Band/Channel Entry List field may include one or more band entries, or one or more channel entries. For example, the value of each band entry which may be included in a NAN availability attribute may be defined based on a band ID as listed in Table 3 below.

TABLE 3

| Band ID | Meaning |
| --- | --- |
| 0 | Reserved (for TV white spaces) |
| 1 | Sub-1 GHz (excluding TV white spaces) |
| 2 | 2.4 GHz |
| 3 | Reserved (for 3.6 GHz) |
| 4 | 4.9 and 5 GHz |
| 5 | Reserved (for 60 GHz) |
| 6-255 | Reserved |

A band entry defined based on the band ID of Table 3 may determine a frequency band (e.g., 2.4 GHz or 5 GHz) that is desired to be used as an FAW Although not listed in Table 3, a frequency band of 6 GHz may be further used in addition to 2.4 GHz or 5 GHz. For example, if the 6 GHz frequency band is used, one of 6 to 255, which are reserved areas, may be used.

Table 4 below shows an example of the format of a channel entry indicating information associated with a channel desired to be used for an FAW.

TABLE 4

| Field | Size (octets) | Value |
| --- | --- | --- |
| Operating Class | 1 | Variable |
| Channel Bitmap | 2 | Variable |
| Primary Channel Bitmap | 1 | Variable |
| Auxiliary Channel Bitmap | 2 | Variable |

Here, the Operating Class field may indicate a global operating class defined in advance. The Channel Bitmap field may designate channels corresponding to a predetermined operating class. The Primary Channel Bitmap field may designate preferred channels. The Auxiliary Channel Bitmap field may designate available channels for a selected operating class (possible channels within the operating class is selected) when a discontinuous bandwidth is set.

Table 5 below shows an example of the format of the above-described Time Bitmap Control field.

TABLE 5

| Bit(s) | Field |
| --- | --- |
| 0-2 | Bit Duration |
| 3-5 | Period |
| 6-14 | Start Offset |
| 15 | Reserved |

Here, bits 0 to 2 indicate a time interval desired to be used as an FAW as 16 TU, 32 TU, 64 TU, or 126 TU (16 TU is a single time slot). Bits 3 to 5 indicate a periodic interval of a time bitmap as 128 TU, 256 TU, 512 TU, 1024 TU, 2048 TU, 4096 TU, or 8192 TU. Bits 6 to 14 indicate a start offset indicating the number of TUs aligned from a first discovery window up to the start of the time interval, indicated by the time bitmap.

As described in the above-mentioned attributes and fields, FAWs which may be used for NAN data communication may be scheduled based on channel or band information, a start offset, a bit duration of a time bitmap, and a periodic interval of a time bitmap.

In addition, various FAWs may be configured via a combination of a plurality of NAN availability attributes.

FIGS. 6A, 6B, 6C and 6D are diagrams illustrating examples of FAWs configured based on the configurations of NAN availability attributes according to various embodiments.

Figure 6A:
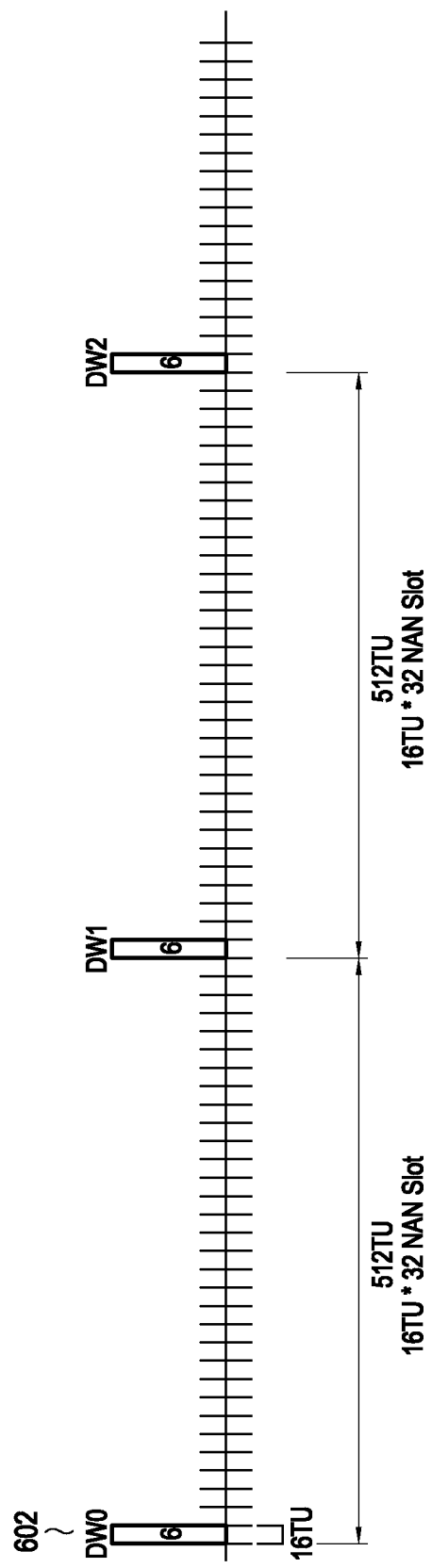
FIGS. 6A, 6B, 6C and 6D are diagrams illustrating examples of further available windows (FAWs) configured based on the configurations of NAN availability attributes according to various embodiments.

Referring to FIG. 6A, the interval between discovery windows 602 (e.g., DW1, DW2, or DW3) may be 512 TU (=16 TU*32 NAN slot), NAN availability attributes for a NAN operation are not configured between the discovery windows 602, and a NAN device may maintain a sleep state between the discovery windows 602.

Figure 6B:
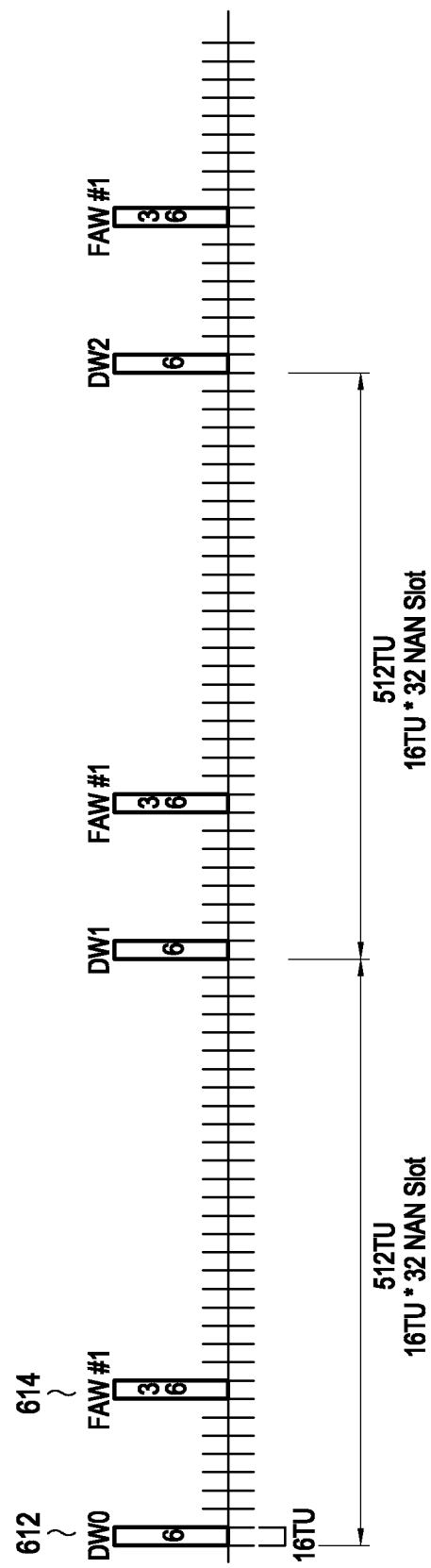

Referring to FIG. 6B, FAW #1 614 is configured based on NAN availability attribute #1 between the discovery windows 612 (e.g., DW1, DW2, or DW3). FAW #1 614 may, for example, be defined to have channel #36, a start offset of 8, a bit duration of 16 TU, and a periodic interval of 512 TU.

Figure 6C:
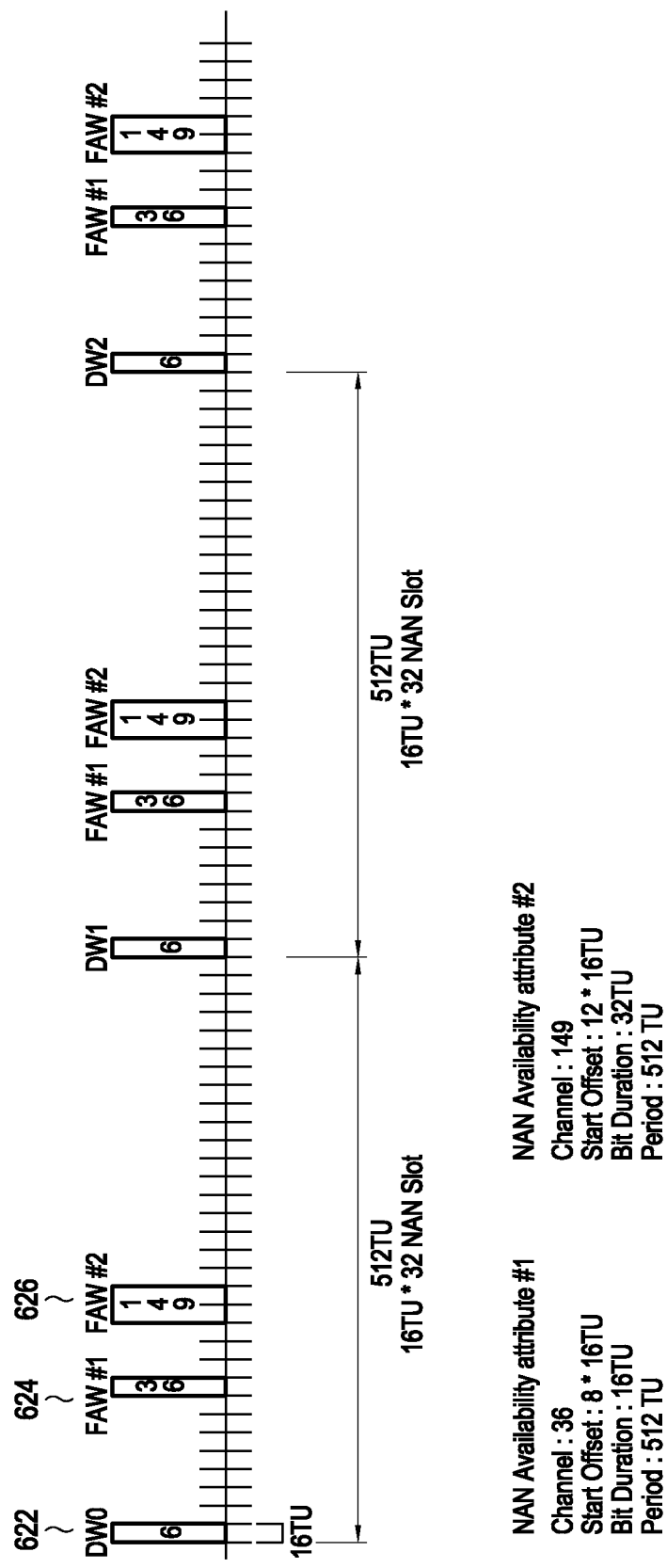

Referring to FIG. 6C, FAW #1 624 and FAW #2 626 based on NAN availability attributes #1 and #2 are configured between the discovery windows 622 (e.g., DW1, DW2, or DW3). FAW #1 624 may, for example, be defined to have channel #36, a start offset of 8*16 TU, a bit duration of 16 TU, and a periodic interval of 512 TU, and FAW #2 626 may be defined to have channel #149, a start offset of 12*16 TU, a bit duration of 32 TU, and a periodic interval of 512 TU.

Figure 6D:
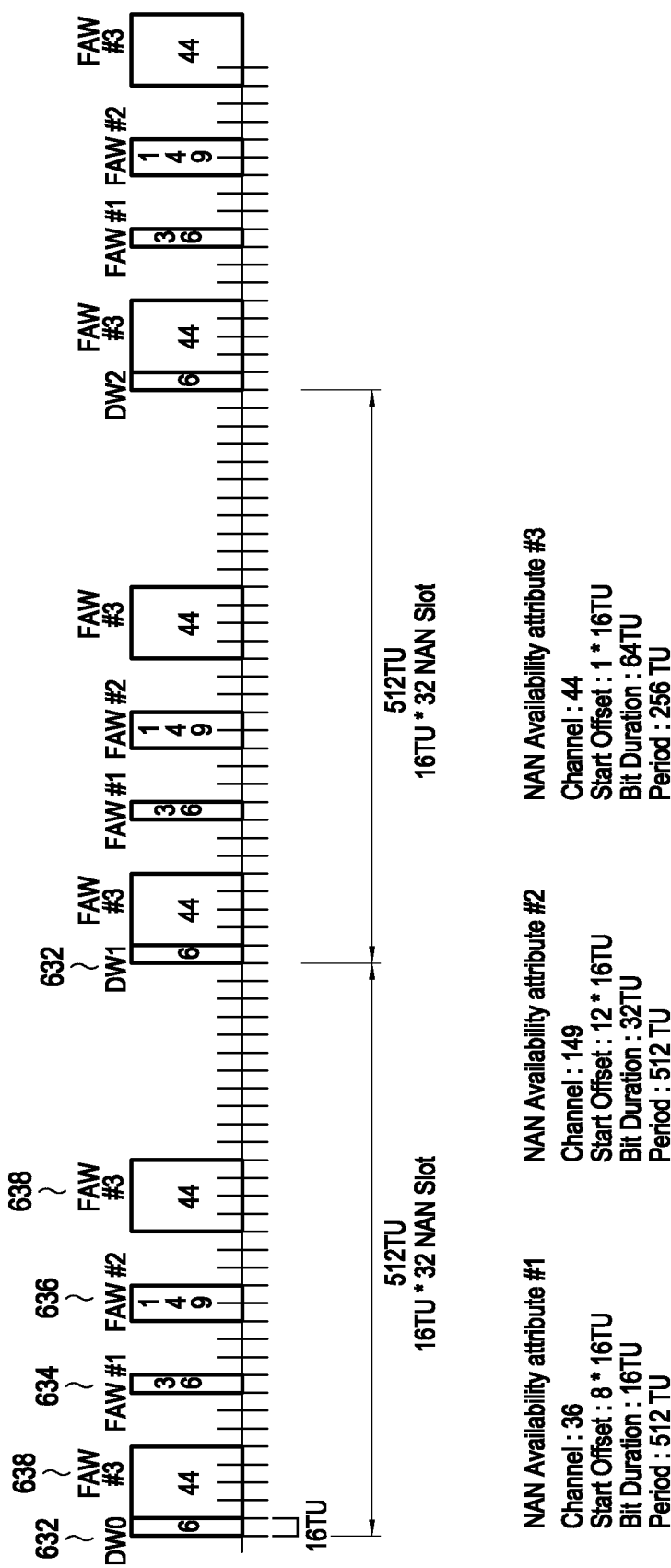

Referring to FIG. 6D, FAW #1 634, FAW #2 636, and FAW #3 638 based on NAN availability attributes #1, #2, and #3 are configured between the discovery windows 632 (e.g., DW1, DW2, or DW3). FAW #1 634 may be defined to have channel #36, a start offset of 8*16 TU, a bit duration of 16 TU, and a periodic interval of 512 TU, FAW #2 636 may be defined to have channel #149, a start offset of 12*16 TU, a bit duration of 32 TU, and a periodic interval of 512 TU. FAW #3 638 may be defined to have channel #44, a start offset of 1*16 TU, a bit duration of 64 TU, and a periodic interval of 256 TU.

<Non-NAN Operation and Unaligned Scheduled Attribute>

A NAN device may use unaligned scheduled attributes for configuring unaligned windows (ULWs) so as to allocate a radio resource for a non-NAN operation (e.g., Bluetooth, Wi-Fi, or Wi-Fi direct) between discovery windows. The unaligned scheduled attributes may be included in NAN management frames such as a beacon frame, a service discovery frame, and a NAN action frame.

A ULW may refer, for example, to a time interval in units of microseconds, and may be scheduled between discovery windows. If the schedule of a ULW and the schedule of an FAW overlap, the ULW may have a higher priority than the FAW. Attributes that specify a ULW may include a field that performs configuration so that a NAN operation is not performed during the ULW and a field indicating a channel or a frequency band (e.g., 2.4 GHz, 5 GHz, or 6 GHz) where the ULW is located.

Table 6 below lists primary fields that define a ULW.

TABLE 6

| Field | Size (octets) | Value |
| --- | --- | --- |
| Attribute ID | 1 | 0x17 |
| Length | 2 | Variable |
| Attribute Control | 2 | Variable |
| Starting Time | 4 | Variable |
| Duration | 4 | Variable |
| Period | 4 | Variable |

TABLE 6-continued

| Field | Size (octets) | Value |
|---|---|---|
| Count Down | 1 | Variable |
| ULW Overwrite | 1 | Variable |
| ULW Control | 0 or 1 | 1 Variable |
| Band ID or Channel Entry | Variable | Variable |

Here, the Attribute ID field identifies the type of NAN attribute. The Length field indicates the length of following fields (the length of the following fields in the attribute). The Attribute Control field identifies a related unaligned schedule. The Starting Time field indicates the start point of a first ULW. The Duration field indicates a duration time of each ULW. The Period field indicates a time interval between consecutive ULWs. The Count Down field indicates the number of indicated ULWs. The ULW Overwrite field indicates whether an unaligned schedule takes precedence over NAN availability attributes. The ULW Control field indicates whether a NAN device is available during all ULWs. The Band ID or Channel Entry field includes a band ID or channel entry related to a corresponding ULW.

ULWs may be further configured based on unaligned scheduled attributes in addition to the above-described FAWs configured based on NAN availability attributes.

Figure 7A:
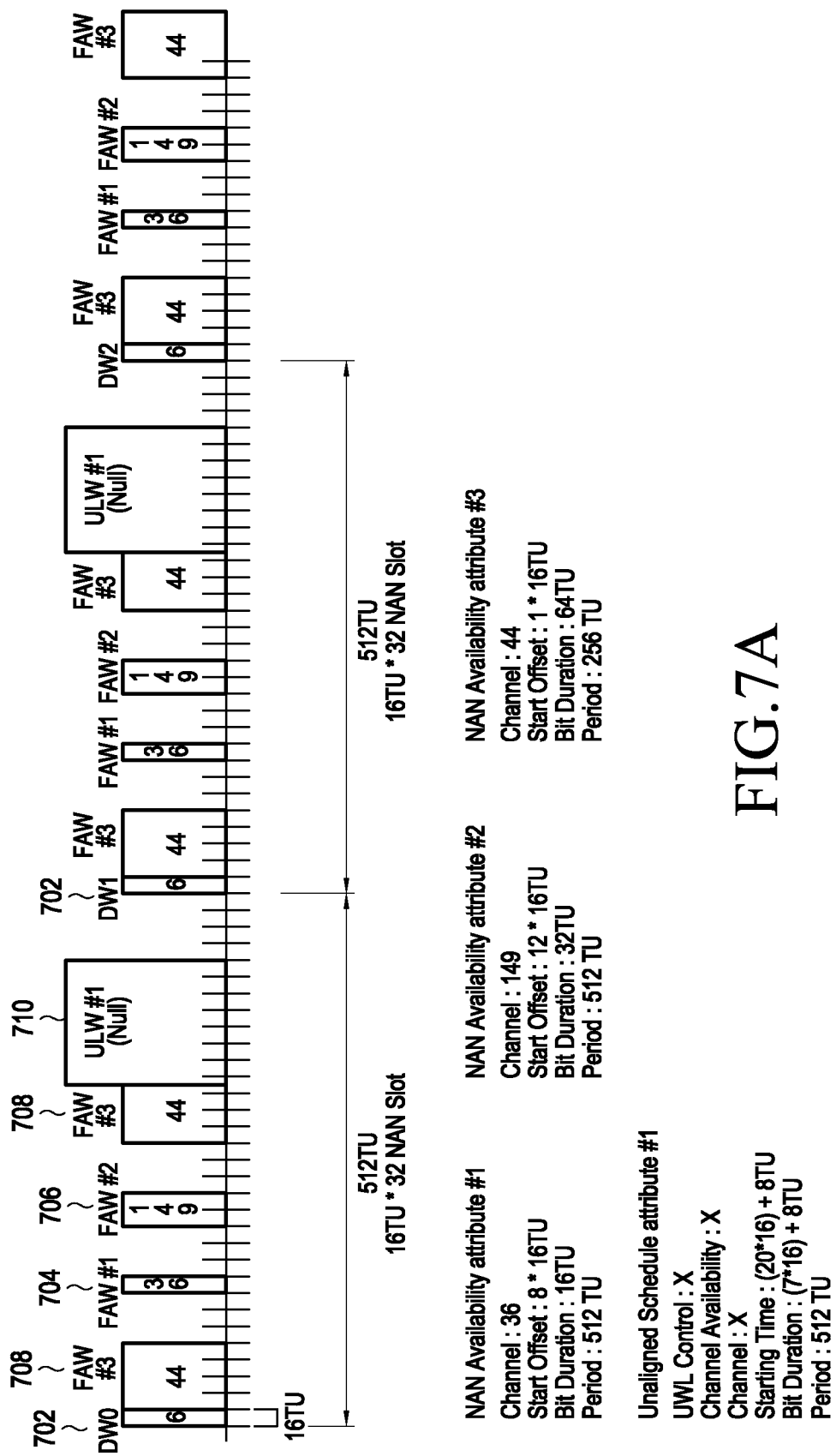
FIGS. 7A, 7B and 7C are diagrams illustrating examples of FAWs based on NAN availability attributes and unaligned windows (ULWs) based on unaligned scheduled attributes according to various embodiments.
Figure 7B:
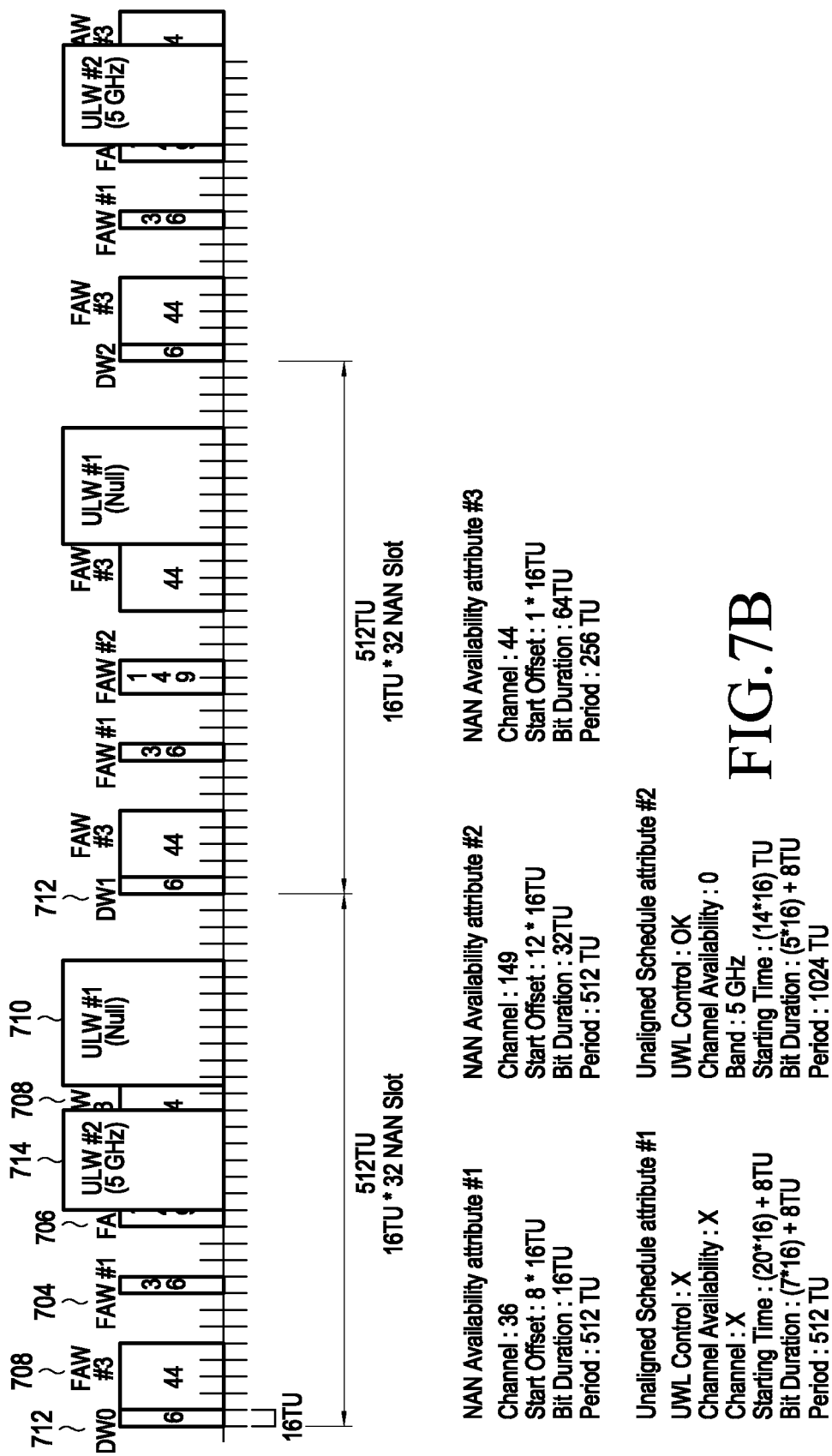
Figure 7C:
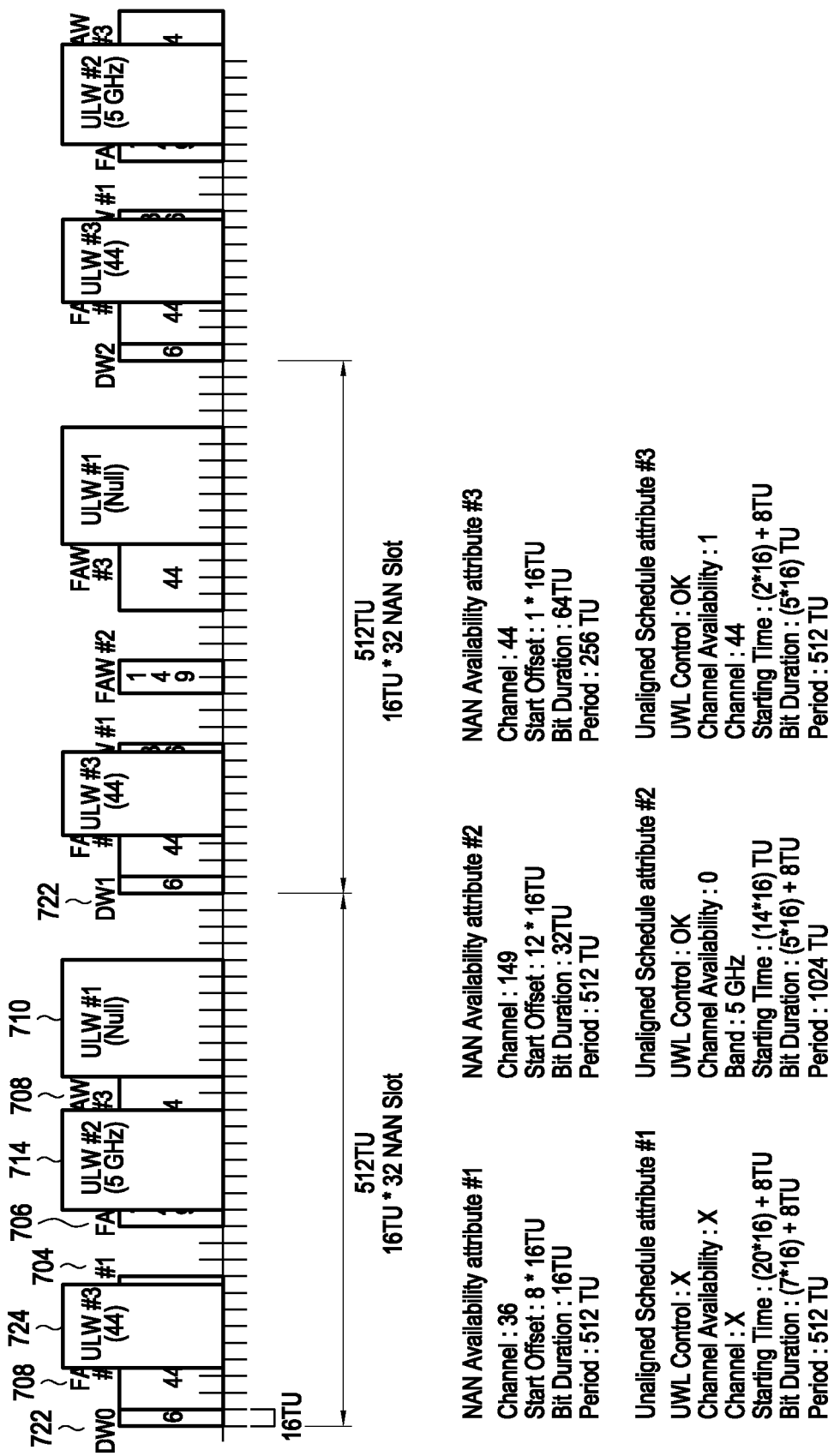

FIGS. 7A, 7B and 7C are diagrams illustrating examples of FAWs based on NAN availability attributes and ULWs based on unaligned scheduled attributes. In FIGS. 7A, 7B and 7C, FAW #1 704, FAW #2 706, and FAW #3 708 configured between discovery windows 702, 712, and 722 are identical or similar to the FAWs which have been described in FIG. 6D. As illustrated in the drawing, FAWs 704, 706, and 708 may be configured based on a time slot including 16 TU.

Referring to FIG. 7A, ULW #1 710 based on unaligned scheduled attribute #1 is configured between the discovery windows 702, and the ULW #1 710 may, for example, be defined to have a start point of (20*16)+8 TU, a bit duration of (7*16)+8 TU, and a period interval of 512 TU, but does not have a channel availability.

Referring to FIG. 7B, ULW #1 710 based on unaligned scheduled attribute #1 and ULW #2 714 based on unaligned scheduled attribute #2 may be configured between the discovery windows 712. The configuration of the ULW #1 710 is as shown in FIG. 7A. The ULW #2 714 may, for example, be defined to have a start point of (14*16) TU, a bit duration of (5*16)+8 TU, and a periodic interval of 1024 TU, a channel availability is set to 0, and the 5 GHz frequency band may be used.

Referring to FIG. 7C, ULW #1 710 based on unaligned scheduled attribute #1, ULW #2 714 based on unaligned scheduled attribute #2, and ULW #3 724 based on an unaligned scheduled attribute #3 are configured between discovery windows 722 (e.g., DW0, DW1, or DW2). The configuration of the ULW #1 710 and ULW #2 714 are as shown in FIGS. 7A and 7B. The ULW #3 724 may, for example, be defined to have a start point of (2*16)+8 TU, a bit duration of (5*16) TU, and a periodic interval of 512 TU, a channel availability is set to 1, and channel #44 may be used.

<Schedule Update>

A NAN device may establish and update a schedule including various combinations of FAWs and ULWs based on one or more NAN availability attributes and one or more unaligned scheduled attributes.

Figure 8:
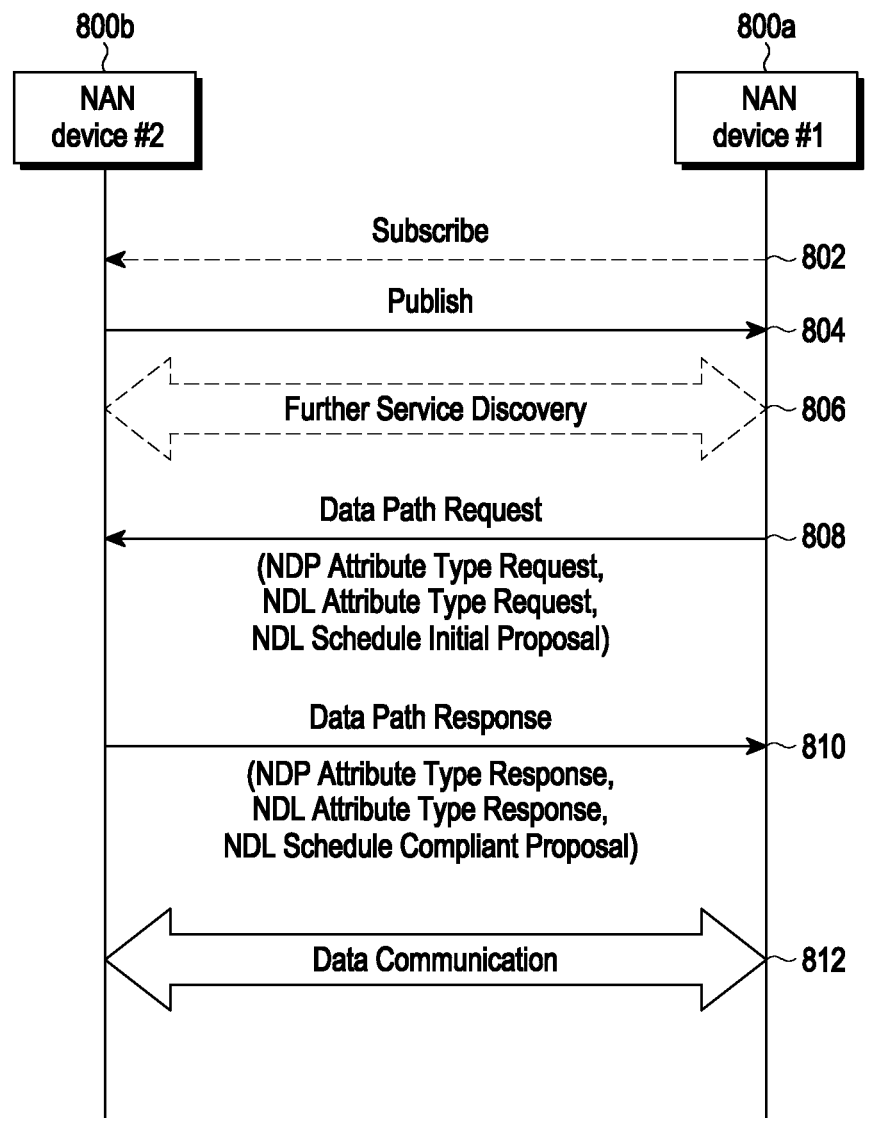
FIG. 8 is a message flow diagram illustrating an example procedure of establishing a schedule of a NAN data path according to various embodiments.

FIG. 8 is a message flow diagram illustrating an example procedure of establishing a schedule of a NAN data path according to various embodiments. NAN device #1 800*a* which desires to set up a NAN data path may operate as an NDP/NDL initiator, and NAN device #2 800*b* may operate as an NDP/NDL responder.

Referring to FIG. 8, in operation 802, the NAN device #1 800*a* (e.g., the electronic device 101) may transmit a subscribe message to the NAN device #2 800*b* (e.g., the electronic device 102) in order to request transmission of a publish message. The subscribe message may include information associated with a supportable service and a supportable scheduling scheme of the NAN device #1 800*a*. In operation 804, the NAN device #2 800*b* may transmit a publish message to the NAN device #1 800*a* in response to the subscribe message from the NAN device #1 800*a*, or solely without reception of the subscribe message. The publish message may include information associated with a supportable scheduling scheme of the NAN device #2 800*b*. The NAN device #1 800*a* and the NAN device #2 800*b* may recognize a supportable service and a supportable scheduling scheme of each other in operations 802 and 804, which may be referred to, for example, as capability exchange.

In operation 806, the NAN device #1 800*a* and the NAN device #2 800*b* may perform an additional service discovery procedure, as needed.

In operation 808, the NAN device #1 800*a* may transmit a data path request frame that requests data transmission to the NAN device #2 800*b*. The data path request frame may include, for example NDP Attribute Type Request, NDL Attribute Type Request, NDL Schedule Initial Proposal, or the like. In operation 810, the NAN device #2 800*b* may transmit a data path response frame to the NAN device #1 800*a*. The data path response frame may include, for example, NDP Attribute Type Response, NDL Attribute Type Response, NDL Schedule Compliant Proposal, or the like. The data path request frame may include, for example an NDP attribute type of the "request" (e.g., referred to as "NDP Attribute Type Request"), an NDL attribute type of the "request" (e.g., referred to as "NDL Attribute Type Request"), and/or an NDL schedule initial proposal. The data path response frame may include, for example, an NDP attribute type of the "response" (e.g., referred to as "NDP Attribute Type Response), an NDL attribute type of the "response" (e.g., referred to as "NDL Attribute Type Response"), and/or an NDL schedule compliant proposal. If the NDP/NDL schedule is established in operations 808 and 810, data communication may be performed according to the NDP/NDL schedule in operation 812.

The NDL schedule initial proposal in operation 808 may include a NAN availability attribute and an unaligned scheduled attribute configured by the NAN device #1 800*a*. The NAN availability attribute may include schedule information indicating a time bitmap and a band/channel entry of a time interval which may be used for an FAW, and the unaligned scheduled attribute may include schedule information indicating a time bitmap and a band/channel entry of a time interval which may be used for a ULW. In operation 810, if the NAN device #2 800*b* determines to accept configuration of an NDL schedule via the NDL schedule initial proposal, the NAN device #2 800*b* may transmit the data path response frame including the NDL schedule compliant proposal to the NAN device #1 800*a*.

In this instance, the NAN device #2 800*b* may reconfigure an NDL schedule by changing the NDL schedule initial proposal to be appropriate for its own standard, may include the NDL schedule compliant proposal including the reconfigured NDL schedule in the data path response frame, and may transmit the same to the NAN device #1 800a. The NAN device #1 800a may finally determine a NLD schedule via the NDL schedule compliant proposal.

If the NDL schedule initial proposal is invalid for the NAN device #2 800b or conflicts with the NDL schedule proposed by the NAN device #2 800b, the NAN device #2 800b may refuge the NDL schedule initial proposal and may perform negotiation associated with an FAW schedule by proposing a new NDL schedule.

Figure 9:
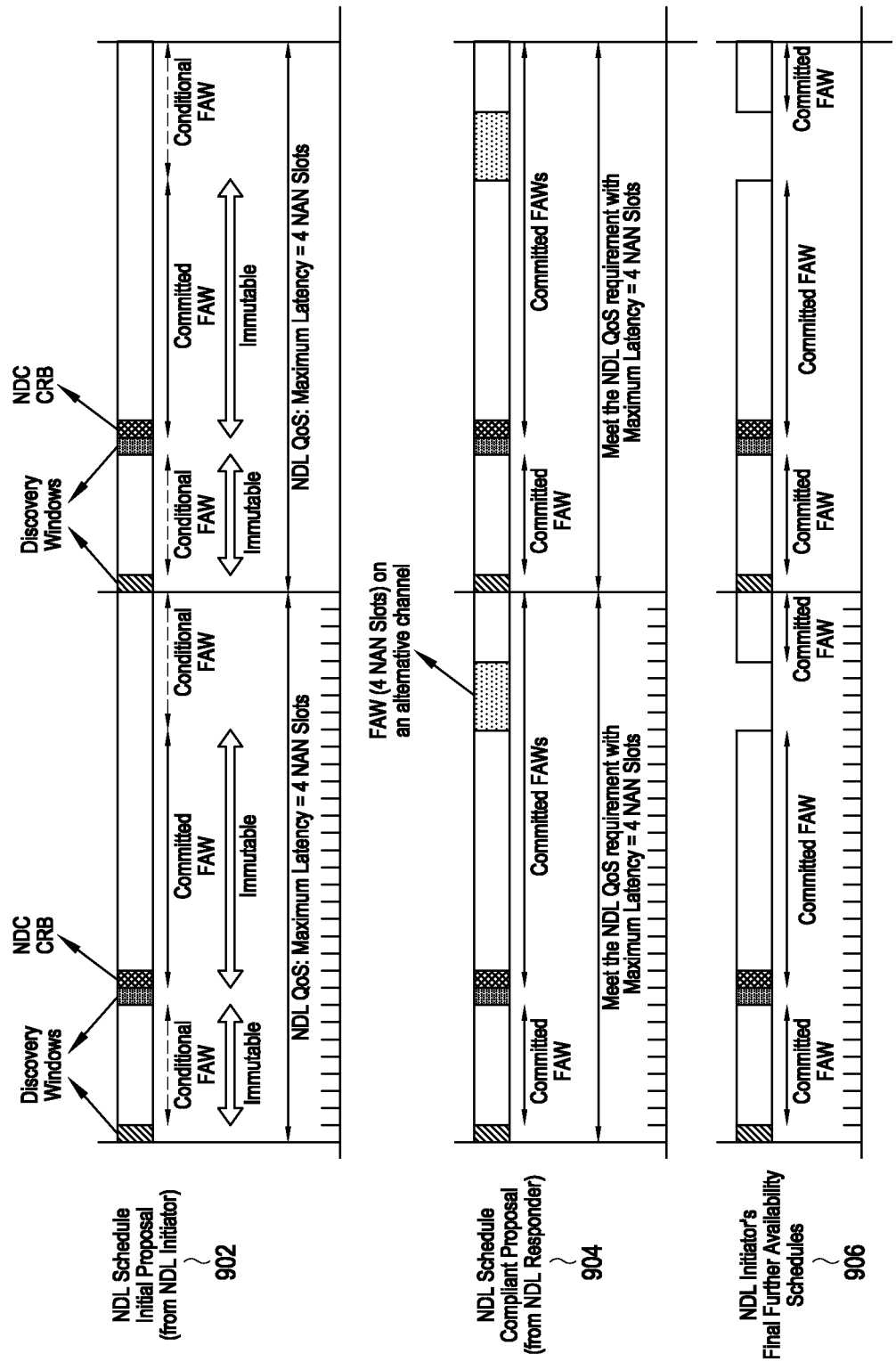
FIGS. 9 and 10 are diagrams illustrating an example procedure of performing negotiation associated with an FAW schedule between NAN devices according to various embodiments.
Figure 10:
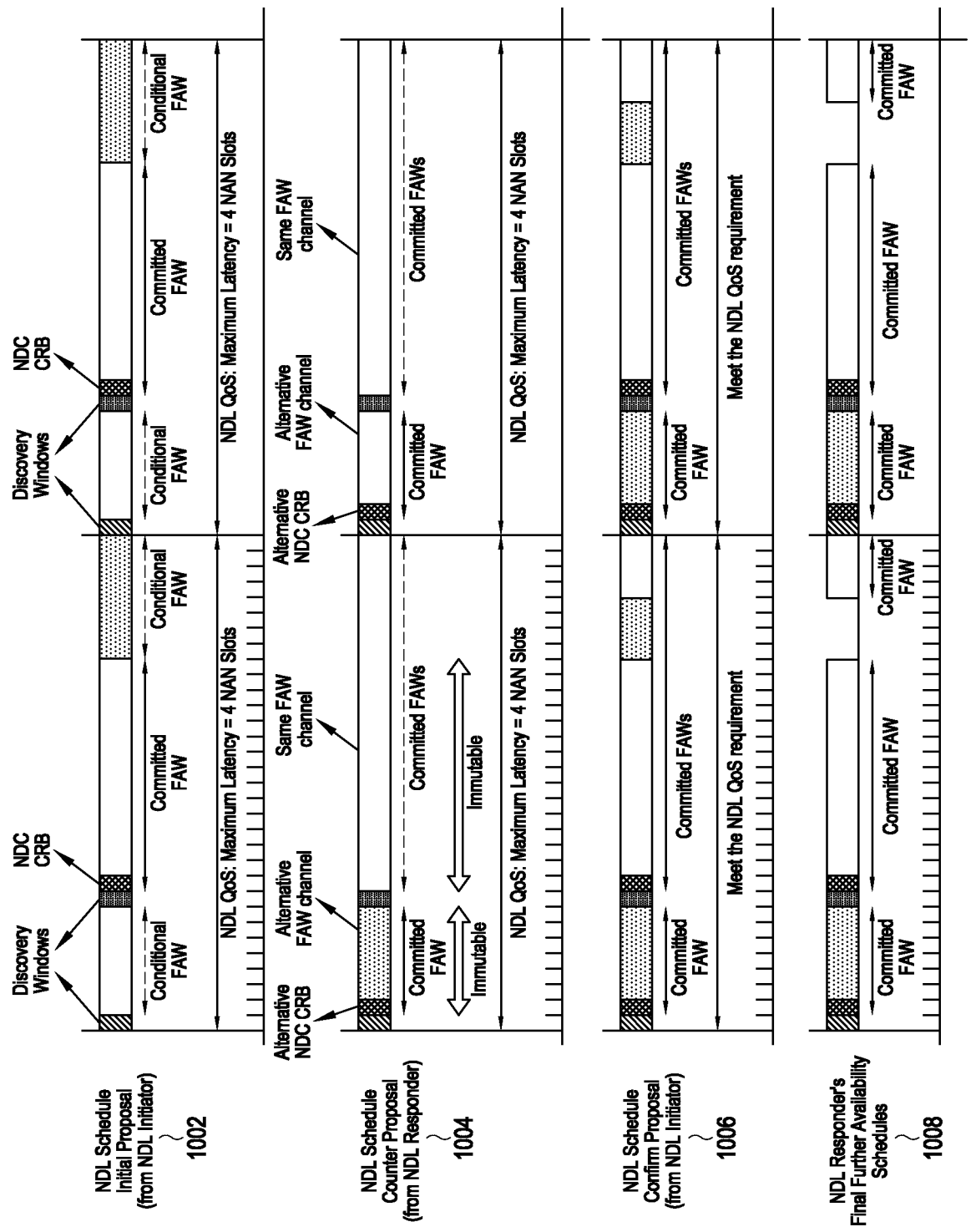

FIGS. 9 and 10 are diagrams illustrating an example procedure of performing negotiation associated with an FAW schedule between NAN devices according to various embodiments.

Referring to FIG. 9, in an NDL schedule initial proposal 902, an NDL initiator may indicate time intervals which may be committed or conditional FAWs. In an NDL schedule compliant proposal 904, an NDL responder may indicate time intervals which may be committed or conditional FAWs. The NDL initiator and NDL responder may finally determine a further availability schedule 906 including committed FAWs in consideration of the NDL schedule initial proposal 902 and the NDL schedule compliant proposal 904.

Referring to FIG. 10, in an NDL schedule initial proposal 1002, an NDL initiator may indicate time intervals which may be committed or conditional FAWs. An NDL responder may provide an NDL schedule counter proposal 1004 indicating time intervals which may be committed or conditional FAWs. In an NDL schedule confirm proposal 1006, an NDL initiator may indicate time times which may be committed or conditional FAWs in consideration of the NDL schedule counter proposal 1004. The NDL initiator and NDL responder may finally determine a further availability schedule 1008 including committed FAWs in consideration of the NDL schedule counter proposal 1004 and the NDL schedule confirm proposal 1006.

<Multiple Frequency Bands>

The NAN standard may simultaneously support an additional frequency band having a different coverage area (e.g., a higher frequency band such as 6 GHz or 60 GHz), in addition to existing frequency bands defined in Table 3, such 2.4 GHz, 4.9 GHz, or 5 GHz. For example, the use of the 6 GHz frequency band may have following advantages when compared to the existing 5 GHz frequency band.

1. A bandwidth of 80 MHz is used in the 5 GHz frequency band but a bandwidth in the range of 160 to 320 MHz is used in the 6 GHz frequency band, and thus, the performance may be excellent in the 6 GHz frequency band.

2. A channel state in the 6 GHz frequency band may be cleaner than a channel state in the 5 GHz frequency band, and may highly secure signal transmission and provide more excellent performance.

In Wi-Fi IEEE 802.11ax, a data rate indicating system throughput may be depending on modulation and coding schemes for each spatial stream, the bandwidth of each channel, and the length of a guard interval (GI). At least one of binary phase shifting keying (BPSK), quadrature PSK (QPSK), 16-ary quadrature amplitude modulation (16-QAM), 64-QAM, 126-QAM, or 1024-QAM may be used as the modulation scheme. At least one of 1/2, 3/4, 2/3, 3/4, or 5/6 may be used as the coding rate. At least one of 20 MHz, 40 MHz, 80 MHz, or 160 MHz may be used as a channel bandwidth. 1600 ns or 800 ns may be used as the length of a GI for each channel bandwidth. For example, if the modulation type is 1024-QAM and the coding rate is 5/6, a data rate for two spatial streams that use channels of 80 MHz bandwidth may be 1200.9 Mbps. In the same or similar manner, if the modulation type is 1024-QAM and the coding rate is 5/6, expected data rates for two spatial streams that use channels of 160 MHz and 320 MHz bandwidths may be 2401.8 Mbps and 4803.6 Mbps.

The 5 GHz frequency band uses a bandwidth of 80 MHz and the 6 GHz frequency band uses a bandwidth of 160 MHz and a bandwidth of 320 MHz, and thus, the 6 GHz frequency band may be advantageous from the perspective of data rate capability.

The output power of a predetermined frequency band may be classified as below.

(1) SP (Standard Power): a maximum of 30 dBm
(2) LPI (Low Power Indoor): a maximum of 24 dBm
(3) VLP (Very Low Power): a maximum of 14 dBm For example, in the 6 GHz frequency band, an LPI and a VLP may be used. The output power of the 6 GHz frequency band may be lower than an SP in the 5 GHz frequency band.

The output power is different between the 5 GHz frequency band and the 6 GHz frequency band, and thus, the coverage area of the 5 GHz frequency band and the 6 GHz frequency band may be different.

FIGS. 11A, 11B, 11C and 11D are diagrams illustrating example coverage areas based on output power of the 6 GHz frequency band according to various embodiments.

Figure 11A:
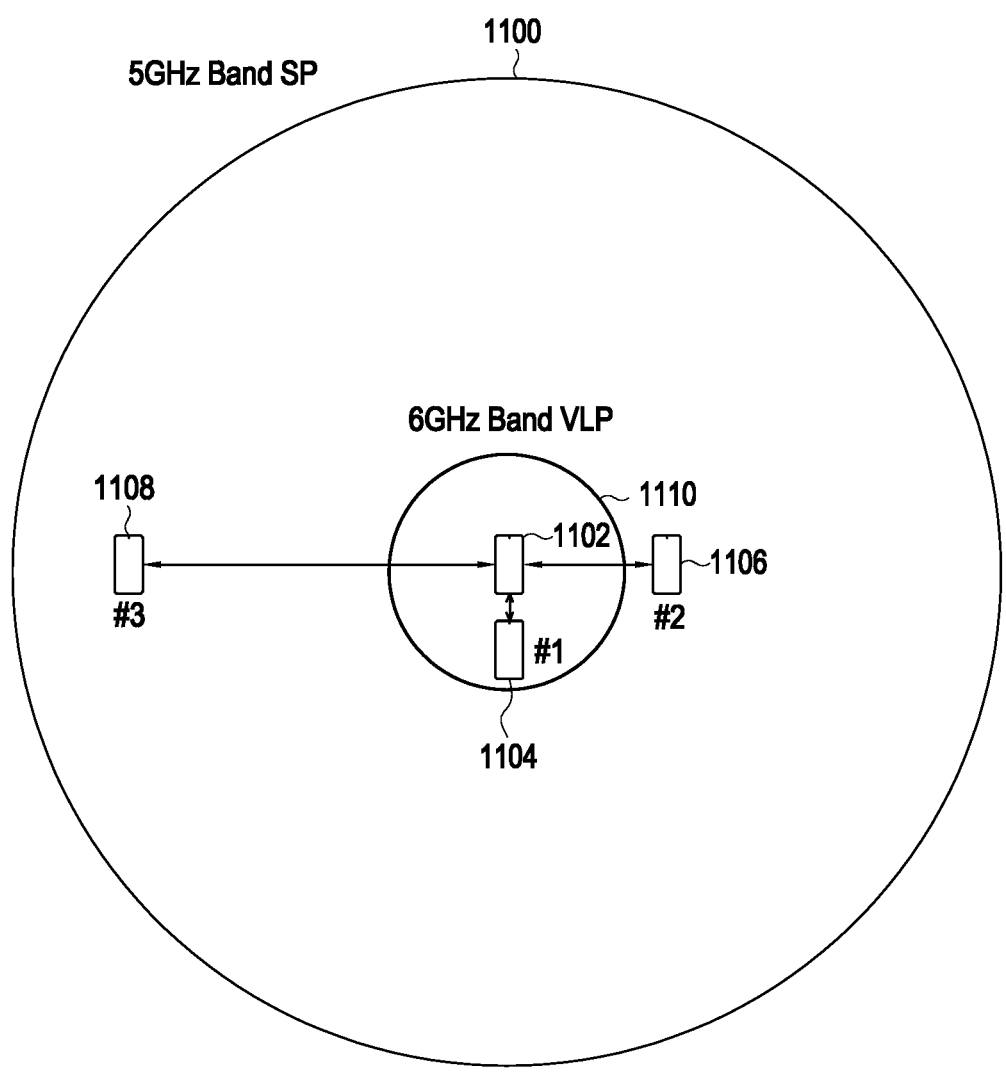
FIGS. 11A, 11B, 11C and 11D are diagrams illustrating example coverage areas based on output power of the 6 GHz frequency band according to various embodiments.

Referring to FIG. 11A, a coverage area 1110 of the 6 GHz band that uses a VLP may be smaller than a coverage area 1100 of the 5 GHz band that uses an SP. If a NAN device 1102 (e.g., the electronic device 101 of FIG. 1) which builds the coverage areas 1100 and 1110 based on a NAN function desires to perform NDP communication with NAN device #1 1104 located in the coverage area 1110 of the 6 GHz band, configuring an NDP of the 6 GHz frequency band may be more advantageous from the perspective of performance than configuring an NDP of the 5 GHz frequency band. Conversely, if the NAN device 1102 desires to perform NDP communication with NAN device #2 1106 or NAN device #3 1108 located outside the coverage area 1110 of the 6 GHz band, the NDP of the 5 GHz frequency band needs to be configured in order to enable communication.

Figure 11B:
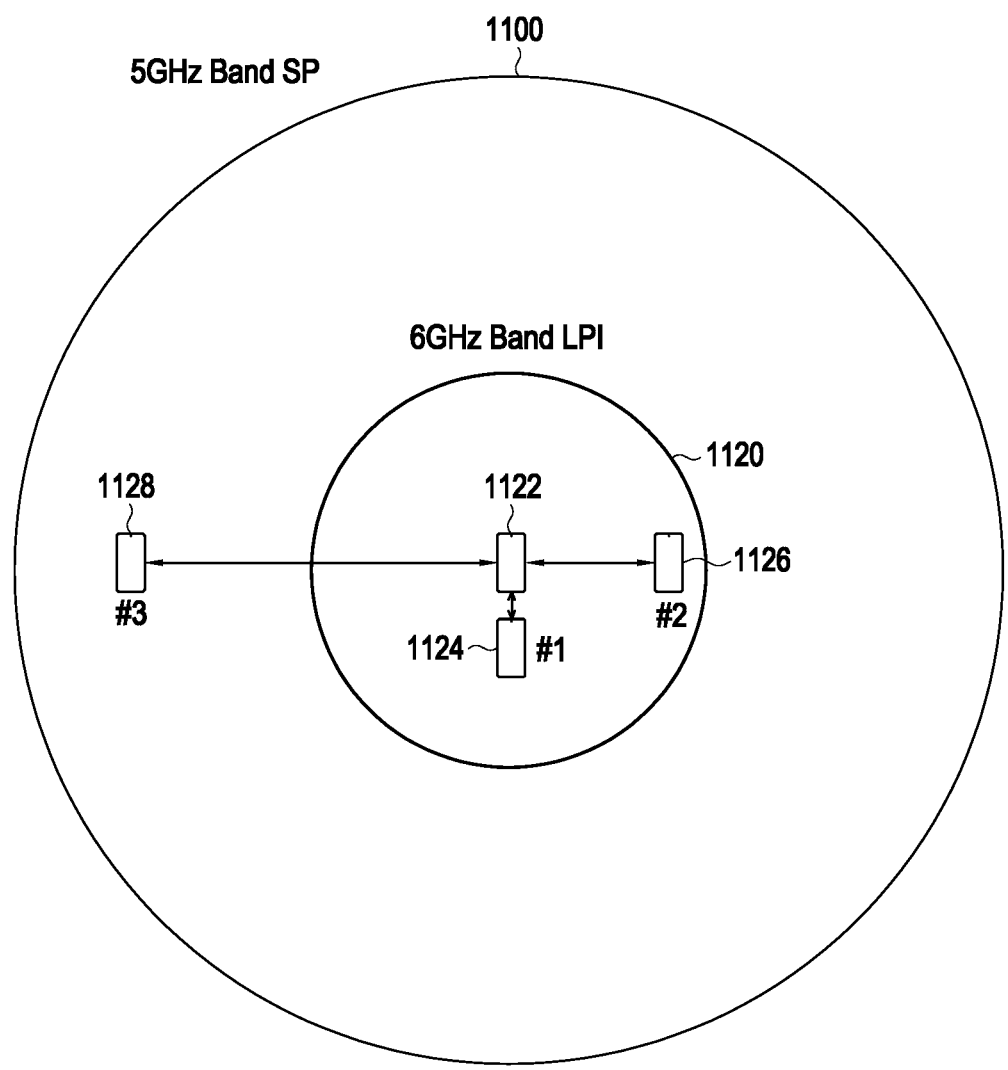

Referring to FIG. 11B, a coverage area 1120 of the 6 GHz that uses an LPI may be smaller than the coverage area 1100 of the 5 GHz band that uses an SP. If a NAN device 1122 desires to perform NDP communication with device #1 1124 or device #2 1126 located inside a coverage area 1120 of the 6 GHz band, configuring the NDP of the 6 GHz frequency band may be more advantageous from the perspective of performance than configuring the NDP of the 5 GHz frequency band. Conversely, if the NAN device 1122 desires to perform NDP communication with NAN device #3 1128 located outside the coverage area 1120 of the 6 GHz band, the NDP of the 5 GHz frequency band needs to be configured in order to enable communication.

Figure 11C:
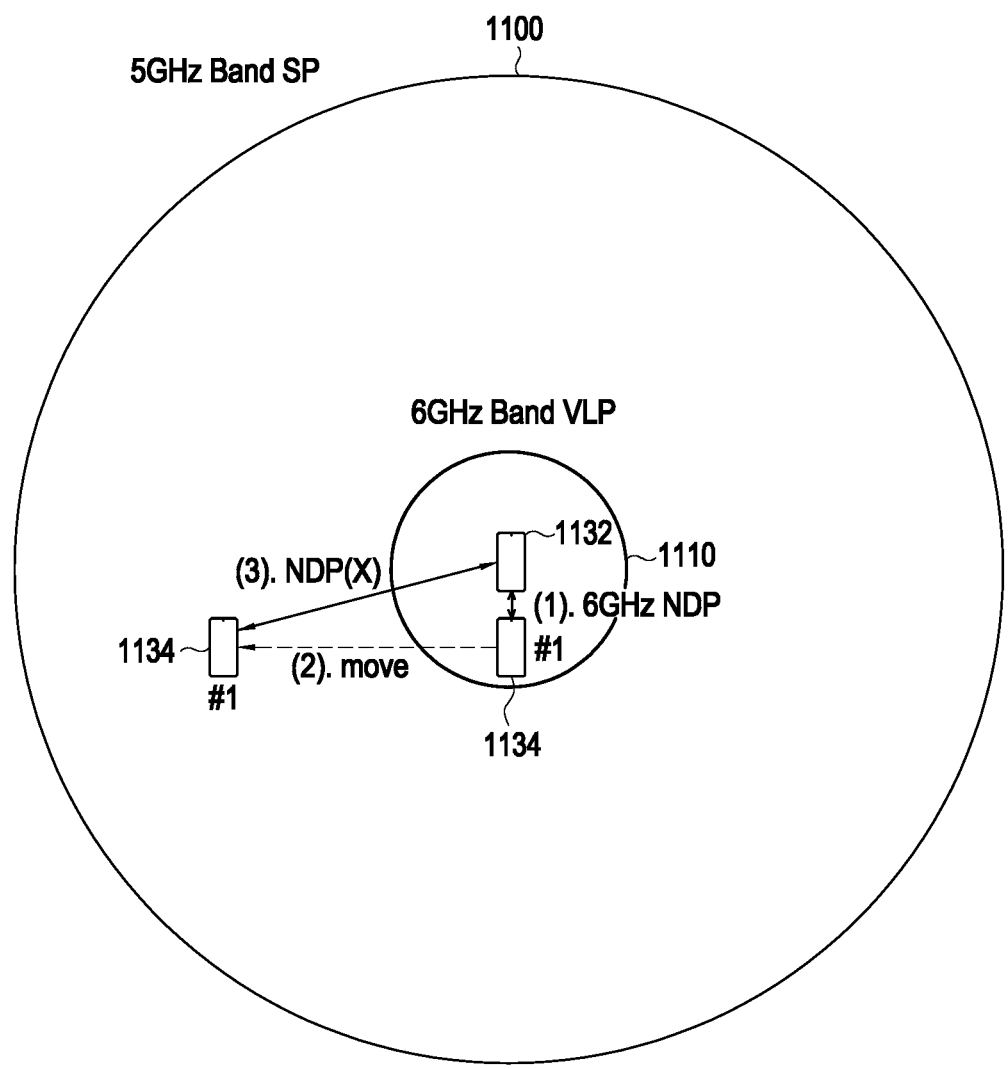

Referring to FIG. 11C, while a NAN device 1132 is performing data communication with NAN device #1 1134 located at a first point in the coverage area 1110 of the 6 GHz band via an NDP of the 6 GHz band (1), if the NAN device #1 1134 moves to a second point outside the coverage area 1110 of the 6 GHz band (2), and if the NDP of the 6 GHz band is maintained, NDP communication between the NAN device 1132 and the NAN device #1 1134 located at the second point may be abnormally performed (3).

Figure 11D:
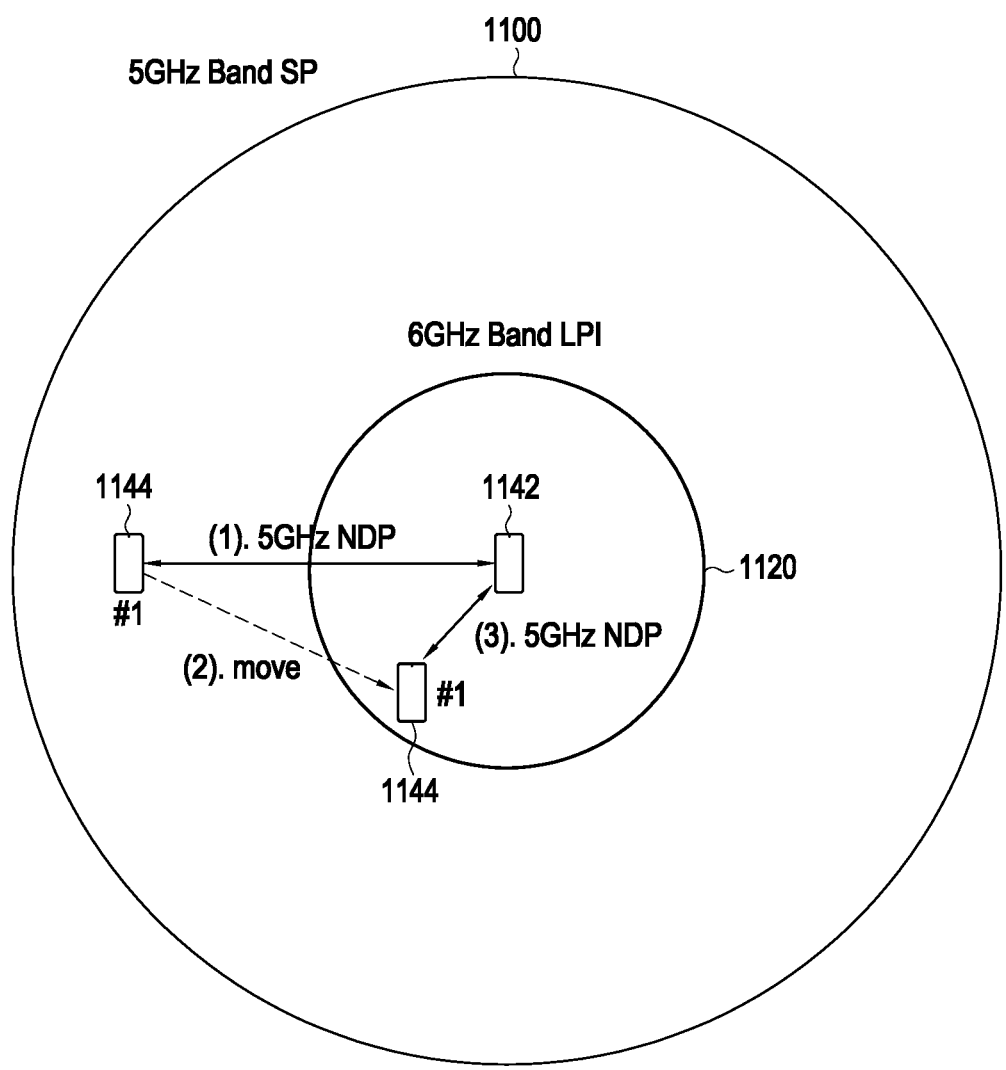

Referring to FIG. 11D, while a NAN device 1142 is performing data communication with NAN device #1 1144 located at a first point outside the coverage area 1120 of the 6 GHz band via the NDP of the 5 GHz band (1), if NAN device #1 1144 moves to a second point which is inside the coverage area 1120 of the 6 GHz band (2), and if the NDP of the 5 GHz band is maintained, the use of the 5 GHz band may occur (3) although the 6 GHz band is available which may provide more efficient communication performance when the NAN device 1142 and the NAN device #1 1144 located at the second point perform NDP communication.

NAN data path schedule management will be described in greater detail below, and is capable of improving transmission efficiency when multiple frequency bands having different coverage areas are used. Although various embodiments of the disclosure describe the 5GH frequency band and the 6 GHz frequency band as an example of multiple frequency bands having different coverage areas, it is apparent to those skilled in the art that embodiments of the disclosure may also be applicable to other frequency bands having different coverage areas.

Figure 12:
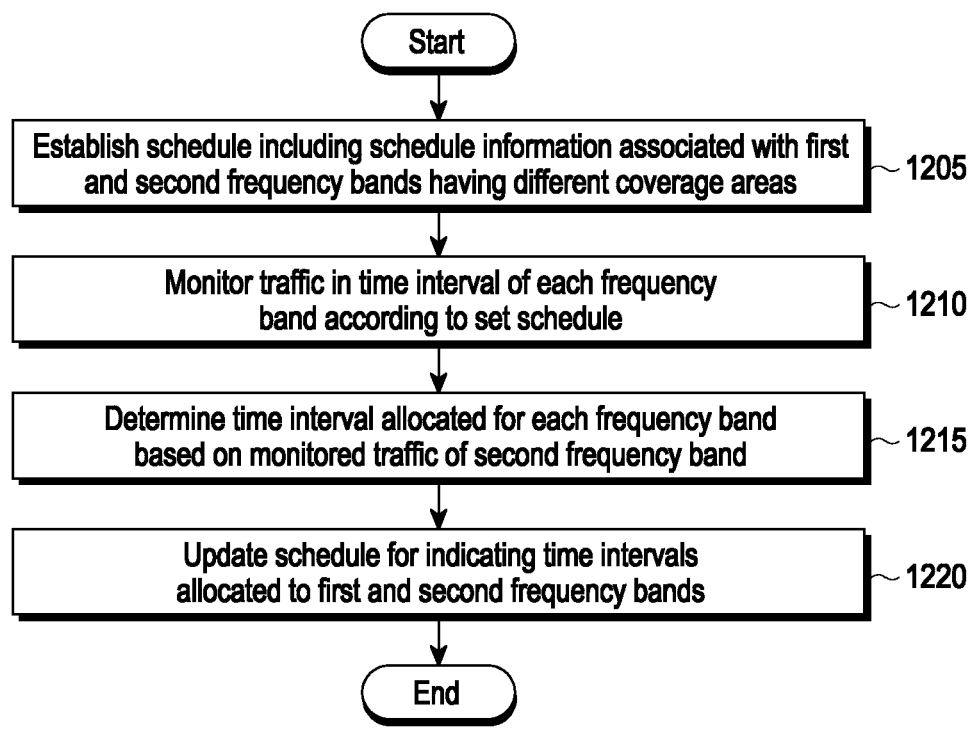
FIG. 12 is a flowchart illustrating an example procedure of scheduling a data path according to various embodiments.

FIG. 12 is a flowchart illustrating an example procedure of scheduling a data path according to an embodiment of the disclosure. Here, an example of a procedure in which a NAN device performs scheduling in order to perform data communication with an external device is illustrated, and operations illustrated in FIG. 12 may be performed by, for example, the processor 304 of FIG. 3.

Referring to FIG. 12, the electronic device 101 may establish a schedule including schedule information associated with a first frequency band and a second frequency band which have different coverage areas, in association with a data link in operation 1205. As an embodiment, the schedule information may include a first band entry including the band ID of the first frequency band and a first time bitmap indicating a time interval (including at least one time slot) available for the first frequency band, and may also include a second band entry including the band ID of the second frequency band and a second time bitmap indicating a time interval (including at least one time slot) available for the second frequency band. By establishing the schedule, the electronic device 101 may share an identical schedule with the external device. Here, the second frequency band may have a smaller coverage area than that of the first frequency band.

In operation 1210, the electronic device 101 may monitor traffic of packets exchanged with the external device in the time intervals of the first and second frequency bands according to the schedule, may identify whether message exchange in the first and second frequency bands is normally performed, and may measure the amount of traffic. Particularly, the electronic device 101 may identify whether communication in the second frequency band is normally performed via monitoring.

For example, the electronic device 101 may identify, periodically or at a predetermined time, whether communication (e.g., message exchange) with an external device is performed via the second frequency band having a smaller coverage area than that of the first frequency band. According to an embodiment, if at least one packet or message or frame (e.g., a management frame, a control frame, an action frame, or a service discovery frame) is transmitted at a channel of the second frequency band, while the electronic device 101 is monitoring traffic, the electronic device 101 may determine that traffic of the second frequency band is present. According to an embodiment, if the amount of traffic measured at a channel of the second frequency band (e.g., the number of packets/messages/frames) exceeds a predetermined threshold value, the electronic device 101 may determine that traffic of the second frequency band is present. According to an embodiment, if the number of retransmissions of data transmission at a channel of the second frequency band exceeds a predetermined threshold value, the electronic device 101 may determine that communication is abnormally performed in the second frequency band. According to an embodiment, if a response (acknowledgement) to a packet/message/frame transmitted at a channel of the second frequency band is not received during a predetermined period of time, the electronic device 101 may determine that communication is abnormally performed in the second frequency band.

In operation 1215, the electronic device 101 may change an allocated time interval available for the second frequency band based on the monitored traffic of the second frequency band, and may determine a time interval for the first frequency band based thereon. For example, if it is identified that communication with the external device is normally performed via the second frequency band, the electronic device 101 may allocate time intervals so that the time interval of the second frequency band is longer than the time interval of the first frequency band. As another example, if it is identified that communication with the external device is abnormally performed via the second frequency band, the electronic device 101 may change the schedule so that the time interval of the first frequency band is longer than the time interval of the second frequency band.

In operation 1220, the electronic device 101 may update the schedule for indicating time intervals allocated to the first and second frequency bands according to a determination result obtained in operation 1215. For example, the electronic device 101 may share the updated schedule information with the external device, and may perform communication with the external device based on the schedule including adjusted time intervals allocated to the first and second frequency bands.

Hereinafter, an example sequence of operations associated with an NDP schedule that utilizes multiple frequency bands will be described in greater detail.

Figure 13A:
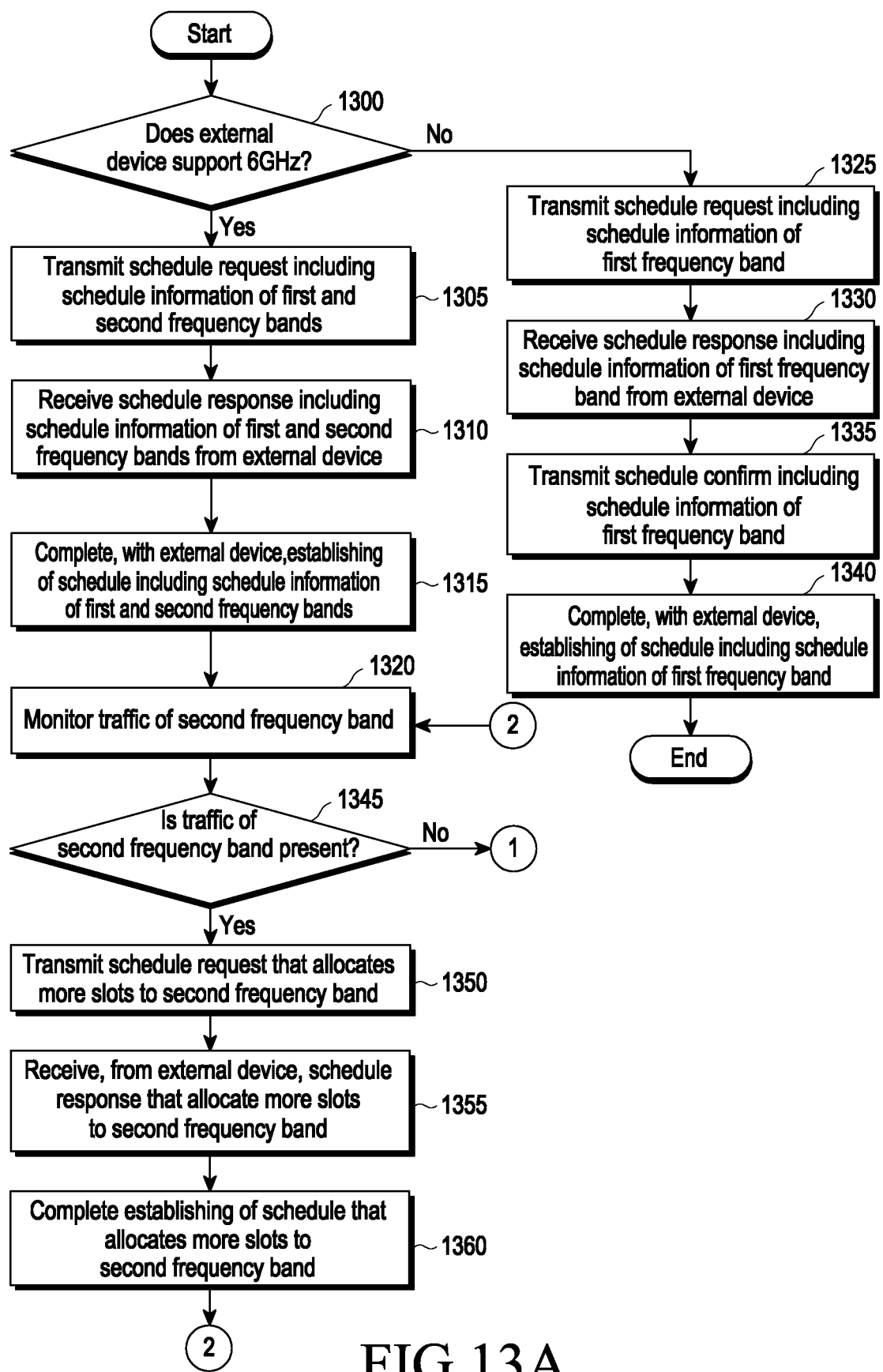
FIG. 13A and FIG. 13B is a flowchart illustrating an example procedure of managing a data link schedule according to various embodiments.
Figure 13B:
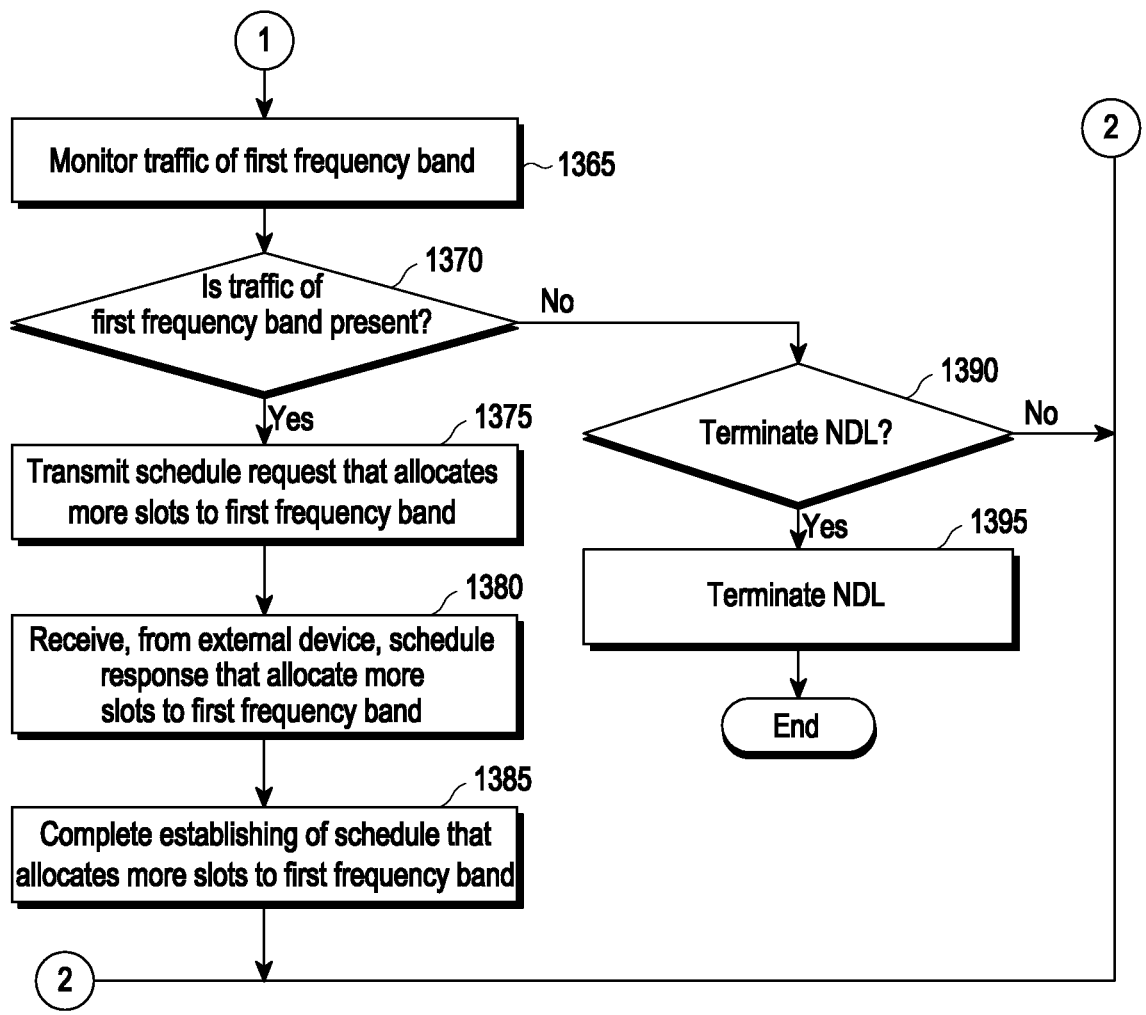

FIGS. 13A and 13B is a flowchart illustrating an example procedure of managing a data link schedule according to various embodiments. The procedure may, for example, be obtained by applying operations of FIG. 12 to an NDL schedule establishment scheme according to the NAN standard, and may be performed by, for example, the processor 304 of FIG. 3.

Referring to FIGS. 13A and 13B, in operation 1300, the electronic device 101 may identify whether an external device supports a second frequency band (e.g., 6 GHz) based on the capability information of the external device. For example, the electronic device 101 may identify whether the external device supports the second frequency band (e.g., 6 GHz) based on the capability information of the external device which is obtained when setting up a data link with the external device. The capability information may include band IDs associated with one or more supportable frequency bands of the external device. In the same manner, the electronic device 101 may provide its capability information to the external device when setting up the data link.

If it is identified that the external device does not support the second frequency band based on the received capability information of the external device ("No" in operation 1300, the electronic device 101 may transmit a schedule request frame including schedule information that includes the time interval of the first frequency band and excludes the time interval of the second frequency band to the external device in operation 1325, and may receive a schedule response frame in response to the schedule request frame from the external device in operation 1330.

The electronic device 101 may transmit a schedule confirm frame including the schedule information of the first frequency band to the external device in operation 1335, and may complete, with the external device, establishing of the schedule including the schedule information of the first frequency band in operation 1340. Subsequently, the electronic device 101 may perform data communication with the external device according to the schedule of the first frequency band.

If it is identified that the external device supports the second frequency band based on the received capability information of the external device ("Yes" in operation 1300), the electronic device may transmit a schedule request frame including schedule information associated with both frequency bands (e.g., first and second frequency bands) available for the external device in operation 1305. In operation 1305, when initially setting up a data link, in order to establish an NDP schedule including all multiple frequency bands (e.g., 5 GHz & 6 GHz, 2.4 GHz & 6 GHz, 5 GHz & 60 GHz, or 2.4 GHz & 60 Ghz) available for the external device with which the electronic device 101 needs to perform data communication, the electronic device 101 may transmit a schedule request frame including schedule information of both available frequency bands (e.g., first and second frequency bands) to the external device. For example, the schedule information may include a band entry of each frequency band and a time bitmap corresponding thereto.

In operation 1310, the electronic device 101 may receive, from the external device, a schedule response frame that includes schedule information of the schedule request frame. In operation 1315, the electronic device 101 may complete, with the external device, establishing of a schedule including schedule information of the first and second frequency bands.

The existing NDL schedule establishment is performed by comparing only channels of the available frequency bands, that is, capacities, and the distance between both electronic devices (e.g., the electronic device 101 and the external device) may not be taken into consideration. Therefore, according to the existing NDL schedule establishment, there is high possibility that the second frequency band identified as having high efficiency or capability is selected among the available frequency bands of both the electronic devices (e.g., the electronic device 101 and the external device). Conversely, according to various embodiments, the electronic device 101 that performs initial NDL schedule establishment does not allocate all time intervals to a channel of a predetermined frequency band, but include all channels of available frequency bands and may allocate a time interval for each channel. For example, when a schedule is initially establish, time slots for channels of the 5 GHz frequency band and the 6 GHz frequency band may be allocated in a 50:50 ratio. Therefore, the electronic device 101 may perform data communication with the external device using both the first frequency band and the second frequency band according to the schedule established in operation 1315.

If the initial schedule is established as described above, and data communication via the first and second frequency bands begin, the electronic device 101 may monitor traffic during a time interval allocated to the channel of each frequency band, and may check whether data communication, particularly, in the second frequency band is normally performed in operation 1320. If traffic of the second frequency band, which is a higher frequency band and has a short coverage area, is not generated during a predetermined monitoring time, a NAN device may determine that at least one of the two devices leaves the coverage area of the second frequency band. According to some embodiments, it is determined that the external device is inside a coverage area based on data communication traffic. According to some embodiments, it is determined that whether communication in the second frequency band is available based on a previously agreed message such as an SDF, an NAF, a null packet, or a probe packet.

Based on traffic monitoring of each frequency band in operation 1320, the electronic device 101 may determine whether traffic of the second frequency band is present in operation 1345. According to an embodiment, the electronic device 101 may determine that traffic of the second frequency band is present if at least one packet is transmitted at a channel of the second frequency band. According to an embodiment, the electronic device 101 may determine that traffic of the second frequency band is present if the amount of traffic measured at a channel of the second frequency band exceeds a predetermined threshold value.

If it is identified that the traffic of the second frequency band is present in operation 1345, the electronic device 101 may perform operations 1350 and 1360 in order to perform a procedure of updating the schedule initially establish via operations 1305 to 1320. In order to have a higher transmission efficiency, increasing the time interval allocated to the second frequency band which is a higher frequency band may be preferable.

The electronic device 101 may transmit, to the external device, a schedule request including updated schedule information which is updated to change at least some of time slots of the time interval allocated to a channel of the first frequency band of the schedule to belong to a channel of the second frequency band in operation 1350, and if the external device is compliant with the schedule information, the electronic device 101 may receive a schedule response that is compliant with the schedule information from the external device in operation 1355. In operation 1360, the electronic device 101 may complete establishing of the schedule which is updated to allocate more time slops to the second frequency band in operations 1350 to 1355, and may perform data communication via the first and second frequency bands according to the updated schedule.

In this instance, when extending the time interval of the second frequency band, removing all time slots allocated to the first frequency band is undesirable in consideration of mobility of devices. For example, if the electronic device 101 and/or external device leaves the coverage area of the second frequency band, the electronic device 101 and the external device may perform communication using the first frequency band. Therefore, when updating the schedule, the electronic device 101 may extend the time interval of the second frequency band, and may allocate a time interval including at least one time slot to the first frequency band. Although communication is abnormally performed during the time interval allocated to the second frequency band, while data communication is being performed according to the updated schedule, if communication is valid during the time interval allocated to the first frequency band, it is determined that the electronic device 101 is inside the coverage area of the first frequency band.

If traffic of the second frequency band is not identified during a predetermined monitoring time in operation 1345, the electronic device 101 may determine whether traffic of the first frequency band is present by monitoring traffic of each frequency band in operation 1365. If it is identified that traffic of the first frequency band is present ("Yes" in operation 1370), the electronic device 101 determines that the external device is outside the coverage area of the second frequency band, and transmit, to the external device, a schedule request including schedule information which is updated so as to change at least some of time slots included in the time interval allocated to the channel of the second frequency band according to the initial establish schedule to belong to the channel of the first frequency band in operation 1375. If the external device is compliant with the schedule information, the electronic device may receive a schedule response that is compliant with the schedule information from the external device in operation 1380. The NAN device completes establishing of the schedule updated to allocate more time slots to the first frequency band in operation 1385, and may perform data communication via the first and second frequency bands according to the updated schedule. The electronic device 101 may reduce the number of time slots of the second frequency band in which communication is abnormally performed, and may allocate more time slots to the first frequency band in which communication is normally performed, thereby increasing communication efficiency. According to an embodiment, although the electronic device 101 allocates more time slots to the first frequency band, the electronic device 101 may maintain some of the time slots of the second frequency band so as to use them to monitor traffic of the second frequency band.

If it is identified that traffic of the first frequency band is not present either in operation 1370, the electronic device 101 may determine whether to terminate the data link in operation 1390. If the electronic device 101 determines to maintain an NDL, the electronic device may return to operation 1325. If the electronic device determines to terminate the data link, the electronic device may terminate the data link in operation 1395 and may transmit a message indicating the termination to the external device.

After operations 1360 or operation 1385, the electronic device 101 or the external device moves, and the external device may leave or enter the coverage area of the second frequency band. Therefore, the electronic device 101 may return to operation 1325, may continue to monitor traffic of each frequency band while the data communication is continuously maintained, and may update the schedule so as to increase or decrease the time slots of the second frequency band as described above.

FIGS. 13A and 13B illustrate an embodiment in which, between the electronic device 101 and the external device, the electronic device 101 that initiates establishing of an initial schedule of a data link identifies traffic of the second frequency band, and transmits, to the external device, a schedule request frame that allocates more time slots to the second frequency band. According to various embodiments, if the schedule is established between the electronic device 101 and/or external device and NDP communication begins, a device (e.g., the external device) that receives the initial schedule request may also monitor traffic. For example, the external device that receives the schedule request frame in operation 1315 may initiate (trigger) a schedule updating operation associated with the second frequency band by monitoring traffic according to the initial schedule. According to an embodiment, the external device may perform operations 1350 and 1360 in order to update the schedule associated with the second frequency band, based on monitoring of traffic of the second frequency band.

Figure 14:
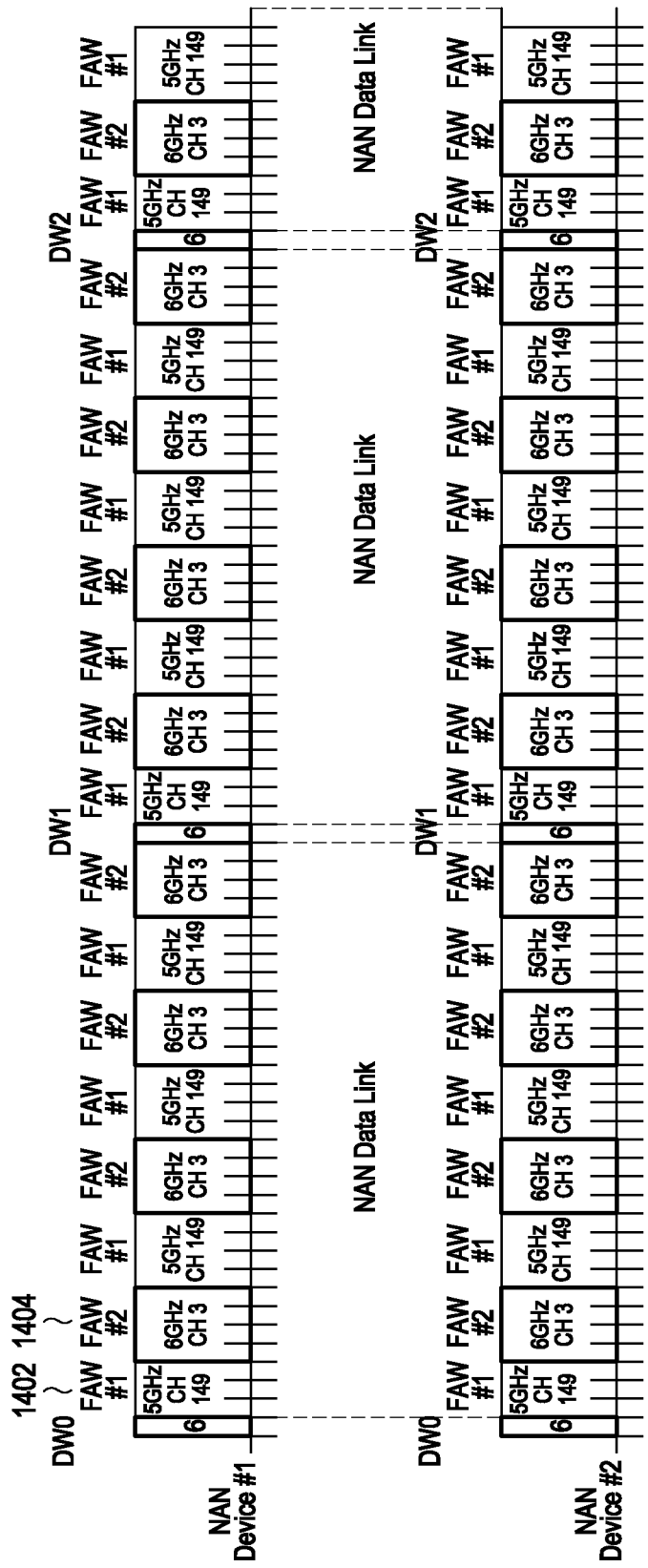
FIG. 14 is a diagram illustrating an example initial schedule establishment of a data link according to various embodiments.

FIG. 14 is a diagram illustrating example initial schedule establishment of a data link according to various embodiments.

Referring to FIG. 14, an initial NDL schedule between NAN device #1 and NAN device #2 may be configured so that a time interval 1402 of the 5 GHz frequency band and a time interval 1404 of the 6 GHz frequency band have substantially the same length between discovery window 0 (DW0) and discovery window 1 (DW1). For example, if the distance between NAN device #1 and NAN device #2 is not known in advance, the initial NDL schedule may be configured as described above. The NAN device #1 and NAN device #2 may monitor traffic in the time interval of the 5 GHz frequency band using channel #149, and may monitor traffic in the time interval of 6 GHz frequency band using channel #3.

Here, the periodic interval of the discovery window may, for example, be 512 ms, a single time slot is 16 ms, and a total of 32 time slots may be usable between discovery windows. One of the 32 time slots may be used as a discovery window and thus, the number of time slots that are actually used for data communication may be 31. The time slot allocated as a discovery window is also available for data communication and thus, FAW #1 1402 may occupy four time slots including the discovery window (e.g., DW0). Therefore, FAW #1 1402 and FAW #2 1404 may be distributed to the time intervals having substantially the same length.

In the disclosure, although it is illustrated that time intervals of multiple frequency bands are distributed substantially in a 50:50 ratio in the interval between the discovery windows in the case in which two NAN devices, that is, NAN device #1 and NAN device #2, are present in a NAN cluster, this is merely an example, and time intervals may be variously distributed when initial NDL schedule is established. In other words, if two or more NAN devices that support multiple frequency bands are present in the NAN cluster, a NAN device may equally distribute time intervals to the two or more NAN devices via initial NDL scheduling. For example, first time intervals of the 5 GHz band and the 6 GHz band are allocated to a first NAN device, second time intervals of the 5 GHz band and the 6 GHz band are allocated to a second NAN device, . . . , and $N^{th}$ time intervals may be allocated to $N^{th}$ NAN device.

According to an embodiment, the distance between both devices may be approximately measured via NAN ranging or measuring of a received signal strength (e.g., a received signal strength indicator), and the NAN device may schedule time intervals allocated to each external device by comparing the measured distance with a threshold value. If the measured distance is less than the threshold value, the electronic device 101 may regard that the external device is within the coverage area of the 6 GHz frequency band. In this instance, the electronic device 101 may allocate more time slots to a channel of the 6 GHz frequency band. Conversely, if the measured distance is greater than or equal to the threshold value, the NAN device may allocate more time slots to the 5 GHz frequency band.

Figure 15:
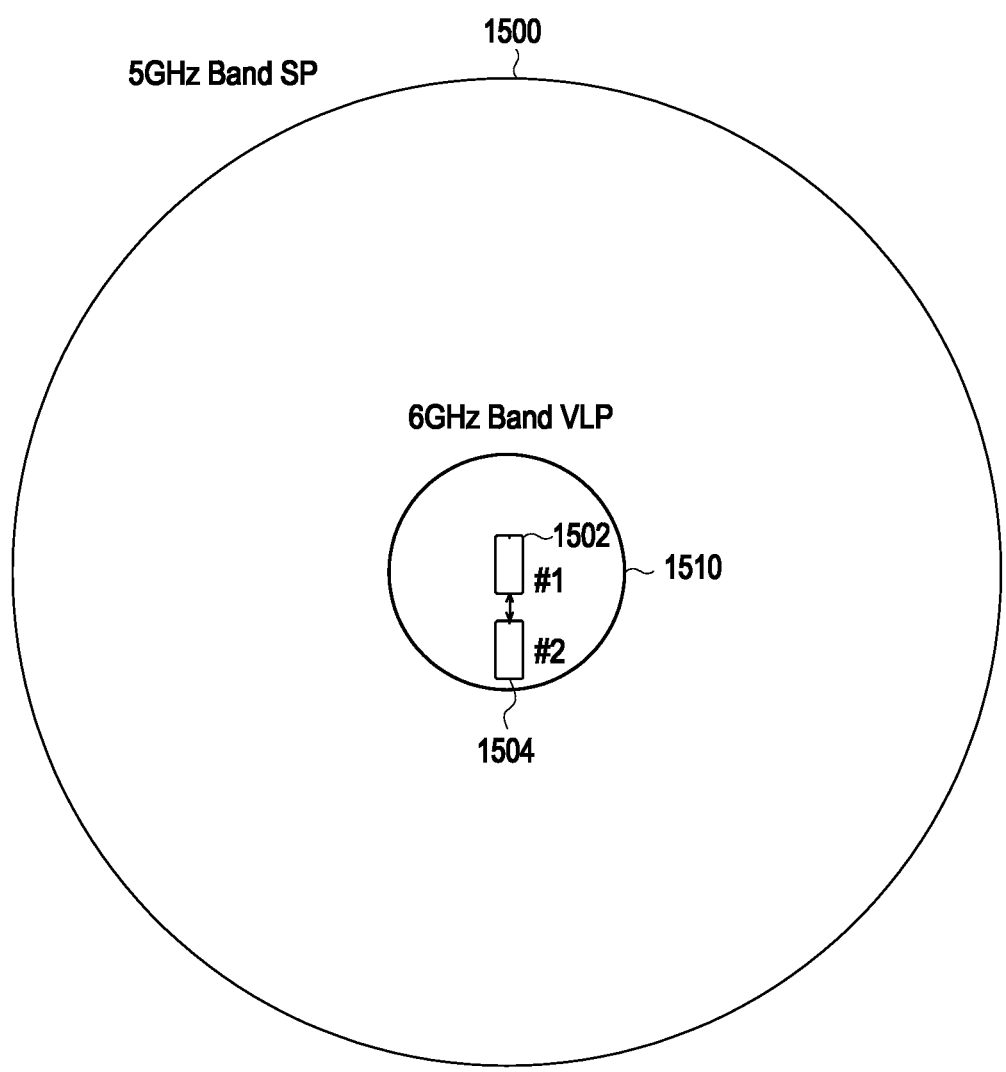
FIG. 15 is a diagram illustrating example NAN devices located in a coverage area of the 6 GHz frequency band according to various embodiments.

FIG. 15 is a diagram illustrating example NAN devices located in the coverage area of the 6 GHz frequency band according to various embodiments.

Referring to FIG. 15, a coverage area 1510 of the 6 GHz band that uses a VLP as output power may be smaller than a coverage area 1500 of the 5 GHz band that uses an SP as output power. If NAN device #2 1504 (e.g., the electronic device 102) which is an external device with which NAN device #1 1502 (e.g., the electronic device 101) desires to perform data communication is present in the 6 GHz coverage area 1510 of the NAN device #1 1502, the NAN device #1 1502 may establish an NDL schedule including all time intervals of the 5 GHz band and the 6 GHz band between the NAN device #1 1502 and the NAN device #2

1504 when establishing an initial NDL schedule. The NAN device #1 1502 and the NAN device #2 1504 may wake up at a predetermined time and may perform communication at a predetermined frequency and a predetermined channel. For example, the NAN device #1 1502 may detect whether traffic of the 6 GHz band is present in time slots included in the time interval of the 6 GHz band, and may be aware that the 6 GHz band is available by detecting the traffic.

As described above, if it is identified that the NAN device #2 1504 is inside the coverage area 1510 of the 6 GHz band based on the traffic that is present in the time slots of the 6 GHz band, the NAN device #1 1502 may establish a new NDL schedule via an NDL schedule update procedure.

Figure 16:
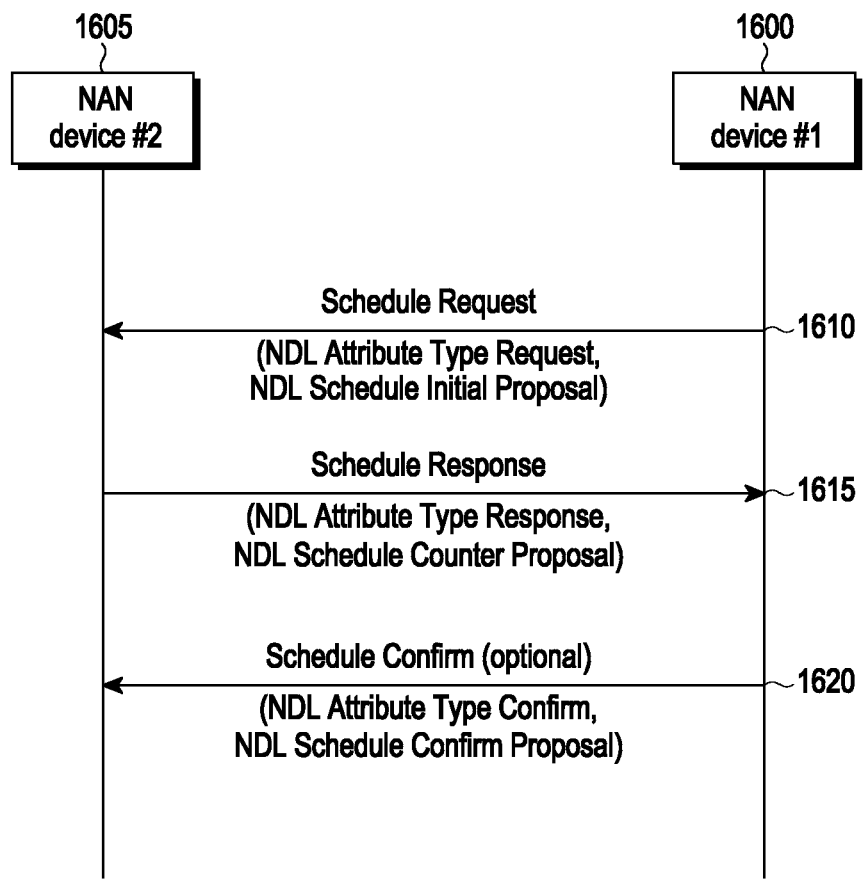
FIG. 16 is a message flow diagram illustrating an example procedure of updating a data link schedule according to various embodiments.

FIG. 16 is a message flow diagram illustrating an example procedure of updating a data link schedule according to an embodiment of the disclosure. NAN device #1 1600 and NAN device #2 1605 which desire to update an NDL schedule may be, for example, the devices 1502 and 1504 of FIG. 15. In FIG. 16, the NAN device #1 1600 may operate, for example, as an NDP/NDL initiator and the NAN device #2 1605 may operate, for example, as an NDP/NDL responder.

Referring to FIG. 16, in operation 1610, the NAN device #1 1600 (e.g., the electronic device 101) may transmit, to the NAN device #2 1605 (e.g., the electronic device 102) which is an external device, a schedule request frame including an NDL schedule initial proposal which is updated to increase the time interval of the 6 GHz frequency band. The NDL schedule initial proposal of the schedule request frame may be configured to allocate more time slots to the 6 GHz frequency. In operation 1615, the NAN device #2 1605 may transmit a schedule response frame including an NDL schedule counter proposal that is compliant with the NDL schedule initial proposal to the NAN device #1 1600. In operation 1620, the NAN device #1 1600 may transmit a schedule confirm frame including finally determined schedule information to the NAN device #2 1605, and may complete establishing of a newly updated NDL schedule. According to an embodiment, operation 1620 in which the NAN device #1 1600 transmits the schedule confirm frame including the finally determined schedule to the NAN device #2 1605 may be omitted.

Figure 17A:
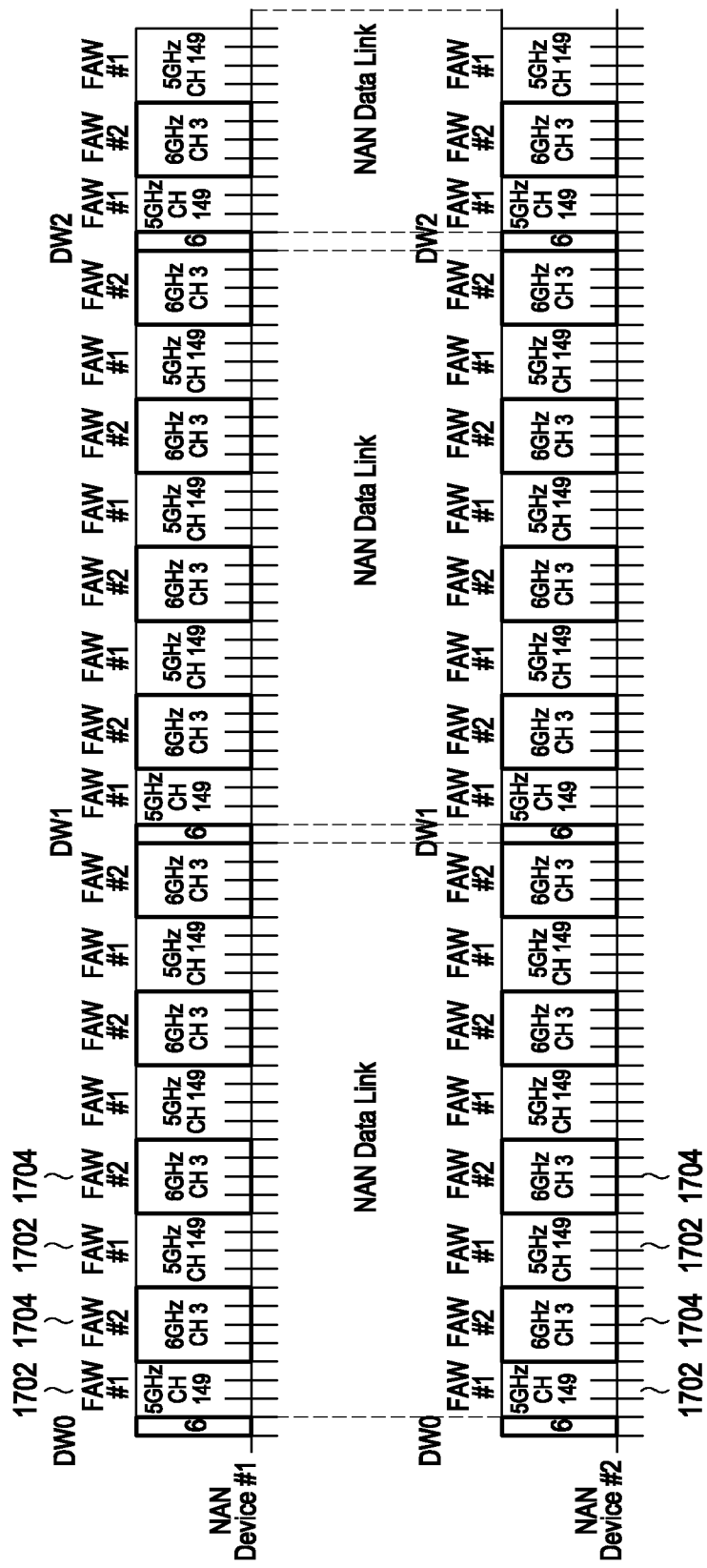
FIGS. 17A and 17B are diagrams illustrating an example of a schedule that is changed from an initial schedule establishment via traffic monitoring according to various embodiments.
Figure 17B:
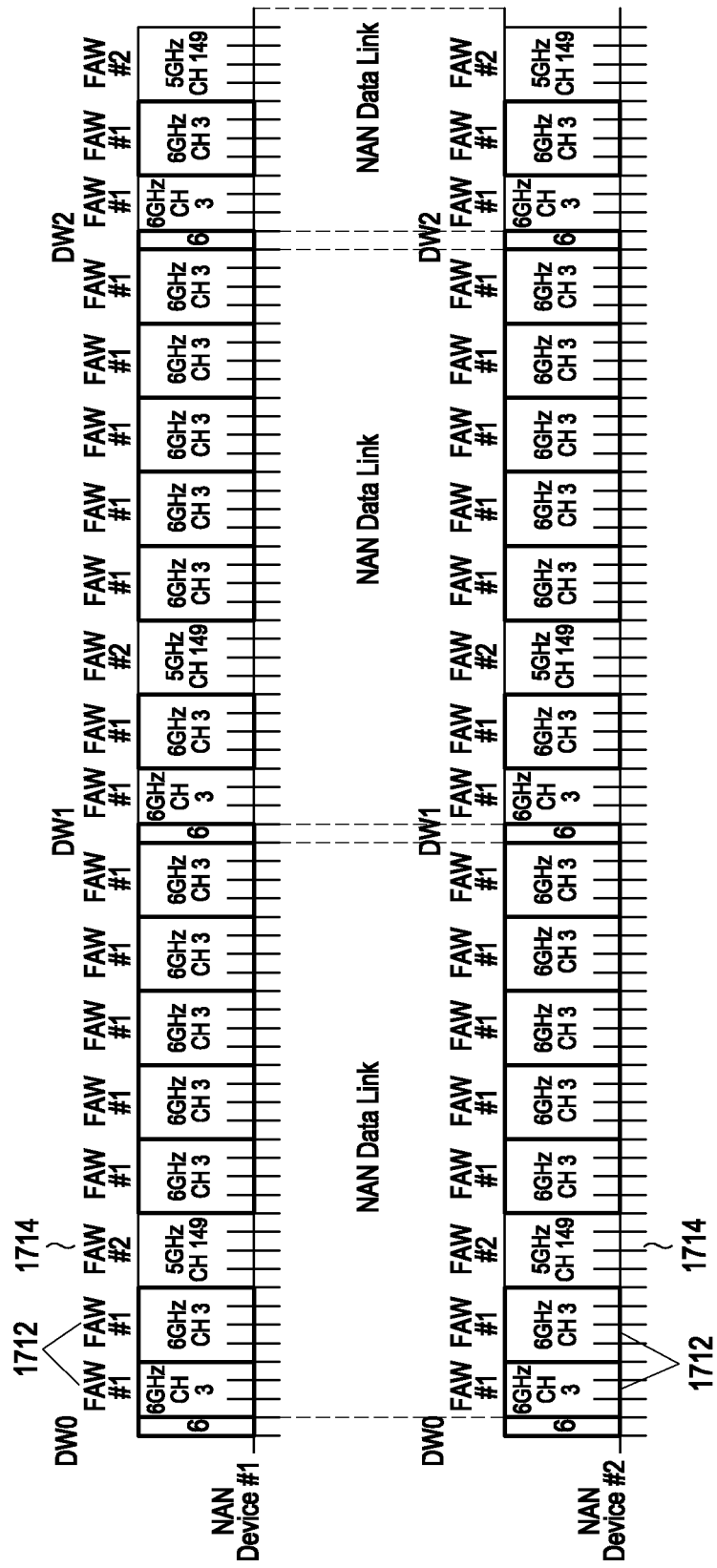

FIGS. 17A and 17B are diagrams illustrating an example of a schedule that is changed from an initial schedule establishment via traffic monitoring according to various embodiments. NAN device #1 and NAN device #2 may, for example, be the devices 1502 and 1504 of FIG. 15.

Referring to FIG. 17A, in an initial schedule establishment, FAW #1 1702 that uses channel #149 of the 5 GHz band and FAW #2 1704 that uses channel #3 of the 6 GHz band are allocated for an NDL between NAN device #1 (e.g., the electronic device 101) and NAN device #2 (e.g., the electronic device 102), and time slots may be allocated substantially in a 50:50 ratio for the FAW #1 1702 and the FAW #2 1704 between consecutive discovery windows. The NAN device #1 may monitor traffic in the time slots of the FAW #1 1702 allocated to the 5 GHz band and the time slots of the FAW #2 1704 allocated to the 6 GHz band. The NAN device #2 may be located within the coverage area 1510 of the 6 GHz band, as illustrated in FIG. 15.

Referring to FIG. 17B, the NAN device #1 (e.g., the electronic device 101) may detect that traffic of the 6 GHz band is present by monitoring traffic, and may configure new FAW #1 1712 which increases the ratio of time slots that use channel #3 of the 6 GHz band and new FAW #2 1714 via the schedule update procedure of FIG. 16. It is identified that more time slots are allocated to the new FAW #1 1712 of the 6 GHz band than time slots allocated to the FAW #2 1704 of the 6 GHz band before schedule updating. Accordingly, fewer time slots may be allocated to the new FAW #2 1714 of the 5 GHz band than the time slots allocated to the FAW #1 1702 of the 5 GHz band before schedule updating.

Figure 18:
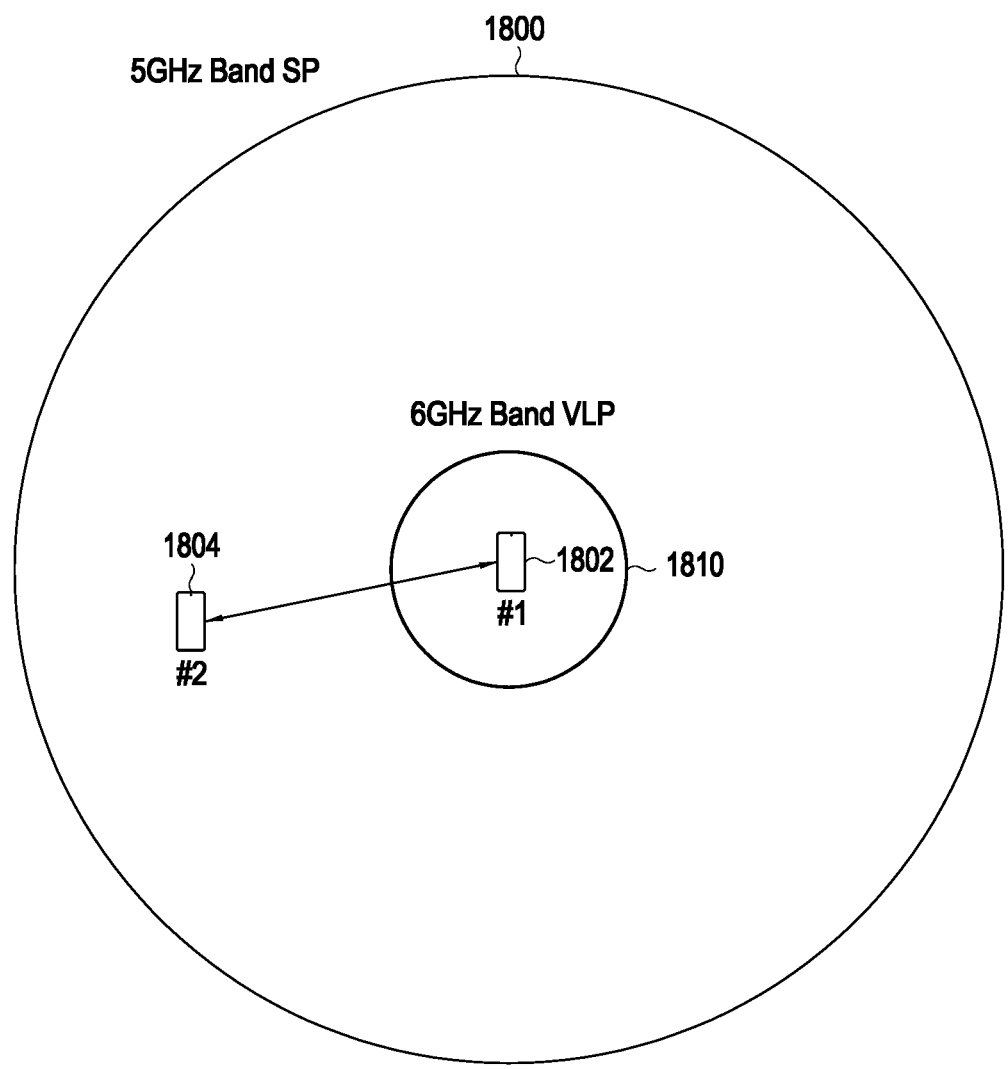
FIG. 18 is a diagram illustrating an example in which an external device is located outside a coverage area of the 6 GHz frequency band according to various embodiments.

FIG. 18 is a diagram illustrating an example in which an external device is located outside a coverage area of the 6 GHz frequency band according to various embodiments.

Referring to FIG. 18, NAN device #1 1802 (e.g., the electronic device 101) may build a coverage area 1800 of the 5 GHz band and a coverage area 1810 of the 6 GHz band which is smaller than that. If NAN device #2 1804 which is an external device (e.g., the electronic device 102) supports the 6 GHz band, an initial schedule establishment of the NAN device #1 1802 may include time slots configured in substantially the same ratio for the 5 GHz band and the 6 GHz band. The NAN device #2 1804 may be outside the coverage area 1810 of the 6 GHz band of the NAN device #1 1802. Accordingly, the NAN device #1 1802 may detect that traffic associated with the NAN device #2 1804 is not present in the 6 GHz band.

Figure 19A:
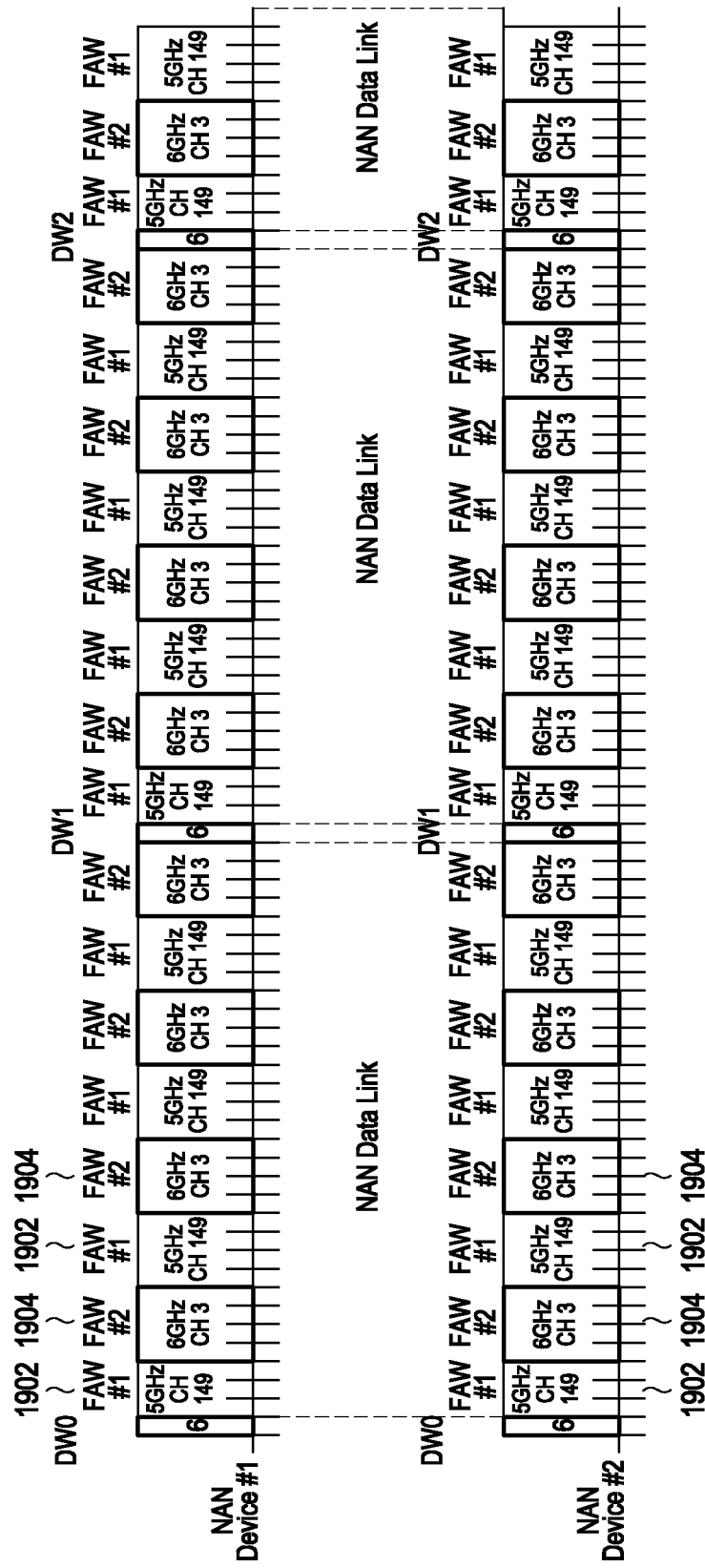
FIGS. 19A and 19B are diagrams illustrating an example of a schedule that is changed from an initial schedule establishment via traffic monitoring according to various embodiments.
Figure 19B:
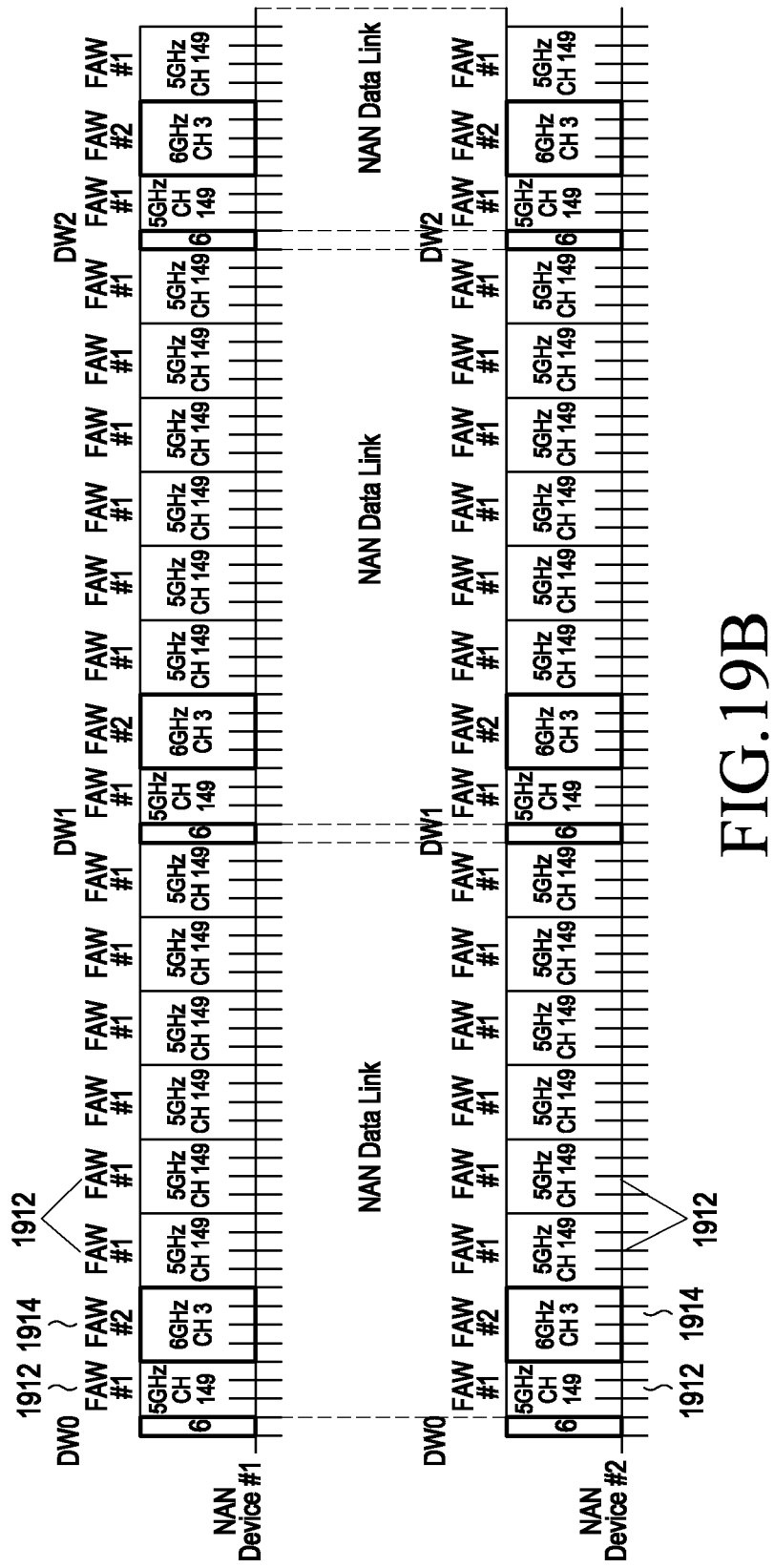

FIGS. 19A and 19B are diagrams illustrating an example of a schedule that is changed from an initial schedule establishment via traffic monitoring according to various embodiments. NAN device #1 and NAN device #2 may, for example, be the devices 1802 and 1804 of FIG. 18.

Referring to FIG. 19A, in an initial schedule establishment, FAW #1 1902 that uses channel #149 of the 5 GHz band and FAW #2 1904 that uses channel #3 of the 6 GHz band are allocated for an NDL between NAN device #1 (e.g., the electronic device 101) and NAN device #2 (e.g., the electronic device 102), and time slots may be allocated substantially in a 50:50 ratio for the FAW #1 1902 and the FAW #2 1904 between consecutive discovery windows (e.g., DW0, DW1, or DW2). The NAN device #1 may monitor traffic in the time slots of the FAW #1 1902 that uses channel #149 of the 5 GHz band and the time slots of the FAW #2 1904 allocated to the 6 GHz frequency band. The NAN device #2 may be located outside the coverage area 1810 of the 6 GHz band, as illustrated in FIG. 18.

Referring to FIG. 19B, the NAN device #1 may detect that traffic of the 6 GHz band is not present by monitoring traffic, and may configure new FAW #1 1912 which increases the ratio of time slots that use channel #149 of the 5 GHz band and new FAW #2 1914 via the schedule update procedure of FIG. 16. It is identified that more time slots are allocated to the new FAW #1 1912 of the 5 GHz band than time slots allocated to the FAW #1 1902 of the 5 GHz band before schedule updating. Accordingly, fewer time slots may be allocated to the new FAW #2 1914 of the 6 GHz band than the time slots allocated to the FAW #2 1904 of the 6 GHz band before schedule updating.

Figure 20:
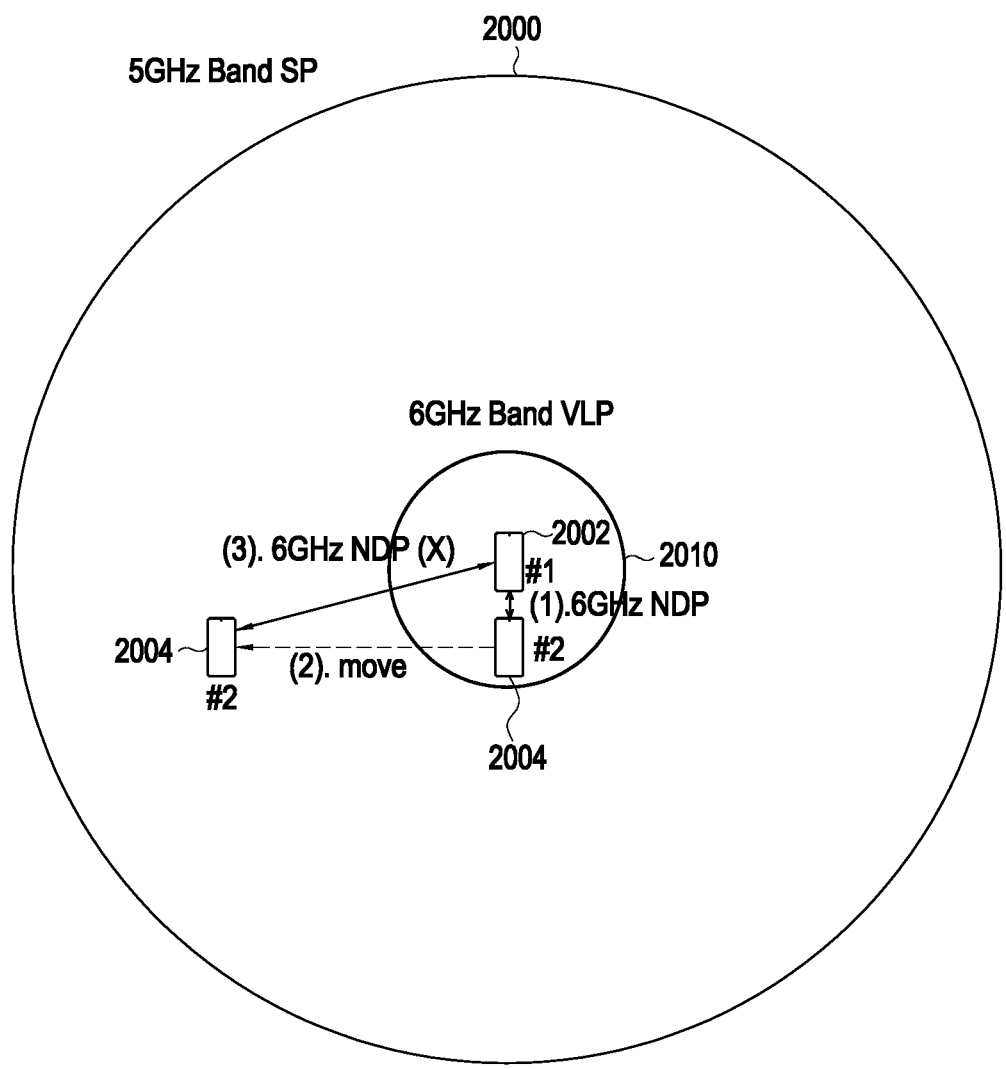
FIG. 20 is a diagram illustrating an example in which an external device moves outside a coverage area of the 6 GHz frequency band according to various embodiments.

FIG. 20 is a diagram illustrating an example in which an external device moves outside a coverage area of the 6 GHz frequency band according to various embodiments.

Referring to FIG. 20, NAN device #1 2002 (e.g., the electronic device 101) may build a coverage area 2000 of the 5 GHz band and a coverage area 2010 of the 6 GHz band which is smaller than that. Since the NAN device #2 2004 which is an external device is located within the coverage area of the 6 GHz band 2010 (e.g., 6 GHz band VLP coverage) when a schedule is initially established, an initial schedule establishment may include time slots which are allocated with respect to the 5 GHz band and the 6 GHz band in equal ratios. In the state (1) in which the time slots are allocated according to the initial schedule establishment, if the NAN device #2 2004 moves outside the coverage area 2010 of the 6 GHz band (2), the NAN device #1 2002 detects that traffic is not present in the time slots allocated to the 6 GHz band, and may detect that traffic is valid only in the time slots of the 5 GHz band (3). In the disclosure, the movement of the external device 2004 may be an absolute movement of the external device 2004 or a relative movement based on the NAN device 2002.

Figure 21A:
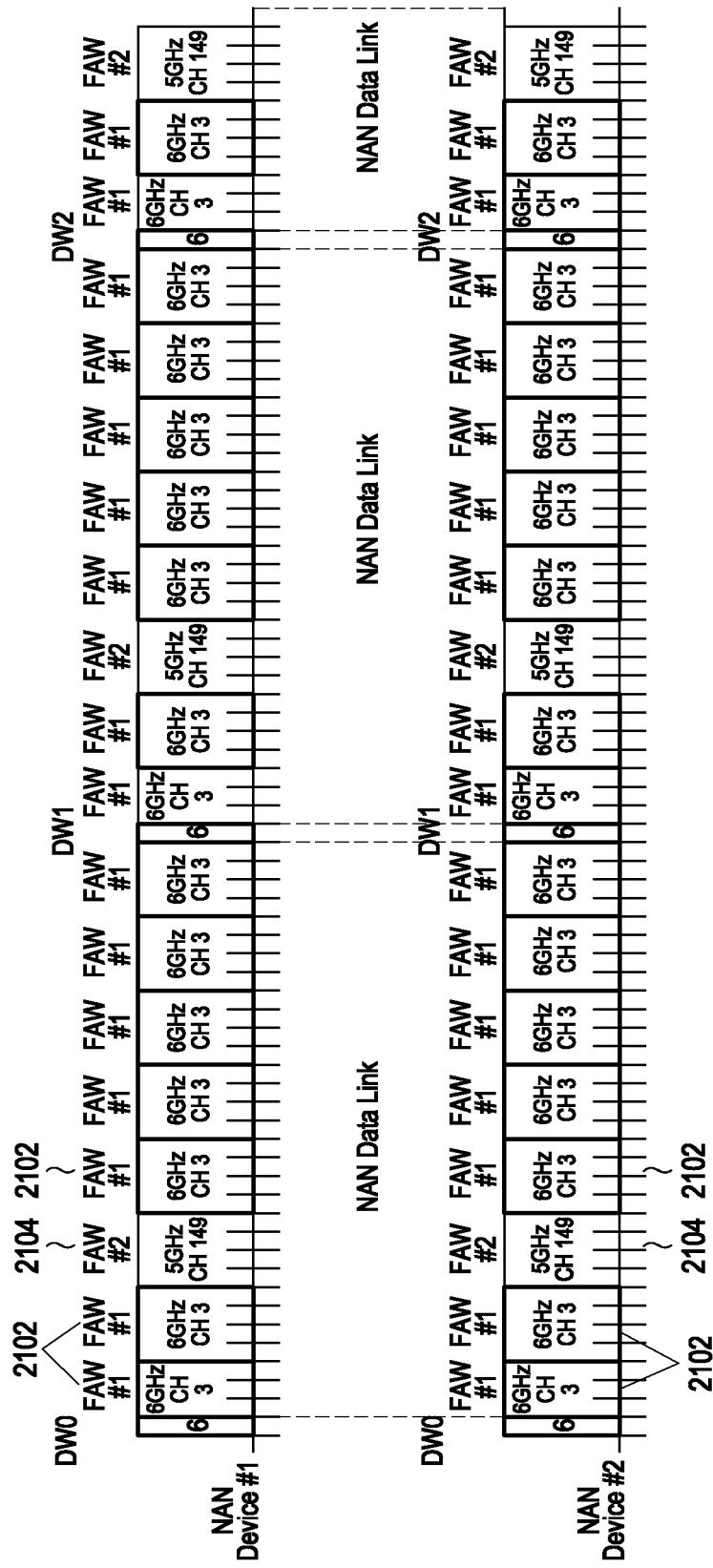
FIGS. 21A and 21B are diagrams illustrating an example of a schedule that is changed due to movement of an external device according to various embodiments.
Figure 21B:
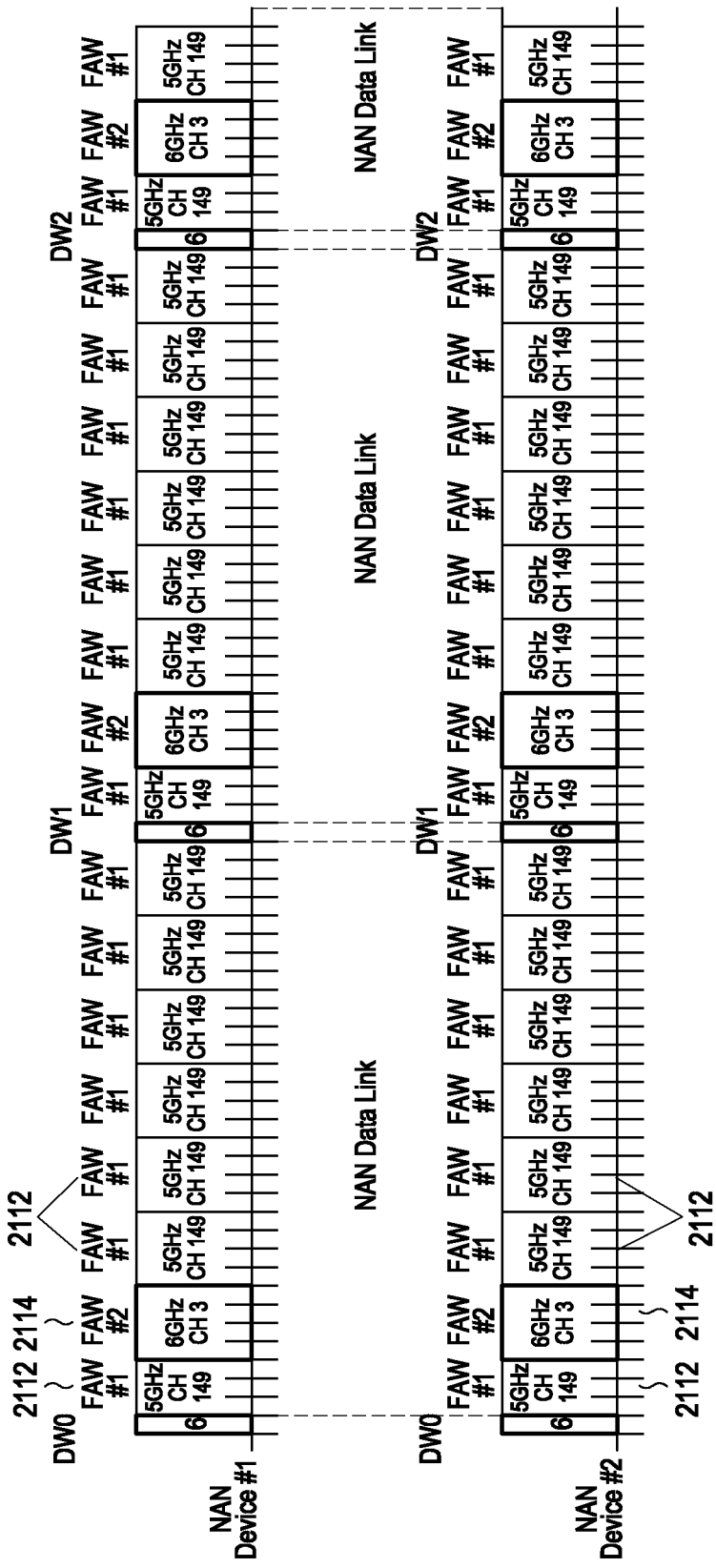

FIGS. 21A and 21B are diagrams illustrating an example of a schedule that is changed due to movement of an external device according to various embodiments. NAN device #1 and NAN device #2 may, for example, be the devices 2002 and 2004 of FIG. 20.

Referring to FIG. 21A, if the NAN device #2 (e.g., the electronic device 102) is located inside a 6 GHz coverage area of the NAN device #1 (e.g., the electronic device 101), more time slots may be allocated to FAW #1 2102 configured for the 6 GHz band between the NAN device #1 and the NAN device #2 than time slots allocated to FAW #2 2104 configured for the 5 GHz band. The NAN device #1 may monitor traffic in the time slots of the FAW #1 2102 allocated to the 6 GHz frequency band and the time slots of the FAW #2 2104 allocated to the 5 GHz band.

Referring to FIG. 21B, if the NAN device #1 (e.g., the electronic device 101) detects that traffic is not present in the time slots of the FAW #1 2102, allocated to the 6 GHz frequency band, by monitoring traffic, the NAN device #1 determines that the NAN device #2 (e.g., the electronic device 102) has moved outside the coverage area of the 6 GHz band, and may configure new FAW #1 2112 that increase the ratio of time slots that use the 5 GHz band and new FAW #2 2114 via the scheduling update procedure of FIG. 16. More time slots may be allocated to the new FAW #1 2112 of the 5 GHz band than time slots allocated to the FAW #2 2104 of the 5 GHz band before schedule updating. Accordingly, fewer time slots may be allocated to the new FAW #2 2114 of the 6 GHz band than the time slots allocated to the FAW #1 2102 of the 6 GHz band before schedule updating. As described above, by increasing the ratio of the time slots that use the 5 GHz band, the 5 GHz band with a relatively large coverage area may be used and the performance may be improved. The NAN device #1 may determine whether the NAN device #2 moves inside the coverage area of the 6 GHz band, via the FAW #2 2114.

Figure 22:
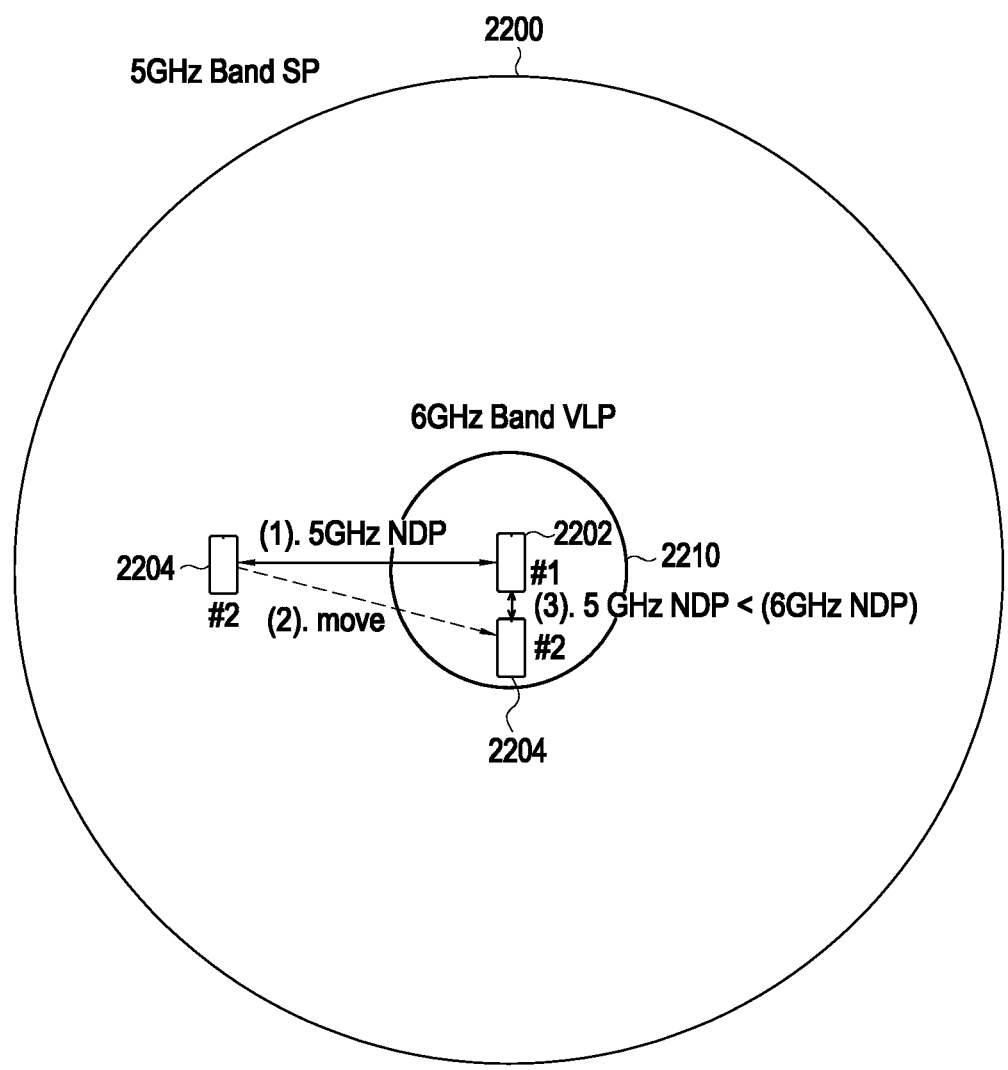
FIGS. 22 and 23 are diagrams illustrating examples in which an external device enters a coverage area of the 6 GHz frequency band according to various embodiments.
Figure 23:
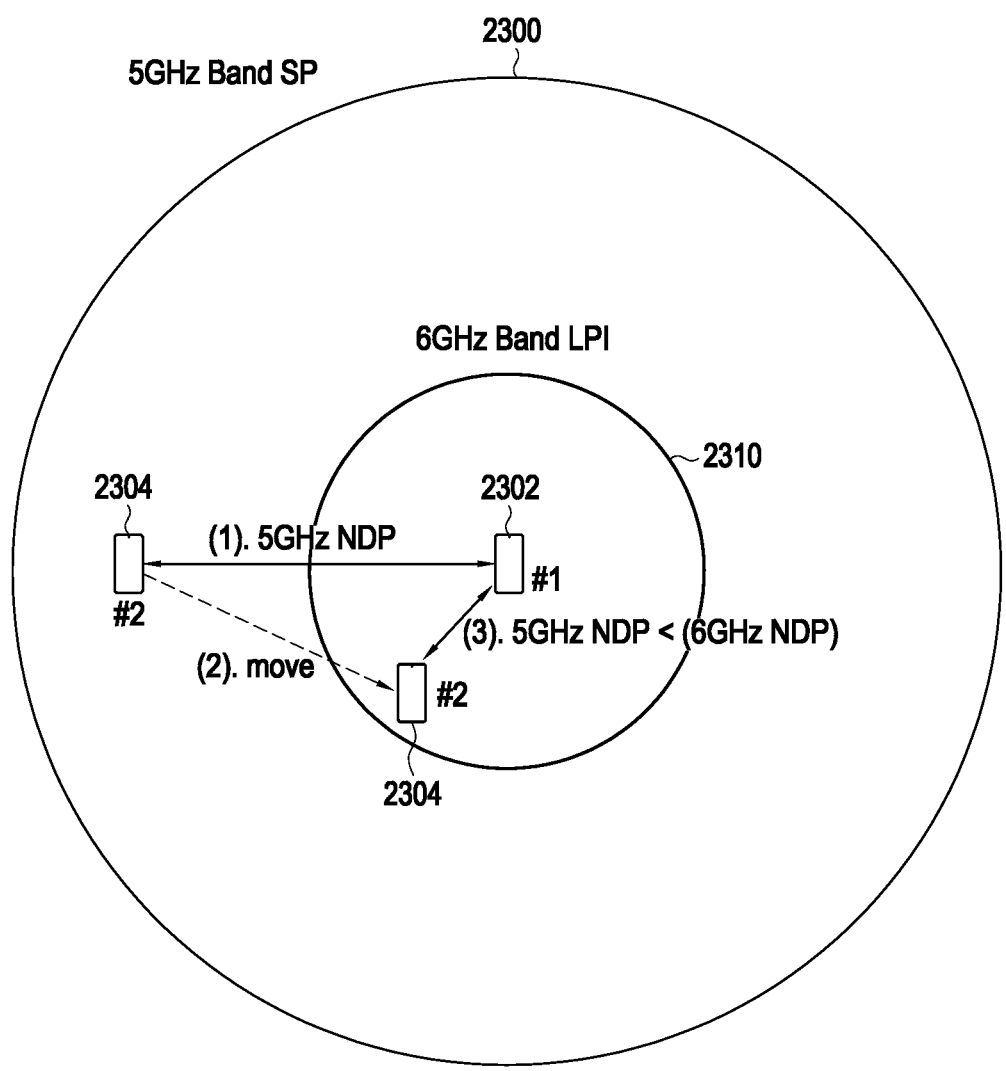

FIGS. 22 and 23 are diagrams illustrating examples in which an external device enters a coverage area of the 6 GHz frequency band according to various embodiments. Here, coverage areas 2210 and 2310 of the 6 GHz band which respectively use a VLP and an LPI as output power are illustrated.

Referring to FIGS. 22 and 23, NAN device #1 2202 and 2302 (e.g., the electronic device 101) may build a coverage area 2200 and 2300 of the 5 GHz band and a coverage area of the 6 GHz band which is smaller than that (e.g., the 6 GHz band VLP coverage area 2210 or the 6 GHz band LPI coverage area 2310). Since the NAN device #2 2204 and 2304 (e.g., the electronic device 102) which is an external device is located outside the coverage area 2210 and 2310 of the 6 GHz band, the NAN device #1 2202 and 2302 may establish a schedule that allocates more time slots to the 5 GHz band. In the state (1) in which the time slots are allocated according to the schedule established, if the NAN device #2 2204 and 2304 moves and enters the 6 GHz band coverage 2210 and 2310 (2), the NAN device #1 2202 and 2302 detects that traffic is present in the time slots allocated to the 6 GHz band and may determine to improve a data rate capability using the 6 GHz band (3).

Figure 24A:
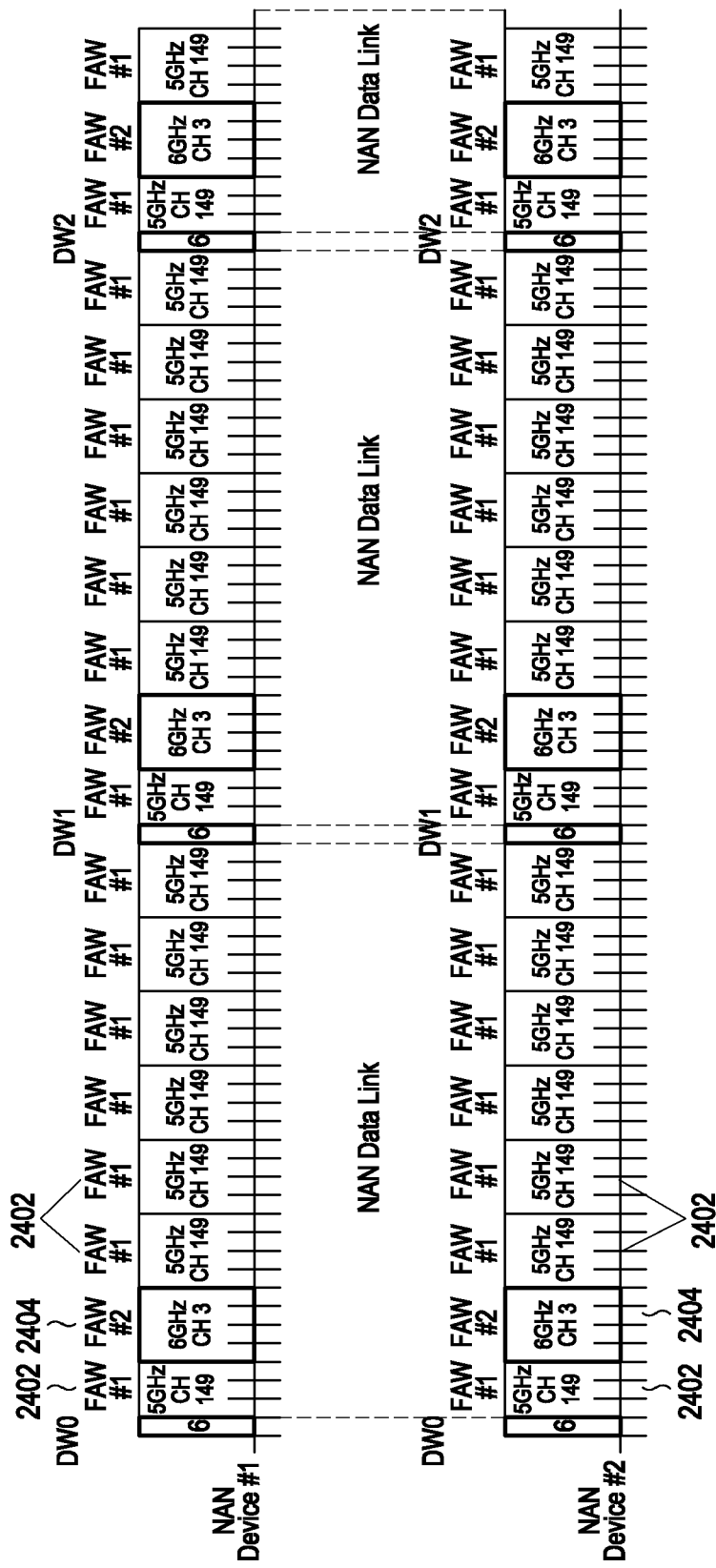
FIGS. 24A and 24B are diagrams illustrating an example of a schedule that is changed due to movement of an external device according to various embodiments.
Figure 24B:
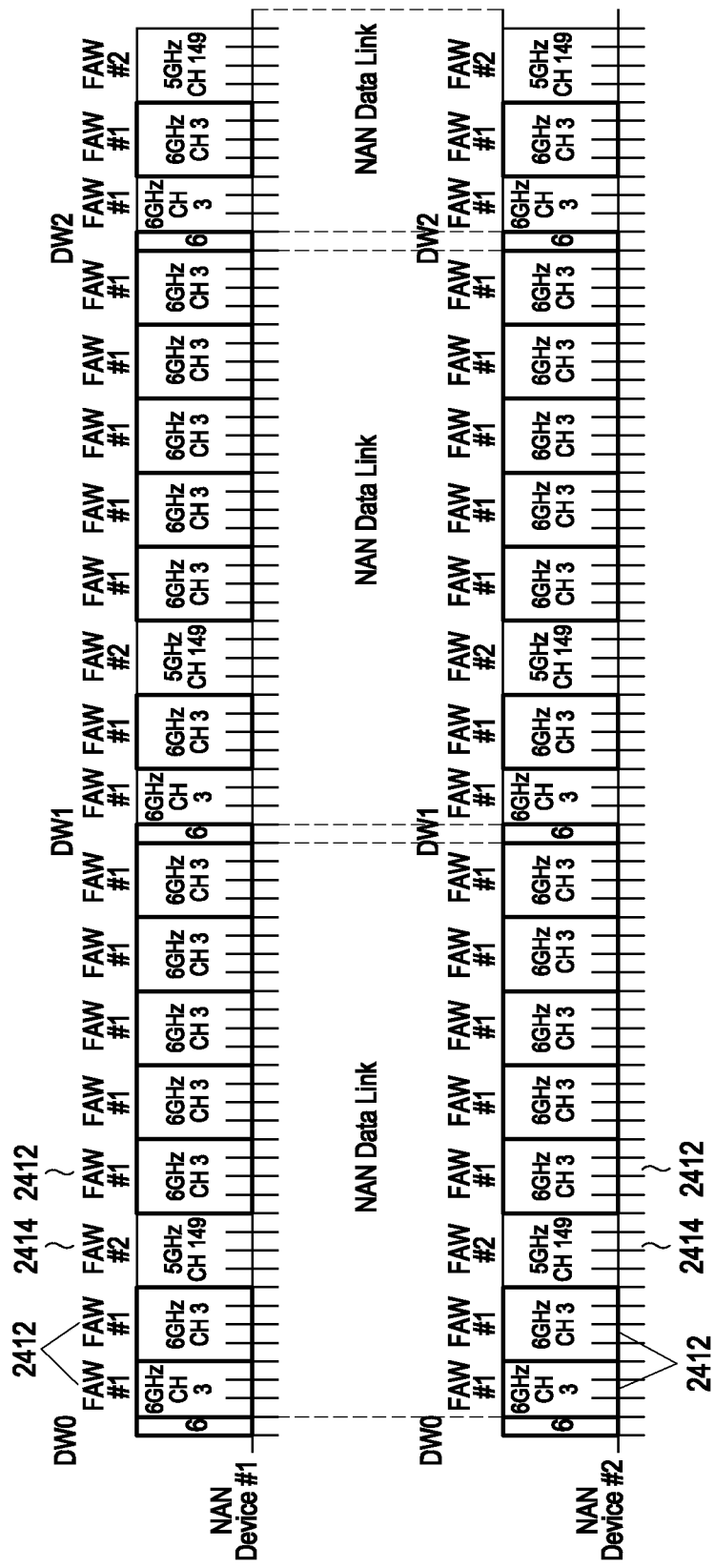

FIGS. 24A and 24B are diagrams illustrating an example of a schedule that is changed due to movement of an external device according to various embodiments. NAN device #1 may, for example, be the device 2202 of FIG. 22 or the device 2302 of FIG. 23, and NAN device #2 may, for example, be the device 2204 of FIG. 22 or the device 2304 of FIG. 23.

Referring to FIG. 24A, if the NAN device #2 (e.g., the electronic device 102) is located outside the 6 GHz coverage area of the NAN device #1 (e.g., the electronic device 101), more time slots may be allocated to FAW #1 2402 configured for the 5 GHz band between the NAN device #1 and the NAN device #2 than time slots allocated to FAW #2 2404 configured for the 6 GHz band. The NAN device #1 may monitor traffic in the time slots of the FAW #1 2402 allocated to the 5 GHz band and the time slots of the FAW #2 2404 allocated to the 6 GHz band.

Referring to FIG. 24B, the NAN device #1 (e.g., the electronic device 101) detects, by monitoring traffic, that the NAN device #2 (e.g., the electronic device 102) enters a coverage area of the 6 GHz band, and the NAN device #1 configures new FAW #1 2412 that increases the ratio of time slots that use the 6 GHz band and new FAW #2 2414 via the scheduling update procedure of FIG. 16. It is identified that more time slots are allocated to the new FAW #1 2412 of the 6 GHz band than time slots allocated to the FAW #2 2404 of the 6 GHz band before schedule updating. Accordingly, fewer time slots may be allocated to the new FAW #2 2414 of the 5 GHz band than the time slots allocated to the FAW #1 2402 of the 5 GHz band before schedule updating. As described above, if it is detected that an external device is located in the coverage area of the 6 GHz band by monitoring the 6 GHz band, the communication performance may be increased by increasing the ratio of time slots that use the 6 GHz band.

In the above, various example embodiments have been described in association with a scheduling scheme that changes the time interval of each frequency band by monitoring traffic in each of multiple frequency bands having different coverage areas.

Hereinafter, various example embodiments of measuring the distance between two NAN devices and updating a schedule between the two NAN devices based on the measured distance will be described in greater detail.

According to an embodiment, the distance between the two NAN devices may be measured using round trip time (RTT)-based NAN ranging defined in the NAN standard. According to an embodiment, the distance between the two NAN devices may be measured using ultra-wide band (UWB)-based ranging that uses the unique characteristic of a UWB. According to an embodiment, in addition to measuring the distance between the two NAN devices using NAN ranging, the distance between the two NAN devices may be estimated using a received signal strength (e.g., a received signal strength indicator (RSSI)). The NAN device may measure an RSSI associated with a signal received from an external device in the 6 GHz frequency band, and if the measured RSSI is less than or equal to a predetermined threshold value, it is determined that the external device is located within a coverage area of the 6 GHz frequency band. If the measured RSSI is greater than the threshold value, it is determined that the external device is located outside the coverage area of the 6 GHz frequency band. Hereinafter, measuring a distance via a ranging procedure will be described. However, it will be apparent to those skilled in the art that the description is also applicable to measuring a distance using a received signal strength or any other suitable method.

Figure 25:
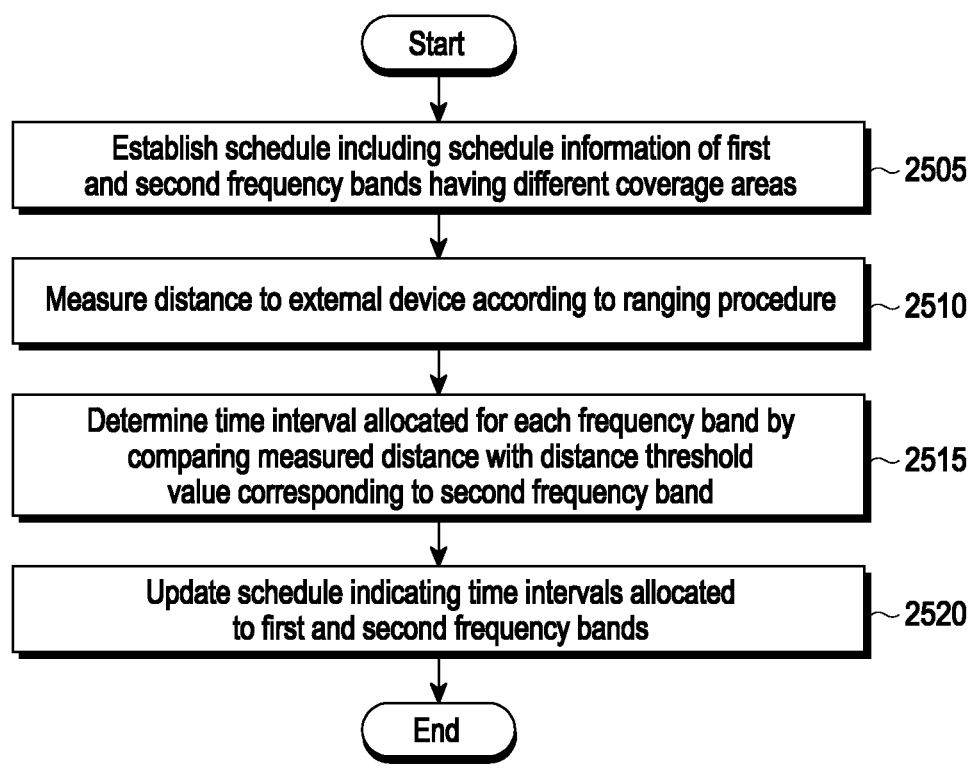
FIG. 25 is a flowchart illustrating an example procedure of scheduling a data path using ranging according to various embodiments.

FIG. 25 is a flowchart illustrating an example procedure of scheduling a data path using ranging according to various embodiments. The illustrated operations may be performed, for example, by the processor 304 of FIG. 3.

Referring to FIG. 25, the electronic device 101 may establish a schedule including both a first frequency band and a second frequency band which have different coverage areas, in association with a data link, in operation 2505. According to an embodiment, the schedule may include time bitmaps indicating time slots allocated to each of the first and second frequency bands. By establishing the schedule, the electronic device 101 may share an identical schedule with an external device. Here, the second frequency band may have a smaller coverage area than that of the first frequency band. According to an embodiment, the electronic device 101 may establish a schedule including only a primary frequency band, as opposed to a schedule including both the first frequency band and the second frequency band, in operation 2505. Here, the primary frequency band may be, for example, the 5 GHz band in which more time slots are allocated than other bands among multiple frequency bands.

In operation 2510, the electronic device 101 may measure the distance to the external device according to a previously agreed ranging procedure (or a received signal strength measuring procedure) before or while the electronic device 101 performs communication with the external device. In operation 2515, the electronic device 101 may compare the measured distance with a distance threshold value (e.g., related to the coverage area of the second frequency band) corresponding to the second frequency band, may change allocation of a time interval available for the second frequency band based on a comparison result, and may determine a time interval available for the first frequency band. For example, if it is identified that the external device is located in the coverage area corresponding to the second frequency band, the electronic device 101 may allocate time intervals so that the time interval of the second frequency band is longer than the time interval of the first frequency band.

In operation 2520, the electronic device 101 may update the schedule for indicating time intervals allocated to the first and second frequency bands according to a determination result obtained in operation 2515.

Figure 26:
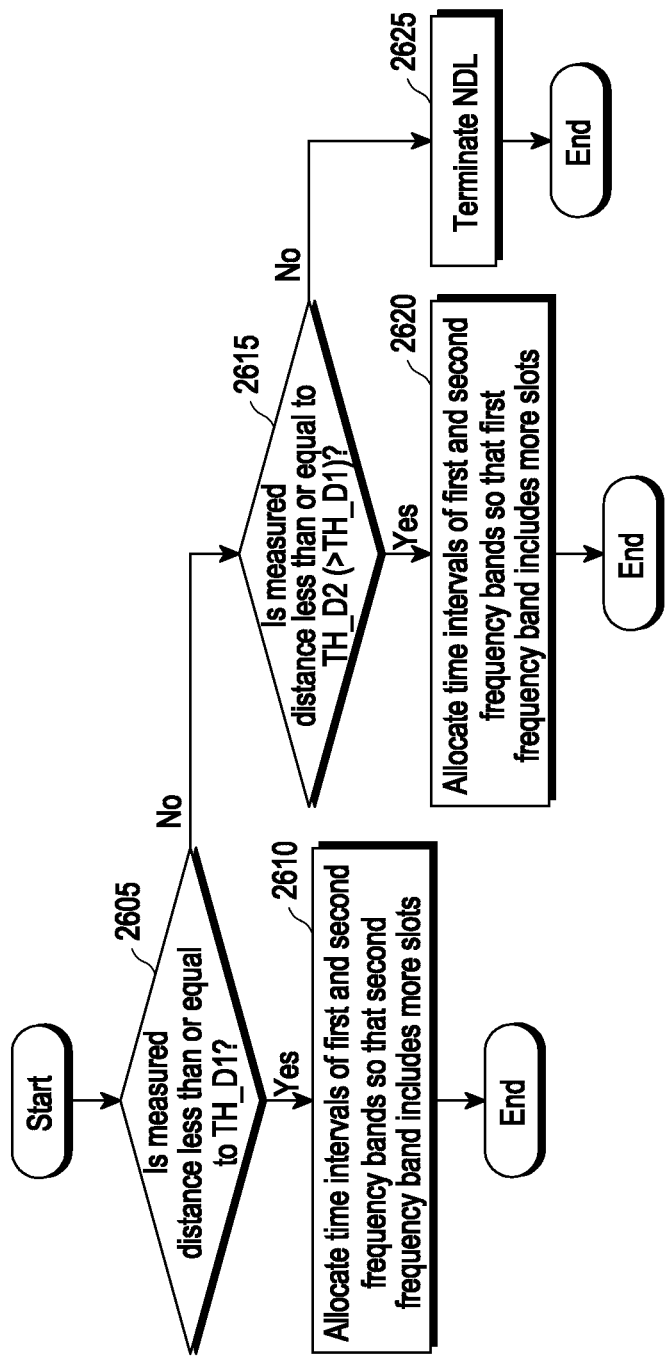
FIG. 26 is a flowchart illustrating an example procedure of adjusting time intervals of multiple frequency bands based on the distance to an external device according to various embodiments.

FIG. 26 is a flowchart illustrating an example procedure of adjusting time intervals of multiple frequency bands based on a distance to an external device according to various embodiments. The illustrated procedure may be applied, for example, to operation 2515 of FIG. 25.

Referring to FIG. 26, in operation 2605, the electronic device 101 may determine whether the distance to an external device measured according to a ranging procedure (or a received signal strength measuring procedure) is less than or equal to a first distance threshold TH_D1 which may be determined in advance. The first distance threshold value may be determined in advance based on, for example, a coverage radius supportable for each category of output power of the 6 GHz band which is a higher frequency band.

For example, an example of a coverage radius supportable for each category of output power is as follows.

(1) SP (Standard Power): 30 dBm→a radius of 100 M
(2) LPI (Low Power Indoor): 24 dBm→a radius of 10 M
(3) VLP (Very Low Power): 14 dBm→a radius of 5 M Therefore, the electronic device 101 may establish an NDL schedule, measures the distance to the external device via a ranging procedure, and may identify whether the measured distance falls within a coverage radius supportable for each power category applied to the 6 GHz band.

If the measured distance is less than or equal to the first distance threshold value ("Yes" in operation 2605), the electronic device 101 may update the NDL schedule that allocates time intervals of the first and second frequency bands so that the second frequency band includes more time slots in operation 2610.

If the measured distance is greater than the first distance threshold value ("No" in operation 2605), the electronic device 101 may determine whether the measured distance is less than or equal to a second distance threshold value greater than the first distance threshold value corresponding to the coverage radius of the first frequency band in operation 2615. If the measured distance is less than or equal to the second distance threshold value ("Yes" in operation 2615), the electronic device 101 may update the NDL schedule that allocates time intervals of the first and second frequency bands so that the first frequency band includes more time slots in operation 2620. Conversely, if the measured distance is even greater than the second distance threshold value ("No" in operation 2615), the electronic device 101 may determine that the external device is beyond the range of coverage for communication and may terminate an NDL in operation 2625.

According to an embodiment, the electronic device 101 may perform measuring of the distance to the external device, a ranging procedure for schedule updating, and a schedule updating procedure (e.g., operations 2605 to 2620), periodically or aperiodically, based on NAN parameters (e.g., discovery windows (DWs), a time intervals of discovery windows, a beacon interval, and a NAN discovery channel) shared with the external device. According to an embodiment, a period or condition for performing a ranging-based schedule updating procedure may be given as a NAN parameter. For example, if it is determined that the external device is a device having high mobility (e.g., a device that frequently moves), the electronic device 101 performs a ranging procedure for measuring the distance to the external device at first periodic intervals, and if it is determined that the external device is a device having low mobility (e.g., a stationary device), the electronic device 101 may perform a ranging procedure for measuring the distance to the external device at second periodic intervals, the second periodic interval being longer than the first periodic interval.

Hereinafter, various examples of updating a schedule according to a ranging procedure will be described with reference to FIGS. 27, 28, 29A, 29B, 30, 31, 32A and 32B (which may be referred to hereinafter as FIGS. 27 to 32).

Figure 27:
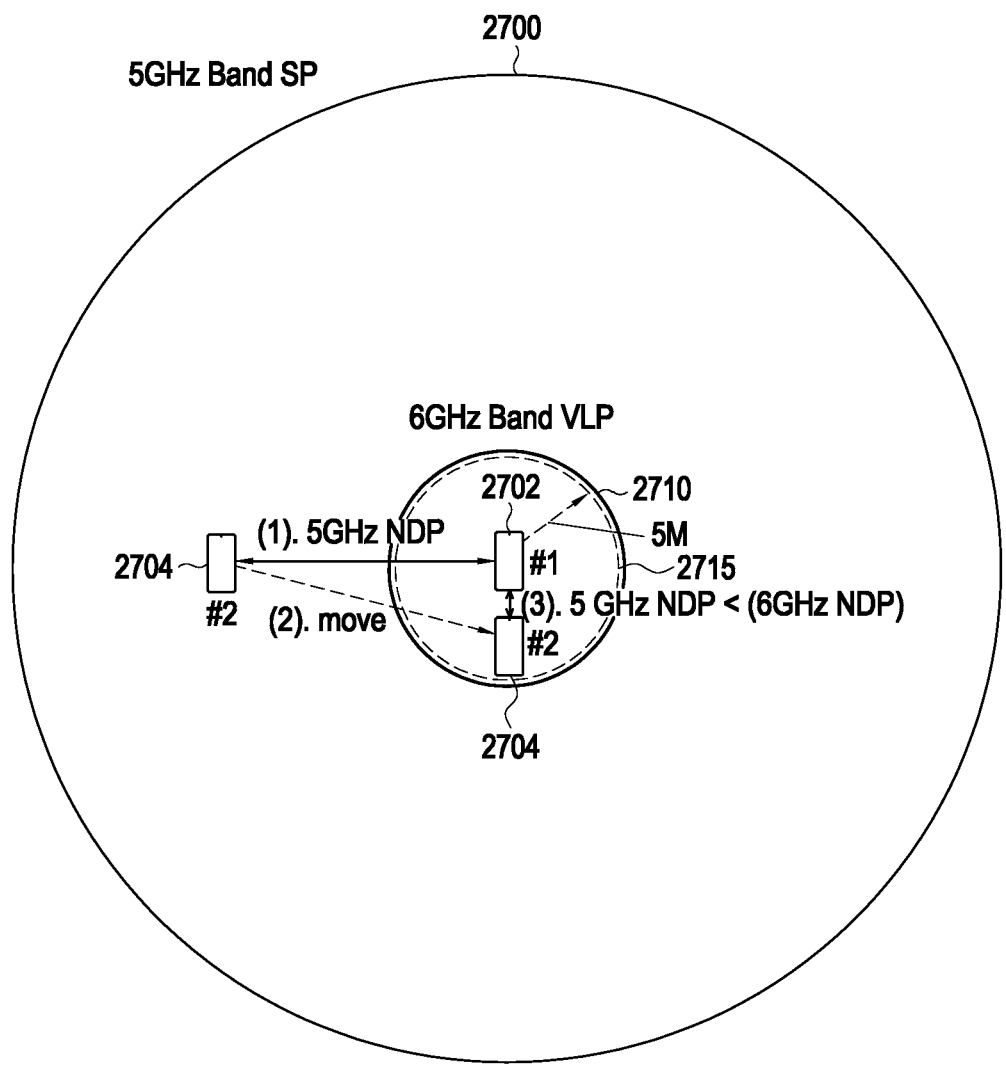
FIGS. 27 and 28 are diagrams illustrating examples in which an external device enters a coverage area of the 6 GHz frequency band according to various embodiments.
Figure 28:
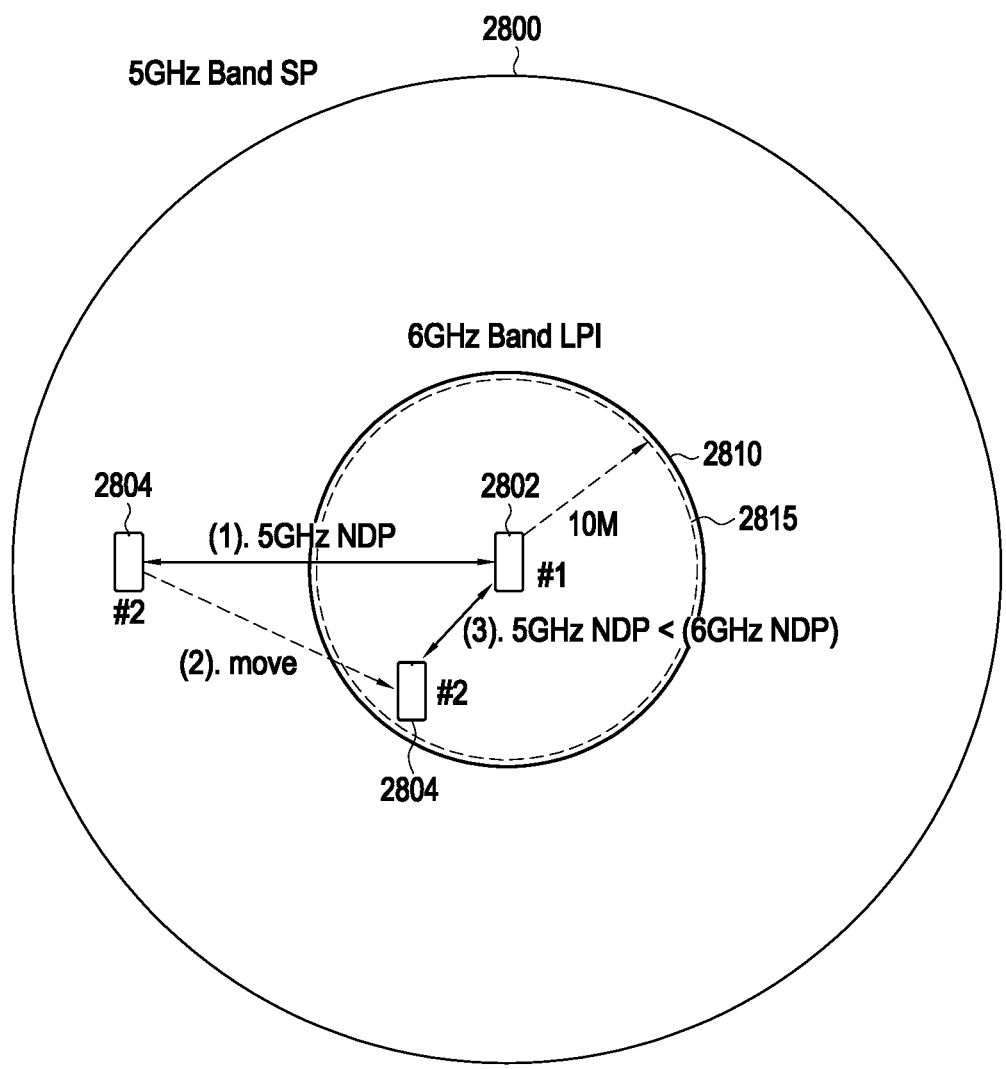

FIGS. 27 and 28 are diagrams illustrating examples in which an external device enters a coverage area of the 6 GHz frequency band according to various embodiments. Here, descriptions of NAN device #1 2702 and 2704, NAN device #2 2802 and 2804, and coverage areas 2700, 2710, 2800, and 2810 are the same as or similar to those of FIGS. 22 and 23.

Referring to FIGS. 27 and 28, when the NAN device #2 2704 and 2804 (e.g., the electronic device 102) is outside a coverage area of the 6 GHz band (e.g., the 6 GHz band VLP coverage 2710 or the 6 GHz band LPI coverage 2810), the NAN device #1 2702 and 2802 (e.g., the electronic device 101) may establish a schedule that allocates time slots for the 5 GHz band. For example, if the distance to the NAN device #2 2704 and 2804 measured by performing a ranging procedure with the NAN device #2 2704 and 2804 is greater than or equal to the 6 GHz band coverage area 2710 and 2810, the NAN device #1 2702 and 2802 may establish a schedule that allocates time slots to the 5 GHz band and may perform communication with the NAN device #2 2704 and 2804.

In the situation (1) in which time slots are allocated according to the schedule establishment, if the NAN device #2 2704 and 2804 moves and enters the 6 GHz band coverage area 2710 and 2810 (2), the NAN device #1 2702 and 2802 may determine that the distance to the NAN device #2 2704 and 2804 measured by performing a ranging procedure is less than or equal to a distance threshold value 2715 and 2815 corresponding to the 6 GHz band coverage area 2710 and 2810. For example, the NAN device #1 2702 and 2802 periodically or aperiodically performs a ranging procedure for measuring the distance to the NAN device #2 2704 and 2804 based on NAN parameters shared with the NAN device #2 2704 and 2804, and may determine whether the distance to the NAN device #2 2704 and 2804 is less than or equal to the distance threshold value 2715 and 2815 corresponding to the 6 GHz band coverage 2710 and 2810. If the distance to the NAN device #2 2704 and 2804 measured by performing a ranging procedure is less than or equal to the distance threshold value 2715 and 2815 corresponding to the 6 GHz band coverage 2710 and 2810, the NAN device #1 2702 and 2802 may determine to improve a data rate capability using the 6 GHz band (3).

Figure 29A:
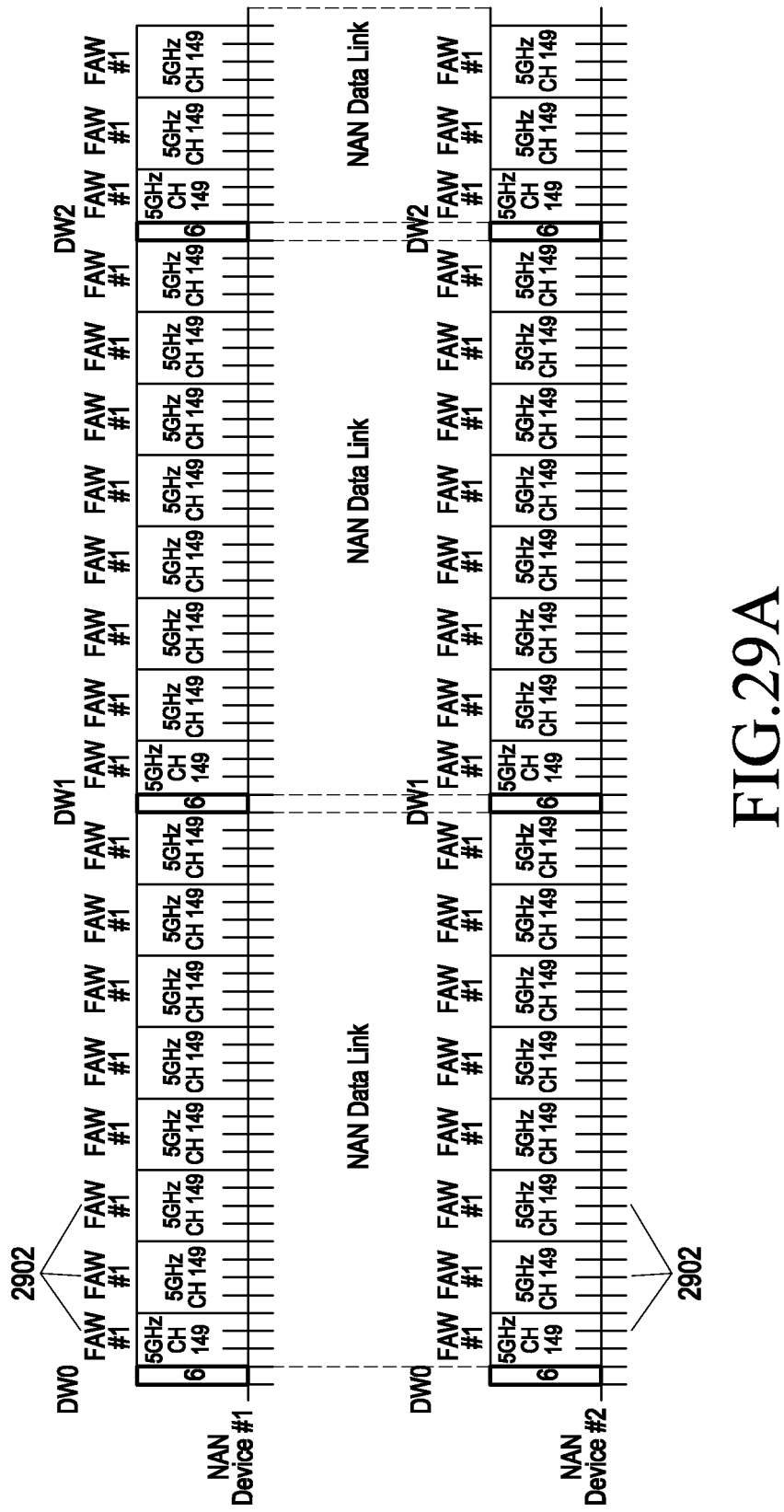
FIGS. 29A and 29B are diagrams illustrating an example of a schedule that is changed due to movement of an external device according to various embodiments.
Figure 29B:
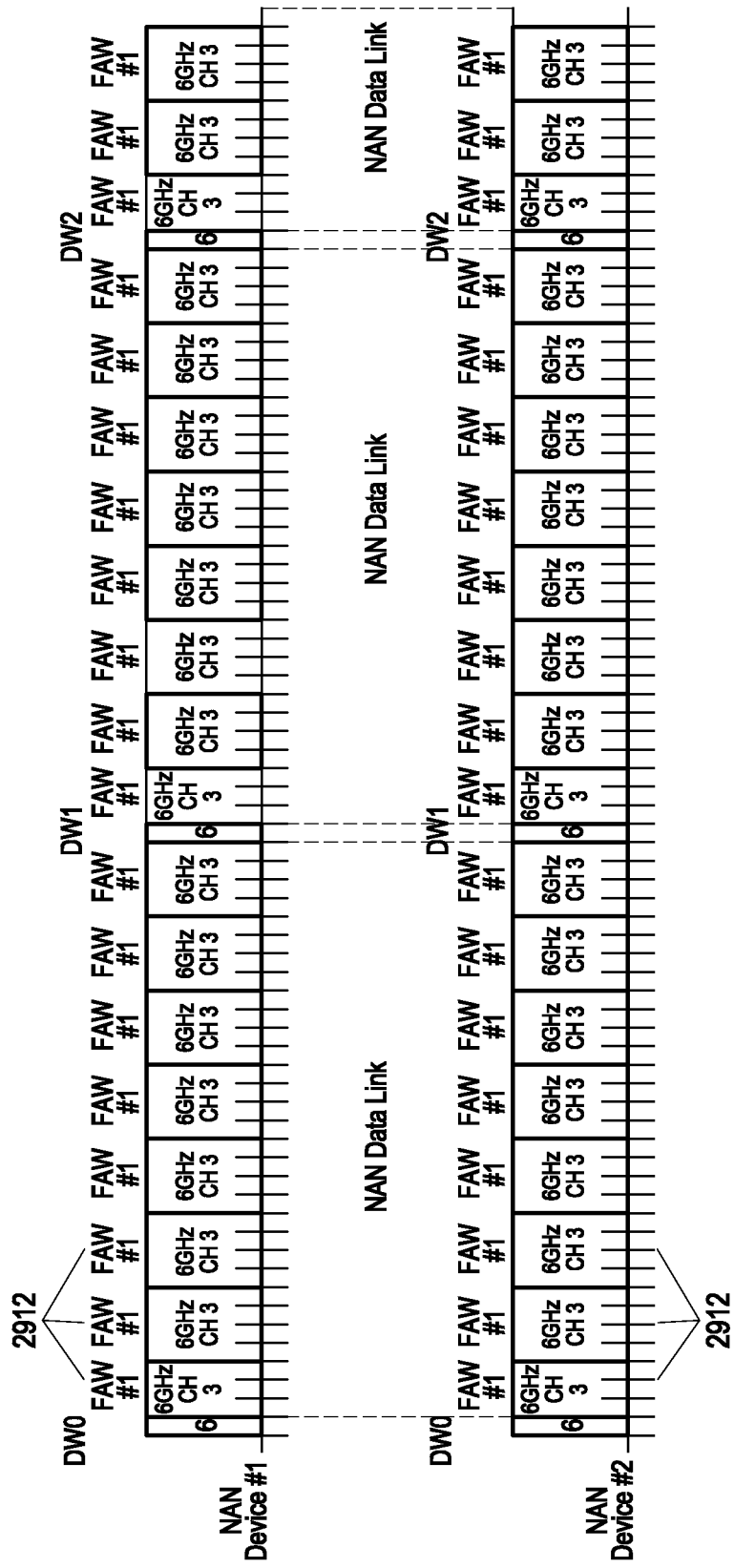

FIGS. 29A and 29B are diagrams illustrating an example of a schedule that is changed due to movement of an external device according to various embodiments. NAN device #1 (e.g., the electronic device 101) and NAN device #2 (e.g., the electronic device 102) may, for example, be the devices 2702, 2704, 2706, 2802, 2804, and 2806 of FIGS. 27 and 28.

Referring to FIG. 29A, if the NAN device #2 (e.g., the electronic device 102) is located outside the 6 GHz coverage area of the NAN device #1 (e.g., the electronic device 101), only FAW #1 2902 may be configured for the 5 GHz band between the NAN device #1 and the NAN device #2 and any other FAW may not be present. The NAN device #1 may perform a ranging procedure based on NAN parameters and may periodically or aperiodically measure the distance to the NAN device #2. Here, there is illustrated an example of the case in which a NAN device performs a ranging procedure while performing communication according to a schedule including only a time interval for the 5 GHz band. According to another embodiment, before the NAN device may establish a schedule with an external device, or while the NAN device is performing communication according to a schedule including both time intervals of first and second frequency bands (e.g., the 5 GHz band and the 6 GHz band), the NAN device may update the schedule according to a ranging procedure.

Referring to FIG. 29B, the NAN device #1 (e.g., the electronic device 101) may detect that the NAN device #2 (e.g., the electronic device 102) enters the 6 GHz band coverage, based on a distance measured by performing the ranging procedure, and may configure FAW #2 2912 for the 6 GHz band via a schedule updating procedure. In this instance, an FAW for the 5 GHz band (e.g., the FAW #1 2902 of FIG. 29A) may not be configured.

Figure 30:
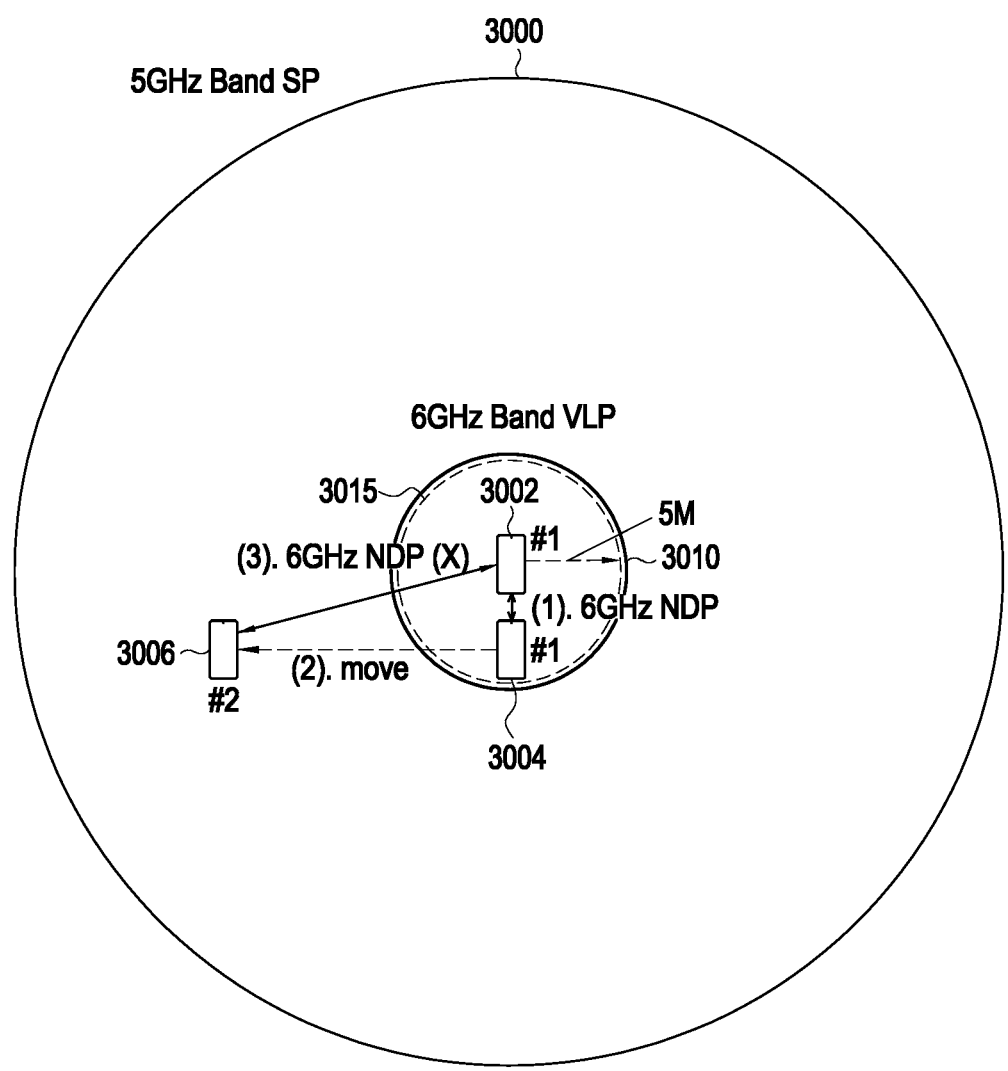
FIGS. 30 and 31 are diagrams illustrating examples in which an external device moves outside a coverage area of the 6 GHz frequency band according to various embodiments.
Figure 31:
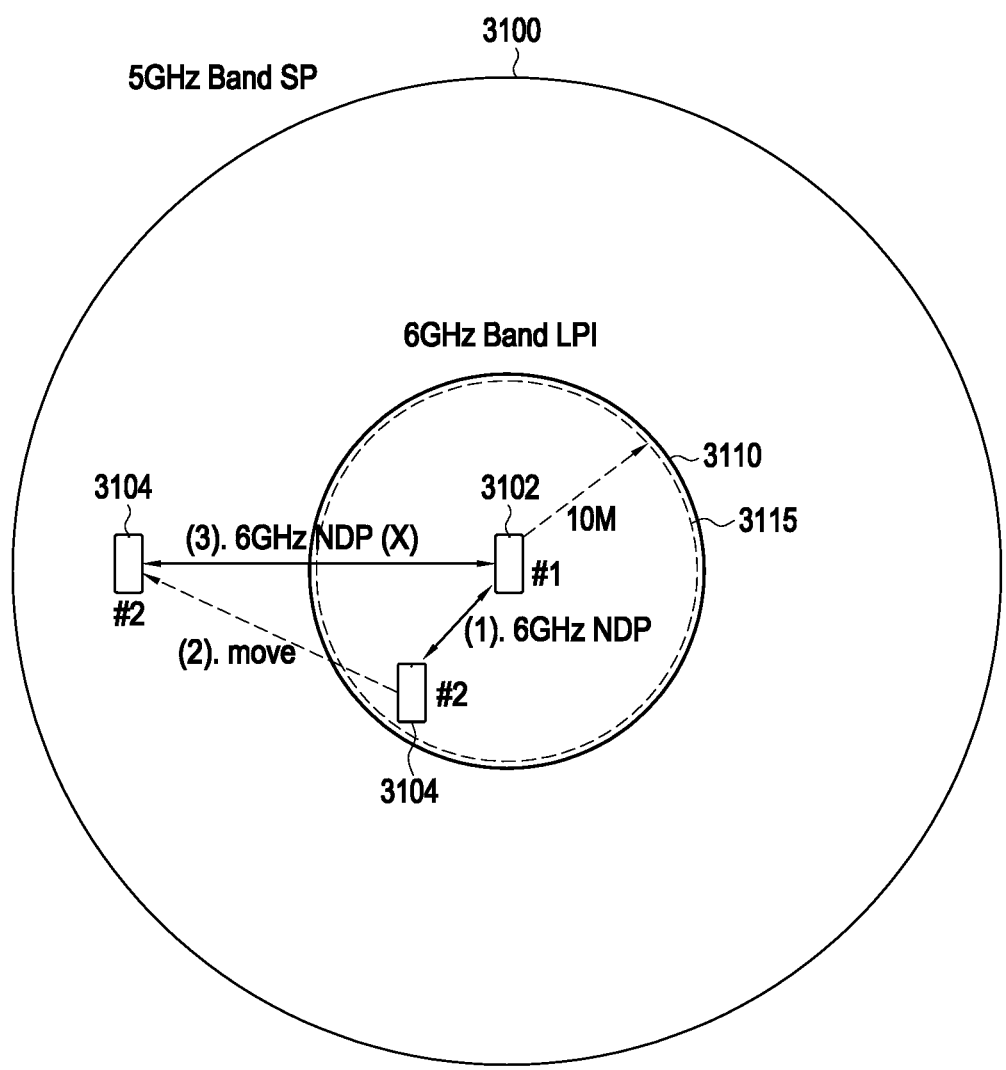

FIGS. 30 and 31 are diagrams illustrating examples in which an external device moves outside a coverage area of the 6 GHz frequency band according to various embodiments. Here, descriptions of NAN device #1 3002 and 3004, NAN device #2 3102 and 3104, and coverage areas 3000, 3010, 3100, and 3110 are the same or similar to those of FIG. 20.

Referring to FIGS. 30 and 31, when the NAN device #2 3004 and 3104 (e.g., the electronic device 102) is inside the 6 GHz band coverage area (e.g., the 6 GHz band VLP coverage 3010 or the 6 GHz band LPI coverage 3110), the NAN device #1 3002 and 3102 (e.g., the electronic device 101) may establish a schedule that allocates time slots for the 6 GHz band. For example, if the distance to the NAN device #2 3004 and 3104 measured by performing a ranging procedure with the NAN device #2 3004 and 3104 is less than or equal to the 6 GHz band coverage area 3010 and 3110, the NAN device #1 3002 and 3102 may establish a schedule that allocates time slots for the 6 GHz band and may perform communication with the NAN device #2 3004 and 3104.

In the situation (1) in which time slots are allocated according to the schedule establishment, if the NAN device #2 3004 and 3104 moves and leaves the 6 GHz band coverage 3010 and 3110 (2), the NAN device #1 3002 and 3102 may recognize that the distance to the NAN device #2 3004 and 3104 measured via a ranging procedure is greater than a distance threshold value 3015 and 3115 corresponding to the 6 GHz band coverage 3010 and 3110, for example, 5 m that corresponds to a VLP of FIG. 30 or 10 m that corresponds to an LPI of FIG. 31. For example, the NAN device #1 3002 and 3102 periodically or aperiodically may perform a ranging procedure for measuring the distance to the NAN device #2 3004 and 3104 based on NAN parameters shared with the NAN device #2 3004 and 3104, and may determine whether the distance to the NAN device #2 3004 and 3104 is greater than the distance threshold value 3015 and 3115 corresponding to the 6 GHz band coverage 3010 and 3110. If the distance to the NAN device #2 3004 and 3104 measured via a ranging procedure is greater than the distance threshold value 3015 and 3115 corresponding to the 6 GHz band coverage 3010 and 3110, the NAN device #1 3002 and 3102 may determine to use the 5 GHz band (3).

Figure 32A:
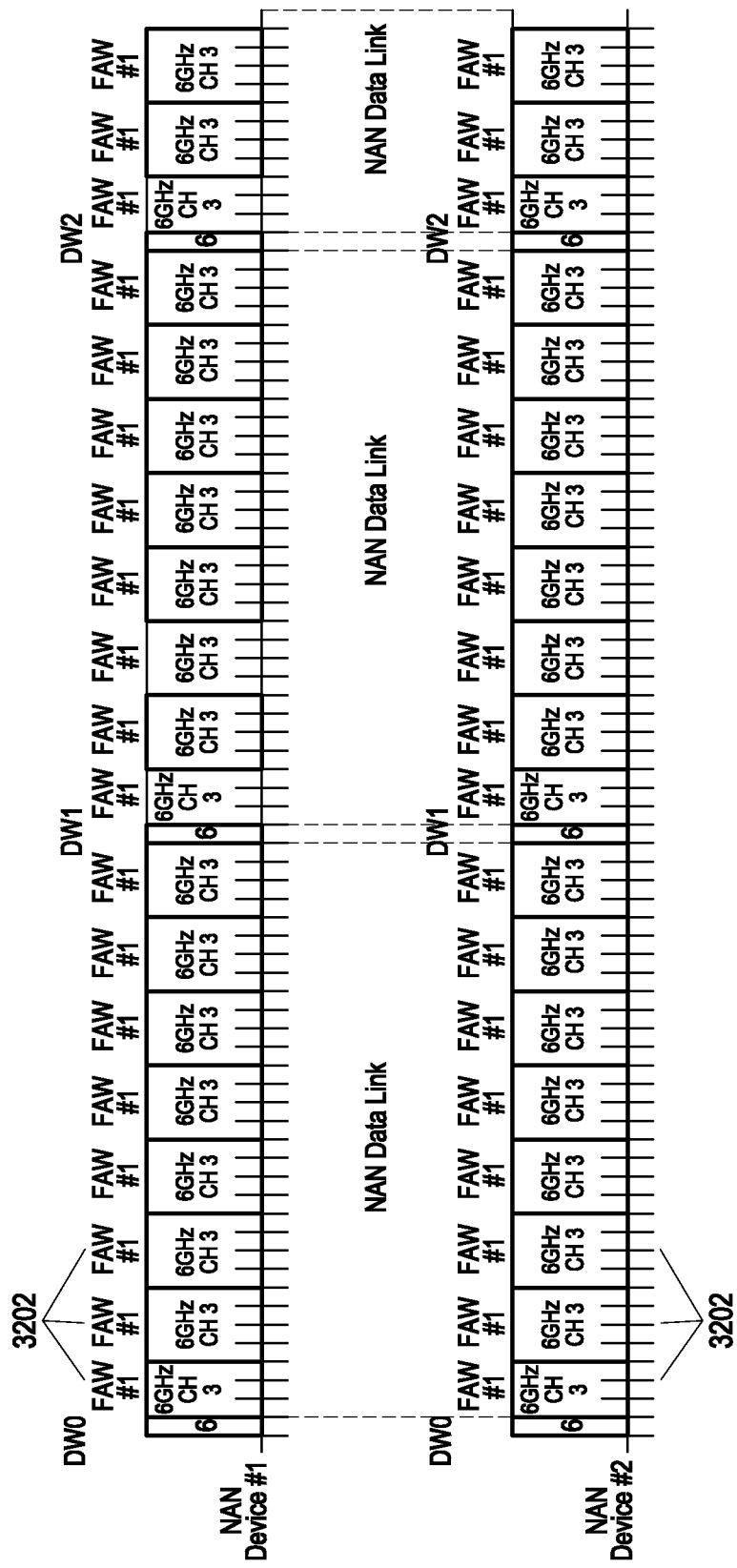
FIGS. 32A and 32B are diagrams illustrating an example of a schedule that is changed due to movement of an external device according to various embodiments.
Figure 32B:
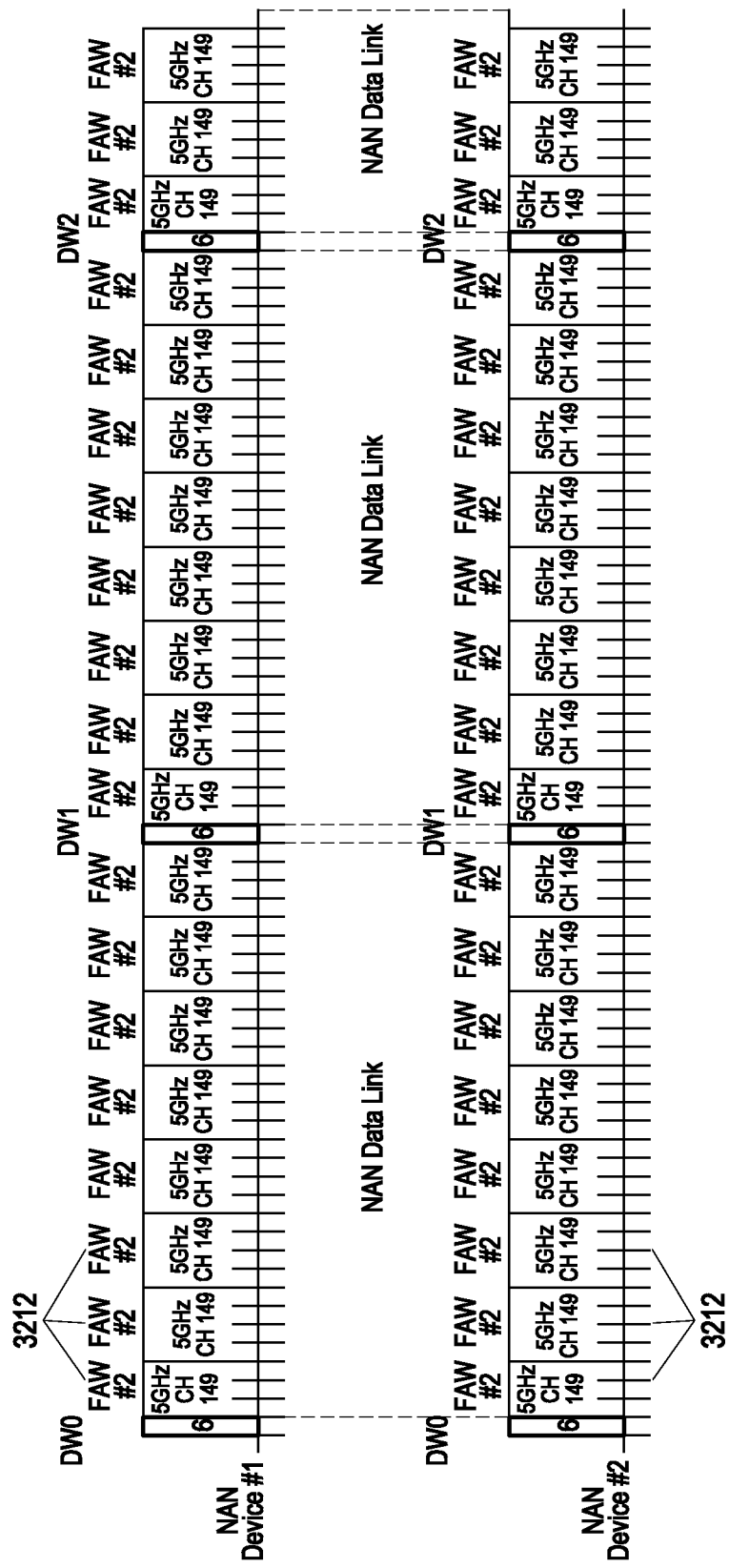

FIGS. 32A and 32B are diagrams illustrating an example of a schedule that is changed due to movement of an external device according to various embodiments. NAN device #1 (e.g., the electronic device 101) and NAN device #2 (e.g., the electronic device 102) may, for example, be the devices 3002, 3004, 3006, 3102, 3104, and 3106 of FIGS. 30 and 31.

Referring to FIG. 32A, if the NAN device #2 (e.g., the electronic device 102) is located inside the 6 GHz coverage area of the NAN device #1 (e.g., the electronic device 101), only FAW #1 3202 for the 6 GHz band may be configured between the NAN device #1 and the NAN device #2 and any other FAW may not be present. The NAN device #1 may perform a ranging procedure based on NAN parameters and may periodically or aperiodically measure the distance to the NAN device #2. Here, there is illustrated an example of the case in which a NAN device performs a ranging procedure while performing communication according to a schedule including only a time interval of a frequency band (referred to as a non-primary frequency band, for example, the 6 GHz band) other than a primary frequency band. According to another embodiment, before the NAN device may establish a schedule with an external device, or while the NAN device is performing communication according to a schedule including both time intervals of first and second frequency bands (e.g., the 5 GHz band and the 6 GHz band), the NAN device may update the schedule according to a ranging procedure.

Referring to FIG. 32B, the NAN device #1 (e.g., the electronic device 101) may detect that the NAN device #2 (e.g., the electronic device 102) leaves the 6 GHz band coverage, based on a distance measured via the ranging procedure, and may configure FAW #2 3212 for the 5 GHz band via a schedule updating procedure. In this instance, an FAW for the 6 GHz band (e.g., the FAW #1 3202 of FIG. 32A) may not be configured.

In the above, descriptions have been provided in association with the embodiments that establish a schedule that allocates time intervals to multiple frequency bands, and updates time intervals allocated to each frequency band by monitoring traffic of each frequency band or measuring a distance via a ranging procedure.

Hereinafter, various example embodiments that combine traffic monitoring and distance measuring via a ranging procedure will be described in greater detail.

Figure 33:
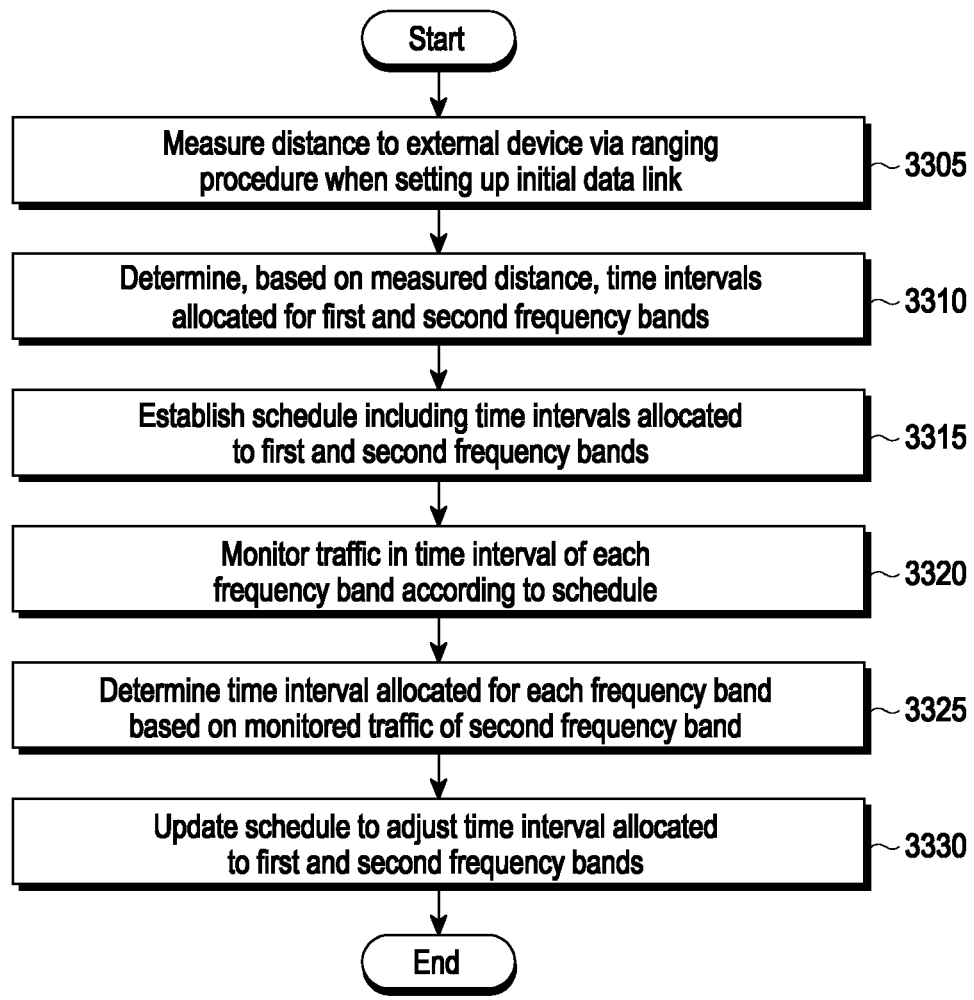
FIG. 33 is a flowchart illustrating an example procedure of updating a schedule using a ranging procedure and traffic monitoring according to various embodiments.

FIG. 33 is a flowchart illustrating an example procedure of updating a schedule using a ranging procedure and traffic monitoring according to various embodiments. The illustrated operations may be performed, for example, by the processor 304 of FIG. 3.

Referring to FIG. 33, when the electronic device 101 desires to initially set up a data link for data communication with an external device, the electronic device 101 may measure the distance to the external device via a ranging procedure (e.g., measuring a received signal strength) in operation 3305. In operation 3310, the electronic device 101 may determine time intervals for first and second frequency bands based on the measured distance. According to an embodiment, the electronic device 101 may determine whether the measured distance is less than or equal to a predetermined distance threshold value. In this instance, the electronic device 101 may configure a distance threshold value corresponding to the coverage area of the second frequency band that has a smaller coverage area between the first and second frequency bands which are supportable for the data link, may determine to allocate more time slots for the second frequency band if the measured distance is less than or equal to the distance threshold value, and may determine to allocate fewer time slots for the second frequency band if the measured distance is greater than the distance threshold value. In this instance, the electronic device 101 may determine to allocate time intervals including at least one time slot for the first and second frequency bands in the interval between discovery windows.

In operation 3315, the electronic device 101 may establish a schedule including time intervals allocated to the first and second frequency bands according to the determination, and may perform communication with the external device using the first and second frequency bands according to the schedule.

The electronic device 101 may monitor traffic in the time intervals of the first and second frequency bands according to the schedule in operation 3320, and may determine to change the time interval allocated for each frequency band based on the monitored traffic of the second frequency band in operation 3325. For example, if traffic of the second frequency band is present or traffic of the second frequency band exceeds a predetermined threshold value, the electronic device 101 may determine to allocate a time interval including more time slots for the second frequency band.

In operation 3330, the electronic device 101 may update the schedule in order to adjust the time intervals allocated to the first and second frequency bands according to the determination. Subsequently, the electronic device 101 may perform communication with the external device using the first and second frequency bands according to the updated schedule, may return to operation 3320 so as to periodically monitor traffic of each frequency band, and may determine whether to update the schedule.

According to an embodiment, the electronic device 101 may monitor traffic of time intervals of the first and second frequency bands in operation 3320, and may determine whether to update the schedule based on the monitored traffic of the first and second frequency band in operation 3325. In this instance, the distance to the external device may be measured according to a ranging procedure that measures the distance to the external device. For example, if it is determined that the distance to the external device has been changed, the electronic device 101 may determine to update the schedule.

Figure 34:
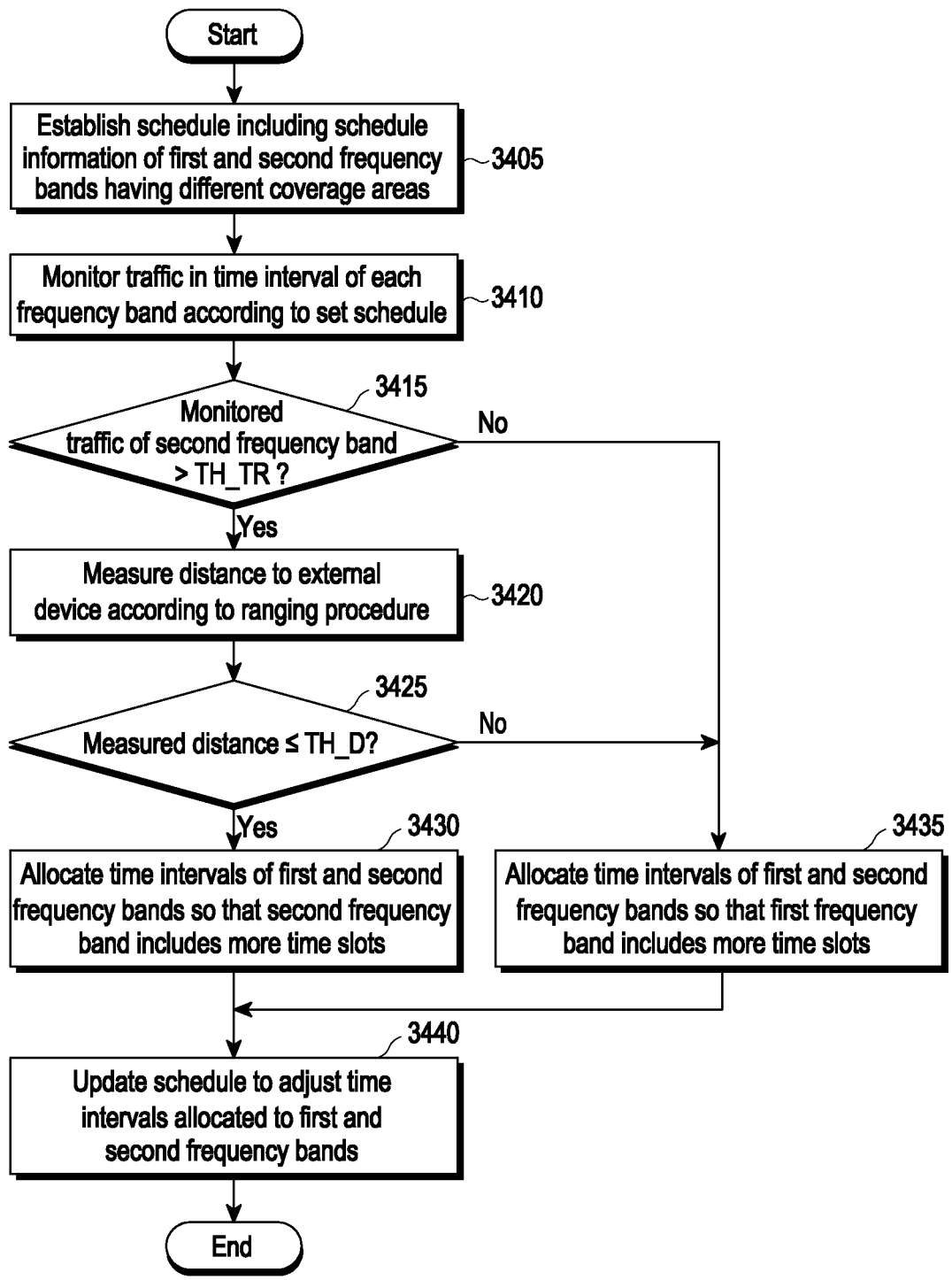
FIG. 34 is a flowchart illustrating an example procedure of updating a schedule using a ranging procedure and traffic monitoring according to various embodiments.

FIG. 34 is a flowchart illustrating an example procedure of updating a schedule using a ranging procedure and traffic monitoring according to various embodiments. The illustrated operations may be performed, for example, by the processor 304 of FIG. 3.

Referring to FIG. 34, the electronic device 101 may establish a schedule including schedule information associated with a first frequency band and a second frequency band which have different coverage areas in operation 3405. The schedule information may include both time intervals allocated to the first and second frequency bands. For example, when a schedule is initially established, the time intervals may be allocated to the first and second frequency bands in substantially equal ratios. The electronic device 101 may monitor traffic in the time intervals of the first and second frequency bands according to the schedule in operation 3410, and may determine whether the monitored traffic of the second frequency band exceeds a predetermined traffic threshold value TH_TR in operation 3415. According to an embodiment, if at least one packet is present in the second frequency band, the electronic device 101 may determine that the traffic exceeds the traffic threshold value. If the traffic exceeds the traffic threshold value ("Yes" in operation 3415), the electronic device may proceed with operation 3420. Otherwise ("No" in operation 3415), the electronic device may proceed with operation 3435.

In order to determine whether the monitored traffic change is actually caused by a change in the distance or is caused by data communication disconnection due to another factor, the electronic device 101 may measure the distance to the external device via a ranging procedure (e.g., measuring of a received signal strength) in operation 3420. In operation 3425, the electronic device 101 may determine whether the measured distance is less than or equal to a distance threshold value TH_D which is predetermined to correspond to the coverage area of the second frequency band. If the measured distance is less than or equal to the distance threshold value ("Yes" in operation 3425), the electronic device may proceed with operation 3420, and may allocate time intervals of the first and second frequency bands so that the second frequency band includes more time slots. Conversely, if the measured distance exceeds the distance threshold value ("No" in operation 3425), time intervals of the first and second frequency bands are allocated so that the first frequency band includes more time slots in operation 3435.

In operation 3440, the electronic device 101 may update the schedule in order to adjust the time intervals of the first and second frequency bands according to an allocation result in operation 3430 or 3435, and may perform communication with the external device in the first and second frequency bands according to the updated schedule. Subsequently, the electronic device 101 may return to operation 3410 and may continue to periodically monitor traffic of each frequency band. As described above, by running a ranging procedure in parallel, schedule updating may be performed less frequently than before.

Figure 35:
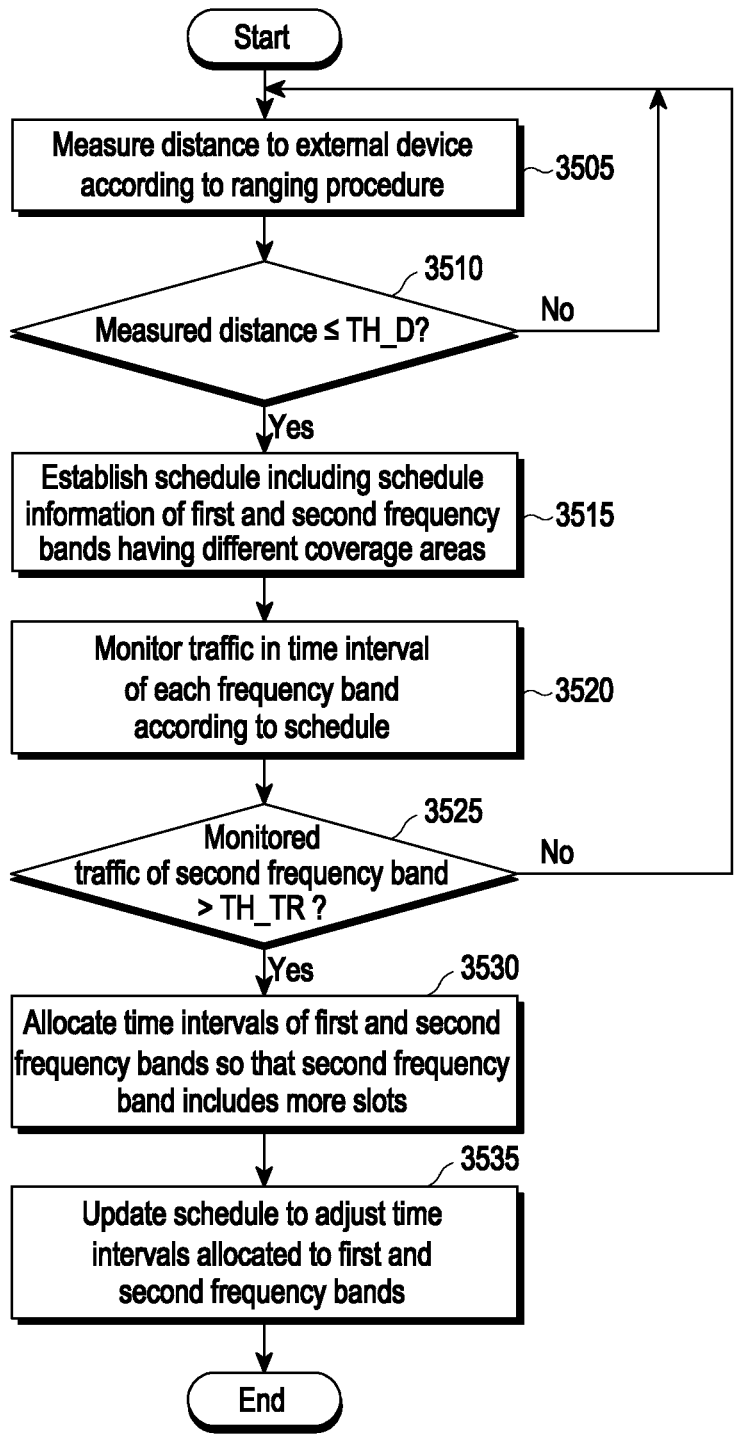
FIG. 35 is a flowchart illustrating an example procedure of updating a schedule using a ranging procedure and traffic monitoring according to various embodiments.

FIG. 35 is a flowchart illustrating an example procedure of updating a schedule using a ranging procedure and traffic monitoring according to various embodiments. The illustrated operations may be performed, for example, by the processor 304 of FIG. 3.

Referring to FIG. 35, in operation 3505, the electronic device 101 may periodically or aperiodically perform a ranging procedure (e.g., measuring of a received signal strength) with an external device with which the electronic device 101 desires to set up, or has, a data link, so as to measure the distance to the external device. Here, communication via the data link may be performed according to a schedule including only a time interval of a first frequency band or a schedule including both time intervals of the first and second frequency bands. The electronic device 101 may be configured to perform the procedure of FIG. 35 periodically or aperiodically according to NAN parameters given in advance, while performing data communication via the first frequency band or data communication via the first and second frequency bands.

In operation 3510, the electronic device 101 may determine whether the measured distance is less than or equal to a distance threshold value TH_D that is predetermined to correspond to the coverage area of the second frequency band. If the measured distance is less than or equal to the distance threshold value ("Yes" in operation 3510), the electronic device may proceed with operation 3515 in order to allocate some of time intervals of the second frequency band. Otherwise ("No" in operation 3510), the electronic device may return to operation 3505. According to an embodiment, if the measured distance is greater than the distance threshold value TH_D that is predetermined to correspond to the coverage area of the second frequency band in operation 3510, the electronic device 101 may set schedule information to an initial value (e.g., 50:50) so as to include both the first frequency band and the second frequency band, or may allocate a time interval between discovery windows so as to include only time slots for the first frequency band.

In operation 3515, the electronic device 101 may establish, with the external device, a schedule including schedule information of both the first and second frequency bands having different coverage areas. The schedule information may include both time intervals allocated to the first and second frequency bands. For example, the schedule information may include a time interval including at least one time slot allocated to the second frequency band, in order to monitor traffic of the second frequency band.

The electronic device 101 may monitor traffic in the time intervals of the first and second frequency bands according to the schedule in operation 3520, and may determine whether the monitored traffic of the second frequency band exceeds a predetermined traffic threshold value TH_TR in operation 3525. According to an embodiment, if at least one packet is present in the second frequency band, the electronic device 101 may determine that the traffic exceeds the traffic threshold value. For example, if at least one packet is present in the second frequency band during a predetermined period of time, the electronic device 101 may determine that the traffic exceeds the traffic threshold value. If the traffic exceeds the traffic threshold value ("Yes" in operation 3525), the electronic device may proceed with operation 3530. Otherwise ("No" in operation 3525), the electronic device may return to operation 3505.

In operation 3530, the electronic device 101 may allocate time intervals of the first and second frequency bands so that the second frequency band includes more time slots. In operation 3535, the electronic device 101 may update the schedule in order to adjust the time intervals of the first and second frequency bands according to an allocation result, and may perform communication with the external device in the first and second frequency bands according to the updated schedule. Subsequently, the electronic device 101 may return to operation 3505, and may periodically determine whether to update the schedule by performing a ranging procedure and traffic monitoring.

According to various example embodiments of the disclosure, there is provided a schedule management method that may improve transmission efficiency by using multiple frequency bands having different coverage areas. According to various example embodiments of the disclosure, mobility between devices may be secured and improved data communication performance may be provided.

According to an example embodiment of the disclosure, the electronic device may include the at least one communication circuit and the at least one processor. For example, the at least one processor may be configured to: establish, with an external device, a schedule including a time interval for a first frequency band and a time interval for a second frequency band to perform data communication with the external device supporting the first frequency band and the second frequency band, the first and second frequency bands having different coverage areas. The at least one processor may be configured to: determine a ratio of the time interval for the second frequency band depending based on a result of monitoring traffic in the first frequency band and the second frequency band according to the schedule indicating that traffic of the second frequency band having a smaller coverage area is present, and update the schedule to adjust the time intervals for the first frequency band and the second frequency band based on the determined ratio.

When establishing an initial schedule with the external device, the at least one processor according to an example embodiment of the disclosure may be configured to establish the schedule to distribute the time interval for the first frequency band and the time interval for the second frequency band in equal ratios before monitoring the traffic.

The at least one processor according to an example embodiment of the disclosure may be configured to: update the schedule so that the time interval for the second frequency band includes more time slots than the time interval for the first frequency band and the time interval for the first frequency band includes at least one time slot based on traffic of the second frequency band being present during a predetermined monitoring time after the schedule is established.

The at least one processor according to an example embodiment of the disclosure may be configured to: measure a distance to the external device via a ranging procedure before establishing the schedule, may establish the schedule so that the time interval for the second frequency band includes more time slots than the time interval for the first frequency band based on the measured distance being less than or equal to a distance threshold value, and may establish the schedule so that the time interval for the second frequency band includes fewer time slots than the time interval for the first frequency band based on the measured distance being greater than the distance threshold value.

The at least one processor according to an example embodiment of the disclosure may be configured to measure a distance to the external device via a ranging procedure based on a result of monitoring traffic indicating that traffic of the second frequency band is present, may update the schedule so that the time interval for the second frequency band includes more time slots than the time interval for the first frequency band based on the measured distance being less than or equal to a predetermined distance threshold value, and may update the schedule so that the time interval for the first frequency band includes more time slots than the time interval for the second frequency band based on the measured distance being greater than the distance threshold value.

The at least one processor according to an example embodiment of the disclosure may be configured to: measure a distance to the external device via a ranging procedure based on establishing an initial schedule with the external device, and may establish the initial schedule that distributes the time interval for the first frequency band and the time interval for the second frequency band in equal ratios based on the measured distance being less than or equal to the predetermined distance threshold value.

The at least one processor according to an example embodiment may be configured to: determine whether traffic of the second frequency band is present by monitoring traffic in the first frequency band and the second frequency band according to the initial schedule, may establish the schedule so that the time interval for the second frequency band includes more time slots than the time interval for the first frequency band based on traffic of the second frequency band being present, and may establish the schedule so that the time interval for the second frequency band includes fewer time slots than the time interval for the first frequency band based on traffic of the second frequency band not being present.

The at least one processor according to an example embodiment may be configured to: transmit a schedule request frame to the external device via the at least one communication circuit to update the schedule, wherein the schedule request frame includes first schedule information indicating the time interval for the first frequency band and second schedule information indicating the time interval for the second frequency band, and may receive a schedule response frame corresponding to the schedule request frame from the external device via the at least one communication circuit.

According to an example embodiment of the disclosure, the first schedule information may include a band entry including a band ID of the first frequency band and a time bitmap indicating the time interval for the first frequency band, and the second schedule information may include a band entry including a band ID of the second frequency band and a time bitmap indicating the time interval for the second frequency band.

According to an example embodiment of the disclosure, the first frequency band may be a 5 GHz band for neighbor awareness networking (NAN) communication, and the second frequency band may be a 6 GHz band for NAN communication.

The electronic device according to various embodiments may be one of various types of electronic devices. The electronic devices may include, for example, a computer device, a portable communication device (e.g., a smartphone), a portable multimedia device, a portable medical device, a camera, a wearable device, a home appliance, or the like. According to embodiments of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program) including one or more instructions that are stored in a storage medium (e.g., internal memory or external memory) that is readable by a machine (e.g., a master device or a task performing device). For example, a processor of the machine (e.g., the master device or the task performing device) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

A method according to some embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities. According to some embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to some embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents.

What is claimed is:

1. An electronic device comprising:
   at least one communication circuit;
   at least one processor comprising processing circuitry; and
   memory configured to store instructions which, when executed by the at least one processor individually and/or collectively, cause the electronic device to:
   establish, with an external device, a schedule including both a time interval for a first frequency band in an interval between discovery windows and a time interval for a second frequency band in the interval between the discovery windows to perform data communication with the external device supporting the first frequency band and the second frequency band, the first and second frequency bands having different coverage areas;
   determine a ratio of the time interval for the second frequency band to the time interval for the first frequency band based on a result of monitoring traffic in the first frequency band and the second frequency band according to the schedule indicating that traffic of the second frequency band having a smaller coverage area is present; and
   update, based on the determined ratio, the schedule to adjust the time intervals for the first frequency band and the second frequency band in an interval between discovery windows.

2. The electronic device of claim 1, wherein the instructions, when executed by the at least one processor individually and/or collectively, cause the electronic device to:
   based on establishing an initial schedule with the external device, establish the schedule to distribute the time interval for the first frequency band and the time interval for the second frequency band in equal ratios before monitoring the traffic.

3. The electronic device of claim 1, wherein the instructions, when executed by the at least one processor individually and/or collectively, cause the electronic device to update the schedule so that the time interval for the second frequency band includes more time slots than the time interval for the first frequency band and the time interval for the first frequency band includes at least one time slot based on traffic of the second frequency band being present during a specified monitoring time after the schedule is established.

4. The electronic device of claim 1, wherein the instructions, when executed by the at least one processor individually and/or collectively, cause the electronic device to:
   measure a distance to the external device via a ranging procedure before establishing the schedule;
   based on the measured distance being less than or equal to a distance threshold value, establish the schedule so that the time interval for the second frequency band includes more time slots than the time interval for the first frequency band; and
   based on the measured distance being greater than the distance threshold value, establish the schedule so that the time interval for the second frequency band includes fewer time slots than the time interval for the first frequency band includes.

5. The electronic device of claim 1, wherein the instructions, when executed by the at least one processor individually and/or collectively, cause the electronic device to:
   measure a distance to the external device via a ranging procedure based on the result of monitoring traffic indicating that traffic of the second frequency band is present;
   based on the measured distance being less than or equal to a distance threshold value, update the schedule so that the time interval for the second frequency band includes more time slots than the time interval for the first frequency band; and
   based on the measured distance being greater than the distance threshold value, update the schedule so that the time interval for the first frequency band includes more time slots than the time interval for the second frequency band.

6. The electronic device of claim 1, wherein the instructions, when executed by the at least one processor individually and/or collectively, cause the electronic device to:
   measure a distance to the external device via a ranging procedure based on establishing an initial schedule with the external device; and
   based on the measured distance being less than or equal to a distance threshold value, establish the initial schedule that distributes the time interval for the first frequency band and the time interval for the second frequency band in equal ratios.

7. The electronic device of claim 6, wherein the instructions, when executed by the at least one processor individually and/or collectively, cause the electronic device to:
   determine whether traffic of the second frequency band is present based on a result of monitoring traffic in the first frequency band and the second frequency band according to the initial schedule;
   based on traffic of the second frequency band being present, establish the schedule so that the time interval for the second frequency band includes more time slots than the time interval for the first frequency band; and
   based on traffic of the second frequency band not being present, establish the schedule so that the time interval for the second frequency band includes fewer time slots than the time interval for the first frequency band.

8. The electronic device of claim 1, wherein the instructions, when executed by the at least one processor individually and/or collectively, cause the electronic device to:
   transmit a schedule request frame to the external device via the at least one communication circuit to update the schedule, wherein the schedule request frame comprises first schedule information indicating the time interval for the first frequency band and second schedule information indicating the time interval for the second frequency band; and
receive a schedule response frame corresponding to the schedule request frame from the external device via the at least one communication circuit.

9. The electronic device of claim 8, wherein the first schedule information comprises a band entry including a band ID of the first frequency band and a time bitmap indicating the time interval for the first frequency band, and
the second schedule information comprises a band entry including a band ID of the second frequency band and a time bitmap indicating the time interval for the second frequency band.

10. The electronic device of claim 1, wherein the first frequency band is a 5 GHz band for neighbor awareness networking (NAN) communication, and
the second frequency band is a 6 GHz band for NAN communication.

11. A method of operating an electronic device, the method comprising:
setting up, with an external device, a schedule including both a time interval for a first frequency band in an interval between discovery windows and a time interval for a second frequency band in the interval between the discovery windows to perform data communication with the external device supporting the first frequency band and the second frequency band, the first and second frequency bands having different coverage areas;
determining a ratio of the time interval for the second frequency band to the time interval for the first frequency band based on a result of monitoring traffic in the first frequency band and the second frequency band according to the schedule indicates that traffic of the second frequency band having a smaller coverage area is present; and
updating the schedule to adjust the time intervals for the first frequency band and the second frequency band based on the determined ratio in an interval between discovery windows.

12. The method of claim 11, wherein the establishing of the schedule comprises:
based on establishing an initial schedule with the external device, establishing the schedule to distribute the time interval for the first frequency band and the time interval for the second frequency band in equal ratios before monitoring the traffic.

13. The method of claim 11, wherein the determining of the ratio of the time interval comprises:
based on traffic of the second frequency band being present during a predetermined monitoring time after the schedule is established, determining the ratio of the time interval so that the time interval for the second frequency band includes more time slots than the time interval for the first frequency band and the time interval for the first frequency band includes at least one time slot.

14. The method of claim 11, wherein the establishing of the schedule comprises:
measuring a distance to the external device via a ranging procedure before establishing the schedule;
based on the measured distance being less than or equal to a distance threshold value, establishing the schedule so that the time interval for the second frequency band includes more time slots than the time interval for the first frequency band; and
based on the measured distance being greater than the distance threshold value, establishing the schedule so that the time interval for the second frequency band includes fewer time slots than the time interval for the first frequency band.

15. The method of claim 11, wherein the updating of the schedule comprises:
measuring a distance to the external device via a ranging procedure based on a result of monitoring traffic indicating that traffic of the second frequency band is present;
based on the measured distance being less than or equal to a predetermined distance threshold value, updating the schedule so that the time interval for the second frequency band includes more time slots than the time interval for the first frequency band; and
based on the measured distance being greater than the distance threshold value, updating the schedule so that the time interval for the first frequency band includes more time slots than the time interval for the second frequency band.

16. The method of claim 11, wherein the establishing of the schedule comprises:
measuring a distance to the external device via a ranging procedure when establishing an initial schedule with the external device; and
based on the measured distance being less than or equal to a predetermined distance threshold value, establishing the initial schedule that distributes the time interval for the first frequency band and the time interval for the second frequency band in equal ratios.

17. The method of claim 16, wherein the establishing of the schedule comprises:
determining whether traffic of the second frequency band is present based on the result of monitoring traffic in the first frequency band and the second frequency band according to the initial schedule;
based on traffic of the second frequency band being present, establishing the schedule so that the time interval for the second frequency band includes more time slots than the time interval for the first frequency band; and
based on traffic of the second frequency band not being present, establishing the schedule so that the time interval for the second frequency band includes fewer time slots than the time interval for the first frequency band includes.

18. The method of claim 11, wherein the updating of the schedule comprises:
a schedule request frame to the external device to update the schedule, wherein the schedule request frame comprises first schedule information indicating the time interval for the first frequency band and second schedule information indicating the time interval for the second frequency band; and
receiving a schedule response frame corresponding to the schedule request frame from the external device.

19. The method of claim 18, wherein the first schedule information comprises a band entry including a band ID of the first frequency band and a time bitmap indicating the time interval for the first frequency band, and the second schedule information comprises a band entry including a band ID of the second frequency band and a time bitmap indicating the time interval for the second frequency band.

20. The method of claim 11, wherein the first frequency band is a 5 GHz band for neighbor awareness networking (NAN) communication, and the second frequency band is a 6 GHz band for NAN communication.

* * * * *